United States Patent
Elko et al.

(10) Patent No.: US 7,940,706 B2
(45) Date of Patent: *May 10, 2011

(54) CONTROLLING THE STATE OF DUPLEXING OF COUPLING FACILITY STRUCTURES

(75) Inventors: David A. Elko, Austin, TX (US); Steven N. Goss, Kingston, NY (US); Michael J. Jordan, Hurley, NY (US); Georgette L. Kurdt, Wappingers Falls, NY (US); Jeffrey M. Nick, West Park, NY (US); Kelly B. Pushong, Highland, NY (US); David H. Surman, Milton, NY (US)

(73) Assignee: International Business Machines Corporation, Armonk, NY (US)

( * ) Notice: Subject to any disclaimer, the term of this patent is extended or adjusted under 35 U.S.C. 154(b) by 542 days.
This patent is subject to a terminal disclaimer.

(21) Appl. No.: 11/833,571

(22) Filed: Aug. 3, 2007

(65) Prior Publication Data
US 2007/0268844 A1 Nov. 22, 2007

Related U.S. Application Data

(60) Continuation of application No. 10/140,622, filed on May 8, 2002, now Pat. No. 7,257,091, which is a division of application No. 09/968,248, filed on Oct. 1, 2001, now Pat. No. 7,013,305.

(51) Int. Cl.
*H04B 1/56* (2006.01)
*H04L 5/14* (2006.01)

(52) U.S. Cl. ........................................ 370/276

(58) Field of Classification Search .................. 370/241, 370/254, 216, 217, 276, 242, 251–253, 395; 709/223, 202, 203, 224, 241, 228, 225, 229, 709/226, 227, 200, 213, 214; 714/15, 11, 714/5, 4, 14; 711/168; 375/211; 707/999; 710/50

See application file for complete search history.

(56) References Cited

U.S. PATENT DOCUMENTS 3,680,052 A  7/1972 Arulpragasam et al. ... 340/172.5
3,768,074 A  10/1973 Sharp et al. ............... 364/DIG. 1

(Continued)

FOREIGN PATENT DOCUMENTS

EP       0058846       9/1982

(Continued)

OTHER PUBLICATIONS

Chalmtac et al., "Performance Models of Asynchronous Multitrunk HYPERchannel Networks," IEEE Trans. on Computers, vol. C-36, No. 2, pp. 138-146, Feb. 1987 (Abstract Only).
Thierer, M., "Reliability and Monitoring of Computer Controlled Arrangements,", Fernmelde-Praxis, vol. 51, No. 14, pp. 573-591, Jul. 24, 1991 (Abstract Only).
Elko et al., "Coupling Facility Serviceability—Event Notification of Link-Incident Records and Error Reporting", IBM Technical Disclosure Bulletin, vol. 38, No. 4, Apr. 95, p. 173-181.

(Continued)

*Primary Examiner* — Pankaj Kumar
*Assistant Examiner* — Prenell P Jones
(74) *Attorney, Agent, or Firm* — John E. Campbell; Blanche E. Schiller, Esq.; Heslin Rothenberg Farley & Mesiti P.C.

(57) ABSTRACT

A coupling facility is coupled to one or more other coupling facilities via one or more peer links. The coupling of the facilities enables various functions to be supported, including the duplexing of structures of the coupling facilities. Duplexing is performed on a structure basis, and thus, a coupling facility may include duplexed structures, as well as non-duplexed or simplexed structures.

8 Claims, 24 Drawing Sheets

U.S. PATENT DOCUMENTS

| | | | | |
|---|---|---|---|---|
| 3,787,816 A | 1/1974 | Hauck et al. ............... 340/172.5 |
| 3,805,247 A | 4/1974 | Zucker et al. ................. 395/566 |
| 3,934,131 A | 1/1976 | Perschy ........................ 235/153 |
| 4,004,277 A | 1/1977 | Gavril ........................... 395/843 |
| 4,030,072 A | 6/1977 | Bjornsson ................. 340/172.5 |
| 4,183,083 A | 1/1980 | Chatfield ..................... 364/200 |
| 4,189,771 A | 2/1980 | Roever ......................... 364/300 |
| 4,207,609 A | 6/1980 | Luiz et al. .................... 364/200 |
| 4,240,143 A | 12/1980 | Besemer et al. ............. 364/200 |
| 4,271,468 A | 6/1981 | Christensen et al. ........ 364/200 |
| 4,317,168 A | 2/1982 | Messina et al. .............. 395/250 |
| 4,396,983 A | 8/1983 | Segarra et al. ........ 395/200.02 |
| 4,396,984 A | 8/1983 | Videki et al. ................. 395/275 |
| 4,399,504 A | 8/1983 | Obermarck et al. ......... 395/650 |
| 4,400,773 A | 8/1983 | Brown et al. ................. 364/200 |
| 4,402,046 A | 8/1983 | Cox et al. ..................... 395/200 |
| 4,410,940 A | 10/1983 | Carlson et al. ............... 364/200 |
| 4,423,480 A | 12/1983 | Bauer et al. .................. 364/200 |
| 4,424,561 A | 1/1984 | Stanley et al. ................... 711/3 |
| 4,435,766 A | 3/1984 | Haber et al. .................. 364/200 |
| 4,441,155 A | 4/1984 | Fletcher et al. .............. 364/200 |
| 4,442,485 A | 4/1984 | Ota et al. ...................... 395/877 |
| 4,445,174 A | 4/1984 | Fletcher ........................ 395/425 |
| 4,451,916 A | 5/1984 | Casper et al. ................... 370/16 |
| 4,455,605 A | 6/1984 | Cormier et al. .............. 364/200 |
| 4,463,424 A | 7/1984 | Mattson et al. .............. 395/425 |
| 4,477,881 A | 10/1984 | Kobayashi et al. ...... 395/200.09 |
| 4,480,304 A | 10/1984 | Carr et al. ..................... 395/725 |
| 4,484,270 A | 11/1984 | Quernemoen et al. ........ 364/200 |
| 4,495,564 A | 1/1985 | Draper et al. ................. 395/837 |
| 4,525,780 A | 6/1985 | Bratt et al. .................... 364/200 |
| 4,543,627 A | 9/1985 | Schwab ......................... 364/200 |
| 4,545,011 A | 10/1985 | Lyon et al. .................... 364/200 |
| 4,564,903 A | 1/1986 | Guyette et al. ............... 711/201 |
| 4,569,017 A | 2/1986 | Renner et al. ................. 364/200 |
| 4,587,609 A | 5/1986 | Boudreau et al. ............ 395/726 |
| 4,603,382 A | 7/1986 | Cole et al. ..................... 395/250 |
| 4,604,694 A | 8/1986 | Hough ........................... 395/650 |
| 4,617,657 A | 10/1986 | Drynan et al. ................ 370/394 |
| 4,622,633 A | 11/1986 | Ceccon et al. ............ 364/DIG. 1 |
| 4,633,467 A | 12/1986 | Abel et al. ........................ 371/16 |
| 4,636,946 A | 1/1987 | Hartung et al. ............... 364/200 |
| 4,648,031 A | 3/1987 | Jenner ........................... 364/200 |
| 4,660,141 A | 4/1987 | Ceccon et al. ................ 364/200 |
| 4,674,036 A | 6/1987 | Conforti ........................ 364/200 |
| 4,688,035 A | 8/1987 | Gray et al. ................ 340/825.52 |
| 4,695,943 A | 9/1987 | Keeley et al. ................. 395/467 |
| 4,697,232 A | 9/1987 | Brunelle et al. .............. 395/866 |
| 4,697,266 A | 9/1987 | Finley ............................. 371/12 |
| 4,709,325 A | 11/1987 | Yajima .......................... 364/200 |
| 4,716,528 A | 12/1987 | Crus et al. ..................... 395/650 |
| 4,718,002 A | 1/1988 | Carr ............................... 364/200 |
| 4,757,446 A | 7/1988 | Trottier et al. ................ 709/232 |
| 4,775,932 A | 10/1988 | Oxley et al. ................... 364/200 |
| 4,777,595 A | 10/1988 | Strecker et al. ............... 364/200 |
| 4,785,394 A | 11/1988 | Fischer ......................... 364/200 |
| 4,805,106 A | 2/1989 | Pfeifer .......................... 395/425 |
| 4,823,261 A | 4/1989 | Bank et al. .................... 364/200 |
| 4,823,304 A | 4/1989 | Frantz et al. .................. 395/250 |
| 4,843,541 A | 6/1989 | Bean et al. .................... 395/856 |
| 4,847,754 A | 7/1989 | Obermark et al. ............ 364/200 |
| 4,853,843 A | 8/1989 | Ecklund ........................ 364/200 |
| 4,858,116 A | 8/1989 | Gillett et al. .................. 395/482 |
| 4,866,606 A | 9/1989 | Kopetz .......................... 364/200 |
| 4,870,572 A | 9/1989 | Hosono et al. ................ 711/153 |
| 4,887,076 A | 12/1989 | Kent et al. ................ 340/825.16 |
| 4,890,223 A | 12/1989 | Cruess et al. ............ 364/DIG. 1 |
| 4,899,333 A | 2/1990 | Roediger ......................... 370/60 |
| 4,905,141 A | 2/1990 | Brenza ........................... 395/425 |
| 4,907,151 A | 3/1990 | Bartlett .......................... 395/493 |
| 4,912,637 A | 3/1990 | Sheedy et al. ................. 364/300 |
| 4,914,657 A | 4/1990 | Walter et al. ................. 395/650 |
| 4,917,577 A | 4/1990 | Stirling .......................... 711/207 |
| 4,918,600 A | 4/1990 | Harper et al. ................. 711/157 |
| 4,926,420 A | 5/1990 | Shimizu ....................... 370/94.1 |
| 4,932,024 A | 6/1990 | Bonicioli et al. ............ 370/85.9 |
| 4,937,825 A | 6/1990 | Ballard et al. ................ 381/20.1 |
| 4,951,192 A | 8/1990 | Chase, Jr. et al. ............. 364/200 |
| 4,965,717 A | 10/1990 | Cutts, Jr. et al. ............... 364/200 |
| 4,965,719 A | 10/1990 | Shoens et al. ................. 364/200 |
| 4,969,092 A | 11/1990 | Shorter ......................... 709/102 |
| 4,970,640 A | 11/1990 | Beardsley et al. ............ 364/200 |
| 4,980,818 A | 12/1990 | Shinmura ................ 364/DIG. 1 |
| 4,984,153 A | 1/1991 | Kregness et al. .............. 395/425 |
| 4,989,132 A | 1/1991 | Mellender et al. ............ 395/705 |
| 5,006,978 A | 4/1991 | Neches .......................... 395/650 |
| 5,008,853 A | 4/1991 | Bly et al. ....................... 395/331 |
| 5,010,560 A | 4/1991 | Janney et al. ................... 377/20 |
| 5,027,269 A | 6/1991 | Grant et al. ............... 364/DIG. 1 |
| 5,027,271 A | 6/1991 | Curley et al. ................. 395/725 |
| 5,047,923 A | 9/1991 | Elstner et al. ................. 364/200 |
| 5,051,887 A | 9/1991 | Berger et al. ................. 711/162 |
| 5,056,000 A | 10/1991 | Chang ........................... 364/200 |
| 5,060,140 A | 10/1991 | Brown et al. ................. 364/200 |
| 5,065,311 A | 11/1991 | Masai et al. .................. 364/200 |
| 5,065,397 A | 11/1991 | Shiobara ..................... 370/85.5 |
| 5,084,816 A | 1/1992 | Boese et al. .................. 395/575 |
| 5,088,021 A | 2/1992 | McLaughlin et al. ........ 364/187 |
| 5,093,918 A | 3/1992 | Heyen et al. ............ 364/DIG. 1 |
| 5,095,480 A | 3/1992 | Fenner ......................... 370/94.1 |
| 5,099,485 A | 3/1992 | Bruckert et al. .......... 395/182.09 |
| 5,101,494 A | 3/1992 | Bilski et al. ................... 395/704 |
| 5,107,420 A | 4/1992 | Kametani ...................... 395/650 |
| 5,107,489 A | 4/1992 | Brown et al. ................ 370/58.2 |
| 5,111,384 A | 5/1992 | Aslania et al. ................ 395/575 |
| 5,113,514 A | 5/1992 | Albonesi et al. .............. 395/425 |
| 5,119,488 A | 6/1992 | Takamatsu et al. ........... 395/575 |
| 5,121,390 A | 6/1992 | Farrell et al. ................. 395/94.1 |
| 5,123,101 A | 6/1992 | Sindhu .......................... 395/400 |
| 5,129,083 A | 7/1992 | Cutler et al. ............. 364/DIG. 1 |
| 5,136,700 A | 8/1992 | Thacker ........................ 395/400 |
| 5,138,611 A | 8/1992 | Carn et al. ....................... 370/60 |
| 5,142,627 A | 8/1992 | Elliot et al. ................... 395/275 |
| 5,142,683 A | 8/1992 | Burkhardt, Jr. et al. ...... 395/725 |
| 5,144,556 A | 9/1992 | Wang et al. .............. 395/145 X |
| 5,151,988 A | 9/1992 | Yamagishi .................... 395/600 |
| 5,155,678 A | 10/1992 | Fukumoto et al. ............ 395/425 |
| 5,155,810 A | 10/1992 | McNamara et al. .......... 395/270 |
| 5,155,854 A | 10/1992 | Flynn et al. ................... 395/725 |
| 5,157,667 A | 10/1992 | Carusone, Jr. et al. ....... 371/29.1 |
| 5,161,227 A | 11/1992 | Dias et al. ..................... 395/650 |
| 5,163,055 A | 11/1992 | Lee et al. ........................ 371/32 |
| 5,163,148 A | 11/1992 | Walls ............................ 395/600 |
| 5,163,149 A | 11/1992 | Brantley ....................... 395/650 |
| 5,170,472 A | 12/1992 | Cwiakala et al. ............. 395/275 |
| 5,170,480 A | 12/1992 | Mohan et al. ................. 395/600 |
| 5,175,837 A | 12/1992 | Arnold et al. ................. 395/425 |
| 5,175,849 A | 12/1992 | Schneider ..................... 395/600 |
| 5,175,851 A | 12/1992 | Johnson et al. .......... 364/DIG. 1 |
| 5,179,665 A | 1/1993 | Roslund et al. ............... 395/250 |
| 5,179,702 A | 1/1993 | Spix et al. ..................... 395/650 |
| 5,187,790 A | 2/1993 | East et al. ................. 364/DIG. 1 |
| 5,191,651 A | 3/1993 | Halim et al. .................. 395/200 |
| 5,191,989 A | 3/1993 | Butler ........................... 395/600 |
| 5,193,152 A | 3/1993 | Smith ............................ 395/200 |
| 5,193,168 A | 3/1993 | Corrigan et al. .............. 395/425 |
| 5,193,171 A | 3/1993 | Shinmura et al. ............. 395/425 |
| 5,195,085 A | 3/1993 | Bertsch et al. .................. 370/13 |
| 5,197,069 A | 3/1993 | Cook et al. ........................ 371/7 |
| 5,197,146 A | 3/1993 | LaFetra ........................ 395/425 |
| 5,201,040 A | 4/1993 | Wada et al. ................... 395/400 |
| 5,201,044 A | 4/1993 | Frey, Jr. et al. ................ 395/575 |
| 5,202,887 A | 4/1993 | Ueno et al. ......................... 714/5 |
| 5,202,971 A | 4/1993 | Henson et al. ............ 364/DIG. 1 |
| 5,202,998 A | 4/1993 | Yanes ............................ 395/725 |
| 5,204,949 A | 4/1993 | Yasue et al. ................ 395/200.2 |
| 5,204,950 A | 4/1993 | Kawashima .................. 395/200 |
| 5,206,936 A | 4/1993 | Holland et al. ................ 395/309 |
| 5,210,861 A | 5/1993 | Shimoda et al. ......... 395/183.08 |
| 5,218,697 A | 6/1993 | Chung ........................... 395/650 |
| 5,220,654 A | 6/1993 | Benson et al. ................ 395/275 |
| 5,220,657 A | 6/1993 | Bly et al. .................. 364/DIG. 1 |
| 5,220,663 A | 6/1993 | Bauchot et al. ............... 395/575 |
| 5,222,238 A | 6/1993 | Zobre et al. .............. 364/DIG. 1 |
| 5,224,205 A | 6/1993 | Dinkin et al. ................. 395/200 |
| 5,226,145 A | 7/1993 | Moronaga et al. ............ 711/202 |
| 5,226,159 A | 7/1993 | Henson et al. ................ 395/650 |

| Patent | Date | Inventor | Class |
|---|---|---|---|
| 5,230,070 A | 7/1993 | Liu | 395/425 |
| 5,245,616 A | 9/1993 | Olson | 371/32 |
| 5,247,616 A | 9/1993 | Berggren | 395/200.08 |
| 5,253,344 A | 10/1993 | Bostick et al. | 395/275 |
| 5,255,372 A | 10/1993 | Butter et al. | 395/309 |
| 5,257,379 A | 10/1993 | Cwiakala et al. | 395/700 |
| 5,257,384 A | 10/1993 | Farrand et al. | 395/725 |
| 5,261,097 A | 11/1993 | Saxon | 395/650 |
| 5,265,235 A | 11/1993 | Sindhu et al. | 395/447 |
| 5,267,240 A | 11/1993 | Bartow et al. | 371/1 |
| 5,271,000 A | 12/1993 | Engbersen et al. | 370/13 |
| 5,274,809 A | 12/1993 | Iwasaki et al. | 709/5 |
| 5,276,823 A | 1/1994 | Cutts, Jr. et al. | 395/575 |
| 5,276,848 A | 1/1994 | Gallagher et al. | 395/448 |
| 5,276,901 A | 1/1994 | Howell et al. | 364/DIG. 1 |
| 5,278,958 A | 1/1994 | Dewa | 395/275 |
| 5,280,611 A | 1/1994 | Mohan et al. | 395/600 |
| 5,283,830 A | 2/1994 | Hinsley et al. | 380/25 |
| 5,287,473 A | 2/1994 | Mohan et al. | 711/133 |
| 5,289,470 A | 2/1994 | Chang et al. | 711/173 |
| 5,291,593 A | 3/1994 | Abraham et al. | 395/600 |
| 5,293,631 A | 3/1994 | Rau et al. | 395/700 |
| 5,295,258 A | 3/1994 | Jewett et al. | 395/575 |
| 5,295,262 A | 3/1994 | Seigh, II | 709/1 |
| 5,297,262 A | 3/1994 | Cox et al. | 395/311 |
| 5,301,326 A | 4/1994 | Linnett et al. | 395/700 |
| 5,305,448 A | 4/1994 | Insalaco et al. | 395/425 |
| 5,309,352 A | 5/1994 | Stubbs | 364/140 |
| 5,313,588 A | 5/1994 | Nagashige et al. | 395/275 |
| 5,313,609 A | 5/1994 | Baylor et al. | 395/448 |
| 5,313,636 A | 5/1994 | Noble et al. | 395/700 |
| 5,317,716 A | 5/1994 | Liu | 395/471 |
| 5,317,739 A | 5/1994 | Elko et al. | 395/650 |
| 5,325,492 A | 6/1994 | Bonevento et al. | 395/200.08 |
| 5,327,560 A | 7/1994 | Hirata et al. | 395/700 |
| 5,327,570 A | 7/1994 | Foster et al. | 395/200.43 |
| 5,329,619 A | 7/1994 | Pagé et al. | 395/200 |
| 5,331,673 A | 7/1994 | Elko et al. | 395/575 |
| 5,333,311 A | 7/1994 | Whipple, II | 395/600 |
| 5,339,405 A | 8/1994 | Elko et al. | 395/575 |
| 5,339,427 A | 8/1994 | Elko et al. | 395/725 |
| 5,343,461 A | 8/1994 | Barton et al. | 370/13 |
| 5,345,590 A | 9/1994 | Ault et al. | 395/650 |
| 5,355,126 A | 10/1994 | Nelson et al. | 340/825.44 |
| 5,355,477 A | 10/1994 | Strickland et al. | 707/8 |
| 5,357,608 A | 10/1994 | Bartow et al. | 395/200.1 |
| 5,363,484 A | 11/1994 | Desnoyers et al. | 395/200.42 |
| 5,371,883 A | 12/1994 | Gross et al. | 714/38 |
| 5,375,233 A | 12/1994 | Kimber et al. | 395/621 |
| 5,377,337 A | 12/1994 | Antonini et al. | 395/670 |
| 5,386,512 A | 1/1995 | Crisman et al. | 395/200.58 |
| 5,386,546 A | 1/1995 | Hamaguchi | 395/425 |
| 5,388,266 A | 2/1995 | Frey et al. | 395/700 |
| 5,390,328 A | 2/1995 | Frey et al. | 395/683 |
| 5,392,397 A | 2/1995 | Elko et al. | 395/200 |
| 5,394,542 A | 2/1995 | Frey et al. | 714/43 |
| 5,394,554 A | 2/1995 | Elko et al. | 395/800 |
| 5,394,555 A | 2/1995 | Hunter et al. | 395/800 |
| 5,398,331 A | 3/1995 | Huang et al. | 395/575 |
| 5,405,795 A | 4/1995 | Beyer et al. | 437/41 |
| 5,410,655 A | 4/1995 | Greenfield et al. | 395/825 |
| 5,410,691 A | 4/1995 | Taylor | 395/600 |
| 5,410,695 A | 4/1995 | Frey et al. | 395/650 |
| 5,410,697 A | 4/1995 | Baird et al. | 395/650 |
| 5,412,803 A | 5/1995 | Bartow et al. | 395/200.01 |
| 5,434,975 A | 7/1995 | Allen | 395/200 |
| 5,442,749 A | 8/1995 | Northcutt et al. | 709/219 |
| 5,442,785 A | 8/1995 | Roffe et al. | 395/650 |
| 5,450,590 A | 9/1995 | Elko et al. | 395/700 |
| 5,455,831 A | 10/1995 | Bartow et al. | 371/1 |
| 5,455,942 A | 10/1995 | Mohan et al. | 395/600 |
| 5,457,793 A | 10/1995 | Elko et al. | 395/600 |
| 5,463,736 A | 10/1995 | Elko et al. | 395/848 |
| 5,465,359 A | 11/1995 | Allen et al. | 395/700 |
| 5,481,707 A | 1/1996 | Murphy, Jr. | 395/672 |
| 5,490,152 A | 2/1996 | Gregg et al. | 371/32 |
| 5,493,668 A | 2/1996 | Elko et al. | 395/457 |
| 5,502,840 A | 3/1996 | Barton | 710/200 |
| 5,504,857 A | 4/1996 | Baird et al. | 395/182.04 |
| 5,506,956 A | 4/1996 | Cohen | 395/182.04 |
| 5,509,122 A | 4/1996 | Bartow et al. | 395/200.15 |
| 5,515,499 A | 5/1996 | Allen et al. | 395/182.03 |
| 5,515,538 A | 5/1996 | Kleiman | 710/260 |
| 5,530,844 A | 6/1996 | Phillips et al. | 395/200.08 |
| 5,535,375 A | 7/1996 | Eshel et al. | 395/500 |
| 5,537,574 A | 7/1996 | Elko et al. | 395/468 |
| 5,544,345 A | 8/1996 | Carpenter et al. | 395/477 |
| 5,546,534 A | 8/1996 | Malcolm | 395/182.04 |
| 5,546,579 A | 8/1996 | Josten et al. | 707/8 |
| 5,553,267 A | 9/1996 | Herlihy | 395/474 |
| 5,561,809 A | 10/1996 | Elko et al. | 395/800 |
| 5,564,040 A | 10/1996 | Kubala | 711/173 |
| 5,566,319 A | 10/1996 | Lenz | 395/474 |
| 5,572,678 A | 11/1996 | Homma et al. | 395/200.57 |
| 5,574,849 A | 11/1996 | Sonnier et al. | 395/182.1 |
| 5,574,945 A | 11/1996 | Elko et al. | 395/825 |
| 5,577,211 A | 11/1996 | Annapareddy et al. | 395/200.13 |
| 5,579,503 A | 11/1996 | Osborne | 711/119 |
| 5,581,705 A | 12/1996 | Passint et al. | 395/200.3 |
| 5,581,737 A | 12/1996 | Dahlen et al. | 395/497.01 |
| 5,592,628 A | 1/1997 | Ueno et al. | 395/200.3 |
| 5,604,487 A | 2/1997 | Frymier | 340/825.07 |
| 5,604,863 A | 2/1997 | Allen et al. | 395/182.09 |
| 5,608,865 A | 3/1997 | Midgely et al. | 395/180 |
| 5,613,068 A | 3/1997 | Gregg et al. | 395/200.13 |
| 5,629,948 A | 5/1997 | Hagiwara et al. | 371/32 |
| 5,630,050 A | 5/1997 | Neuhard et al. | 395/183.03 |
| 5,634,072 A | 5/1997 | Allen et al. | 396/674 |
| 5,659,690 A | 8/1997 | Stuber et al. | 395/309 |
| 5,664,155 A | 9/1997 | Elko et al. | 711/170 |
| 5,666,532 A | 9/1997 | Saks et al. | 395/621 |
| 5,669,002 A | 9/1997 | Buch | 395/726 |
| 5,689,689 A | 11/1997 | Meyers et al. | 395/553 |
| 5,694,342 A | 12/1997 | Stein | 364/572 |
| 5,699,500 A | 12/1997 | Dasgupta | 395/180 |
| 5,706,432 A | 1/1998 | Elko et al. | 395/200.08 |
| 5,708,769 A | 1/1998 | Stallmo | 395/182.04 |
| 5,712,856 A | 1/1998 | Finney et al. | 371/20.1 |
| 5,734,909 A | 3/1998 | Bennett | 395/726 |
| 5,737,600 A | 4/1998 | Geiner et al. | 395/616 |
| 5,742,830 A | 4/1998 | Elko et al. | 395/738 |
| 5,751,955 A | 5/1998 | Sonnier et al. | 395/200.19 |
| 5,751,992 A | 5/1998 | Bhargava et al. | 711/130 |
| 5,754,771 A | 5/1998 | Epperson et al. | 709/203 |
| 5,757,297 A | 5/1998 | Ferraiolo et al. | 341/100 |
| 5,761,739 A | 6/1998 | Elko et al. | 711/171 |
| 5,764,890 A | 6/1998 | Glasser et al. | 713/202 |
| 5,790,776 A | 8/1998 | Sonnier et al. | 395/189.08 |
| 5,813,032 A | 9/1998 | Bhargava et al. | 711/130 |
| 5,832,484 A | 11/1998 | Sankaran et al. | 707/8 |
| 5,835,906 A | 11/1998 | Hagersten et al. | 707/8 |
| 5,838,994 A | 11/1998 | Valizadeh | 710/112 |
| 5,848,295 A | 12/1998 | Anderson et al. | 710/7 |
| 5,860,115 A | 1/1999 | Neuhard et al. | 711/147 |
| 5,864,542 A | 1/1999 | Gupta et al. | 370/257 |
| 5,870,764 A | 2/1999 | Lo et al. | 707/203 |
| 5,875,484 A | 2/1999 | Neuhard et al. | 711/167 |
| 5,881,238 A | 3/1999 | Aman et al. | 395/200.56 |
| 5,887,135 A | 3/1999 | Dahlen et al. | 395/200.8 |
| 5,892,970 A | 4/1999 | Hagersten | 395/825 |
| 5,909,437 A | 6/1999 | Rhodes et al. | 370/349 |
| 5,911,044 A | 6/1999 | Lo et al. | 709/203 |
| 5,918,229 A | 6/1999 | Davis et al. | 707/10 |
| 5,920,093 A | 7/1999 | Huang et al. | 257/347 |
| 5,923,890 A | 7/1999 | Kubala et al. | 395/800.01 |
| 5,930,704 A | 7/1999 | Kay | 455/419 |
| 5,933,598 A | 8/1999 | Scales et al. | 709/216 |
| 5,938,786 A | 8/1999 | Gregg | 714/748 |
| 5,944,797 A | 8/1999 | Gregg et al. | 709/237 |
| 5,948,060 A | 9/1999 | Gregg et al. | 709/212 |
| 5,953,522 A | 9/1999 | Fox et al. | 395/681 |
| 5,956,712 A | 9/1999 | Bennett et al. | 707/8 |
| 5,974,544 A | 10/1999 | Jeffries et al. | 713/1 |
| 5,982,873 A | 11/1999 | Flockhart et al. | |
| 5,987,550 A | 11/1999 | Shagam | 710/119 |
| 5,991,893 A | 11/1999 | Snider | 714/4 |
| 6,026,464 A | 2/2000 | Cohen | 711/5 |
| 6,061,807 A | 5/2000 | Albert et al. | 714/3 |

| | | | | | | | |
|---|---|---|---|---|---|---|---|
| 6,080,203 | A | 6/2000 | Njinda et al. ............... 716/4 | JP | 01300366 | A | 12/1989 |
| 6,088,764 | A | 7/2000 | Shyam et al. ............... 711/112 | JP | 02151955 | A | 6/1990 |
| 6,112,323 | A | 8/2000 | Meizlik et al. ............... 714/748 | JP | 02156748 | A | 6/1990 |
| 6,148,412 | A | 11/2000 | Cannon ............... 714/6 | JP | 02162439 | A | 6/1990 |
| 6,154,091 | A | 11/2000 | Pennings et al. ............... 327/565 | JP | 02189670 | A2 | 7/1990 |
| 6,158,031 | A | 12/2000 | Mack et al. ............... 714/724 | JP | 02242364 | A2 | 9/1990 |
| 6,170,045 | B1 | 1/2001 | Bobak et al. ............... 711/169 | JP | 002287666 | A | 11/1990 |
| 6,177,708 | B1 | 1/2001 | Kuang et al. ............... 257/347 | JP | 03161859 | A2 | 11/1990 |
| 6,178,421 | B1 | 1/2001 | Dahlen et al. ............... 707/8 | JP | 03068034 | A | 3/1991 |
| 6,189,111 | B1 | 2/2001 | Alexander et al. ............... 714/7 | JP | 03074760 | A2 | 3/1991 |
| 6,199,144 | B1 | 3/2001 | Arora et al. ............... 711/145 | JP | 0311064 | A | 5/1991 |
| 6,199,179 | B1 | 3/2001 | Kauffman et al. ............... 714/11 | JP | 03130834 | A | 6/1991 |
| 6,230,243 | B1 | 5/2001 | Elko et al. ............... 711/130 | JP | 03182939 | A2 | 8/1991 |
| 6,233,644 | B1 | 5/2001 | Dahlen et al. ............... 710/200 | JP | 03220661 | A | 9/1991 |
| 6,237,000 | B1 | 5/2001 | Dahlen et al. ............... 707/100 | JP | 03232052 | A | 10/1991 |
| 6,237,108 | B1 | 5/2001 | Ogawa et al. ............... 714/6 | JP | 03241440 | A | 10/1991 |
| 6,266,783 | B1 | 7/2001 | Allen et al. ............... 714/5 | JP | 03246656 | A | 11/1991 |
| 6,275,935 | B1 | 8/2001 | Barlow et al. ............... 713/182 | JP | 03265045 | A | 11/1991 |
| 6,324,570 | B1 | 11/2001 | Tonchev et al. | JP | 03278259 | A | 12/1991 |
| 6,377,972 | B1 | 4/2002 | Guo et al. | JP | 04004454 | A2 | 1/1992 |
| 6,378,052 | B1 | 4/2002 | Genduso et al. | JP | 04023160 | A | 1/1992 |
| 6,396,806 | B1 | 5/2002 | Horita ............... 370/227 | JP | 04127261 | A | 4/1992 |
| 6,412,049 | B1 | 6/2002 | Baxter et al. | JP | 04151751 | A | 5/1992 |
| 6,438,654 | B1 | 8/2002 | Elko et al. ............... 711/133 | JP | 04190436 | A | 7/1992 |
| 6,442,594 | B1 | 8/2002 | Ouchi | JP | 04216158 | A2 | 8/1992 |
| 6,477,522 | B1 | 11/2002 | Young | JP | 04229355 | A2 | 8/1992 |
| 6,529,995 | B1 | 3/2003 | Shepherd ............... 711/114 | JP | 04246731 | A | 9/1992 |
| 6,539,495 | B1 | 3/2003 | Elko et al. ............... 714/5 | JP | 04370849 | | 12/1992 |
| 6,546,414 | B1 | 4/2003 | Dahlen et al. ............... 709/201 | WO | WO91/03788 | | 3/1991 |
| 6,567,865 | B1 | 5/2003 | Araki et al. ............... 710/36 | WO | WO91/20042 | | 12/1991 |
| 6,584,554 | B1 | 6/2003 | Dahlen et al. ............... 711/170 | WO | WO9423367 | | 10/1994 |
| 6,594,667 | B2 | 7/2003 | Dahlen et al. ............... 707/101 | | | | |
| 6,609,214 | B1 | 8/2003 | Dahlen et al. ............... 714/5 | | | | |
| 6,633,916 | B2 | 10/2003 | Kauffman ............... 709/229 | | | | |
| 6,681,254 | B1 | 1/2004 | Gregg et al. ............... 709/232 | | | | |
| 6,693,880 | B2 | 2/2004 | Gregg et al. ............... 370/235 | | | | |
| 6,715,037 | B2 | 3/2004 | Malcolm ............... 711/119 | | | | |
| 6,775,242 | B2 | 8/2004 | Grilli et al. | | | | |
| 6,779,180 | B1 | 8/2004 | Palm | | | | |
| 6,813,726 | B2 | 11/2004 | Dahlen et al. ............... 714/6 | | | | |
| 6,822,754 | B1 | 11/2004 | Shiohara | | | | |
| 6,859,866 | B2 | 2/2005 | Dahlen et al. ............... 711/168 | | | | |
| 6,910,158 | B2 | 6/2005 | Jones et al. ............... 714/38 | | | | |
| 6,944,787 | B2 | 9/2005 | Allen et al. ............... 714/4 | | | | |
| 6,954,817 | B2 | 10/2005 | Brooks et al. ............... 710/306 | | | | |
| 7,099,935 | B2 | 8/2006 | Jordan et al. ............... 709/223 | | | | |
| 2003/0159085 | A1* | 8/2003 | Allen et al. ............... 714/15 | | | | |
| 2003/0163560 | A1* | 8/2003 | Allen et al. ............... 709/223 | | | | |

FOREIGN PATENT DOCUMENTS

| | | | |
|---|---|---|---|
| EP | 0348654 | | 1/1990 |
| EP | 0426189 | A3 | 2/1990 |
| EP | 0375892 | | 7/1990 |
| EP | 0426323 | A3 | 10/1990 |
| EP | 0398523 | | 11/1990 |
| EP | 0465847 | | 6/1991 |
| EP | 0438020 | A2 | 7/1991 |
| EP | 0528617 | A2 | 2/1993 |
| EP | 0563620 | A3 | 2/1996 |
| EP | 817095 | | 1/1998 |
| EP | 0854519 | A1 | 7/1998 |
| EP | 950954 | | 10/1999 |
| EP | 0989613 | A1 | 3/2000 |
| FR | 2404970 | | 6/1979 |
| GB | 2037037 | | 7/1980 |
| JP | 54091156 | A | 7/1979 |
| JP | 57137936 | | 8/1982 |
| JP | 58115568 | A | 7/1983 |
| JP | 60189554 | A2 | 9/1985 |
| JP | 61020148 | A | 1/1986 |
| JP | 61195443 | A2 | 8/1986 |
| JP | 62085372 | A | 4/1987 |
| JP | 62-185424 | A | 8/1987 |
| JP | 62185424 | A | 8/1987 |
| JP | 62197858 | A | 9/1987 |
| JP | 62200449 | A2 | 9/1987 |
| JP | 62281050 | A | 12/1987 |
| JP | 01175342 | A | 7/1989 |
| JP | 01251267 | A | 10/1989 |

OTHER PUBLICATIONS

Tim R. Norton, R., "Modeling Distributed Transaction Response Times", CMG95, session 352, Dec. 5, 1995, pp. 1-10.

Erhard Rahm, "Evaluation of Closely Coupled Systems for High Performance Database Processing", Distributed Coupling System Proceedings, 13$^{th}$ International Conference, May 1993, pp. 301-310.

Dejan Milojicic et al., "Global Memory Management for a Multi Computer System", 12 pages.

John S. Clements, "Sysplex Management: Part I, Sysplex-Enabled Tools Vs. Traditional Tools", Apr. 97, Technical Support, 3 pages.

Michael M. Dupas et al., "Making The Transition To Parallel Sysplex At Boeing: Part II-CMOS Technology", Technical Support, Feb. 1996, 4 pages.

Leonidas Kontothanassis et al., "VM-Based Shared Memory On Low-Latency, Remote-Memory Access Networks", Proceedings of the Twenty-Fourth International Symposium on Computer Architecture, Denver, Jun. 1997, pp. 1-13.

Michael Woodacre et al., The SGI Altix 3000 Global Shared Memory Architecture, White Paper 2003, pp. 1-10.

HS Shahhoseini et al., "Shared Memory Multistage Clustering Structure: An Efficient Structure For Massively Parallel Processing Systems", pp. 1-6.

K.H. Kim et al., "Structure Of An Efficient Duplex Memory For Processing Fault-Tolerant Programs", pp. 121-138.

Trishul M. Chilimbi et al., "Cache-Conscious Structure Layout", Conference on Programming Language Design and Implementation Proceedings of the ACM SIGPLAN 1999, 1-12.

DFSMS/MVS 1.1 Storage Administration Reference for DFP, IBM Publication No. SC26-4920, Chapters 2, 11 and 15.

Li, Kai et al., "Memory Coherence in Shared Virtual Memory Systems", ACM Transactions on Computer Systems, New York, U.S., Nov. 1989, vol. 7, No. 4, pp. 321-359.

Office Action for U.S. Appl. No. 09/968,248 dated Feb. 9, 2005.

Final Office Action for U.S. Appl. No. 09/968,248 dated Jun. 14, 2005.

Office Action for U.S. Appl. No. 10/140,622 dated Sep. 5, 2006.

Office Action for U.S. Appl. No. 10/140,622 dated Jan. 11, 2007.

Office Action for U.S. Appl. No. 11/301,725 dated Dec. 9, 2008.

Final Office Action for U.S. Appl. No. 11/301,726 dated Apr. 7, 2009.

Communication pursuant to Article 96(2) and Rule 51(2) EPC for Application No. 93 103 643.8-2212 dated Mar. 15, 1999.

Communication pursuant to Article 96(2) and Rule 51(2) EPC for Application No. 93 103 646.1-2201 dated Sep. 22, 1997.

Communication pursuant to Article 96(2) and Rule 51(2) EPC for Application No. 93 103 646.1-2201 dated Apr. 6, 1998.
Communication pursuant to Article 96(2) and Rule 51(2) EPC for Application No. 93 103 645.3-2201 dated Oct. 16, 1997.
Communication pursuant to Article 96(2) and Rule 51(2) EPC for Application No. 93 103 645.3-2201 dated Apr. 24, 2008.
Communication pursuant to Article 96(2) and Rule 51(2) EPC for Application No. 93 103 644.6-2201 dated Nov. 5, 1997.
Communication pursuant to Article 96(2) and Rule 51(2) EPC for Application No. 93 103 644.6-2201 dated Jun. 2, 1998.
Communication pursuant to Article 96(2) and Rule 51(2) EPC for Application No. 93 103 644.6-2201 dated Nov. 6, 1998.
Communication pursuant to Article 96(2) and Rule 51(2) EPV for Application No. 93 103 644.6-2201 dated May 14, 1999.
PC Tools Version 7 for DOS: Data Recovery and System Utilities, Central Point Software, pp. 159-170.
Using, Enterprise Systems Connection Directors, GA23-0354-1.
Systems Network Architecture, Technical Overview, GC30-3073-3.
Stevens Advanced Programming in the UNIX Environment, Addison-Wesley Publishing Company, Inc. at chapter 14.
Richter, Advanced Windows NT: The Developers' Guide to the Win32 Application Programming Interface, Microsoft Press, 1994, Chapter 5.
MVS/ESA System Commands, IBM Publication No. GC28-1626-03, pp. 4-19 through 4-30, 4-131 through 4-134 and 4-227 through 4-268.
MVS/ESA Application Development Reference: Services For Authorized Assembler Language Programs, IBM Publication No. GC28-1649, pp. 189-209.
MVS/ESA Application Development Reference: Services For Authorized Assembler Language Programs, IBM Publication No. GC28-1650, pp. 17-25.
IBM Technical Disclosure Bulletin, vol. 24, No. 5, Oct. 1981, pp. 2404-2406.
Smart Modem Interface for Bigger Computers, News Release, p. 11, Sep. 25, 1986.
Ron Carnahan, "New Twists in Error Recovery", Systems Integration, Dec. 1989, p. 31.
John R. Rymer, "VNIX OLTP Getting Ready for Commercial Prime Time, Seybold's Unix in the Office", Aug. 1990, p. 1.
Geake, "Mainframe matters". Electronics Weekly, n1522, p. 10(I). Sep. 12, 1990.
"IBMSystem/390 Principles of Operation,"Form No. SA22-7201-00 (1990).
David Strom, "Solving Problems in LAN Paradise", Network Computing, p. 41, Sep. 1991.
Elko et al., Specification and Drawings of Co-pending U.S. Appl. No. 08/147,697, Nov. 4, 1993.
X/Open CAE Specification, System Interfaces and Headers, Issue 4, Version 2, Sep. 1994, at 37.
"Enterprise Systems Architecture/390 Principles of Operation" IBM Publication SA22-7201-02, Dec. 1994.
Kazama et al., "Novel Packet Transmission Scheme for Personal Communication Systems", 1994 Third Annual International Conference on Universal Personal Communications. Record (Cat. No. 94$^{TH}$0622-1) pp. 516-520, Sep. 1994.
"Processor Resource/Systems Manager Planning Guide" IBM Publication, GA22-7236-01, Jun. 1997.
Rochkind, Mark J., Advanced Unix Programming, 1985, pp. 7-9, 42-53, 92-202.
Curtis, Informix-Turbo, CompCon Spring '88 IEEE Computer Society International Conference, 1988, pp. 422-425.
Schoeffler, J. "A Real-Time Programming Event Monitor" IEEE Trans. Education, pp. 245-250, 1988.
Fleisch, B.D., "Reliable Distributed Shared Memory", IEEE Workshop on Experimental Distributed Systems, pp. 102-105 (1990).
Disclosed Anonymously—"Merge Overlap Writes in Disk Controller," Research Disclosure 31413, p. 463, Jun. 10, 1990.
Stone, Janice M., IEEE—Dec. 1990 "A Simple & Correct Shared-Queue Algorithm Using Compare-and-Swap", pp. 495-504.
Levy, Eliezer & Avi Silberschatz, "Incremental Recovery in Main Memory Database Systems", IEEE Transactions on Knowledge and Data Engineering, Dec. 1992, p. 529.
Oracle RDBMS Database Administrator's Guide Version 7.0, Developer's Release May 1992, pp. 1-14 to 1-26, 1-40 to 1-49, 2-5 to 2-6, 3-6, 3-12 to 3-14; Chapters 26 to 28; Appendix B1 to B5, C-25 to C-30, and E-21.
Helmbold, D. et al. "Determining Possible Event Orders by Analyzing Sequential Traces", IEEE Trans. Parallel Distributed Systems, pp. 827-840, 1993.
Levrouw, L. et al. "An Efficient Record-Replay Mechanism for Shared Memory Systems" IEEE Proc. Evromicro Workshop Par. Dist. Comp., pp. 169-176, 1993.
Scholten, H. et al. "A Debugging Tool for Distributed System" IEEE Tencon '93., pp. 173-176, 1993.
Baskey et al., "Highly Parallel Coupling Facility Emulator/Router with Shadowed Link Buffers," IBM Technical Disclosure Bulletin, vol. 39, No. 12, Dec. 1996, pp. 123-124.
Stone, H. S. et al., "Concurrent Algorithm for Managing a First-In. First Out Queue with Two-Way Painters", IBM Tech. Disclosure Bulletin, vol. 34, No. 6, Dec. 1991-pp. 80-88.
Dias, D. M. et al., "Token Ring-Based Distributed Lock Manager," IBM Technical Disclosure Bulletin, vol. 30, No. 7, Dec. 1987, pp. 263-266.
Beier, H. A. et al., "Shared Data Availability Across a System Failure," IBM Technical Disclosure Bulletin, vol. 28, No. 3, Aug. 1985, pp. 950-951.
Beier, H. A. et al., "IMS/VS Data Sharing Enhancements (Dynamic Reconfiguration to Initial State)," IBM Technical Disclosure Bulletin, vol. 27, No. 1A, Jun. 1984, pp. 338-342.
Murray, T. E. et al., "IMS/VS Data Sharing Enhancements (GHT Update Delay)," IBM Technical Disclosure Bulletin, vol. 25, No. 7B, Dec. 1982, pp. 3715-3717.
King, R. P. et al., "Overview of Disaster Recovery for Transaction Processing Systems," Distributed Computing Systems, May 28-Jun. 1, 1990, pp. 286-293 (Abstract Only).
Wu, K. L. et al., "Error Recovery In Shared Memory Multiprocessors Using Private Caches," Parallel and Distributed Systems, Apr. 1990, vol. 1, Issue 2, pp. 231-240 (Abstract Only).
Stumm, M. et al., "Fault Tolerant Distributed Shared Memory Algorithms," Parallel and Distributed Proceedings, Dec. 9-13, 1990, pp. 719-724 (Abstract Only).
Stone, Harold S., "High-Performance Computer Architecture", (Translation supervised by T. Saito, H. Hatta), pp. 24-102, Maruzen Company, LTD.
Office Action for U.S. Appl. No. 08/304,677 dated May 15, 1995.
Final Office Action for U.S. Appl. No. 08/304,677 dated Nov. 22, 1995.
Advisory Action for U.S. Appl. No. 08/304,677 dated Mar. 21, 1996.
Office Action for U.S. Patent No. 5,737,600 dated Jan. 14, 1997.
Notice of Allowance for U.S. Patent No. 5,737,600 dated Jul. 25, 1997.
Office Action for U.S. Patent No. 5,331,673 dated Aug. 13, 1993.
Notice of Allowance for U.S. Patent No. 5,331,673 dated Apr. 15, 1994.
Office Action for U.S. Patent No. 5,392,397 dated Jun. 29, 1993.
Office Action for U.S. Patent No. 5,392,397 dated Dec. 16, 1993.
Office Action for U.S. Patent No. 5,392,397 dated Jun. 13, 1994.
Notice of Allowance for U.S. Patent No. 5,392,397 dated Oct. 4, 1994.
Office Action for U.S. Patent No. 6,266,783 dated Jul. 31, 2000.
Office Action for U.S. Patent No. 6,266,783 dated Nov. 2, 2000.
Notice of Allowance for U.S. Patent No. 6,226,783 dated Mar. 12, 2001.
Office Action for U.S. Patent No. 5,450,590 dated Aug. 4, 1994.
Final Office Action for U.S. Patent No. 5,450,590 dated Dec. 23, 1994.
Advisory Action for U.S. Patent No. 5,450,590 dated Feb. 23, 1995.
Notice of Allowance for U.S. Patent No. 5,450,590 dated May 10, 1995.
Office Action for U.S. Patent No. 6,681,254 dated Dec. 20, 2000.
Interview Summary for U.S. Patent No. 6,681,254 dated Jan. 12, 2001.
Restriction Requirement for U.S. Patent No. 6,681,254 dated My 8, 2001.
Office Action for U.S. Patent No. 6,681,254 dated Aug. 13, 2001.
Final Office Action for U.S. Patent No. 6,681,254 dated Apr. 10, 2002.
Advisory Action for U.S. Patent No. 6,681,254 dated Jul. 3, 2002.

Notification of Non-Compliance for U.S. Patent No. 6,681,254 dated Jan. 3, 2003.
Notice of Allowance for U.S. Patent No. 6,681,254 dated Sep. 30, 2003.
Office Action for U.S. Appl. No. 08/146,635 dated Dec. 20, 1994.
Supplemental Office Action for U.S. Appl. No. 08/146,635 dated Dec. 27, 1994.
Interview Summary for U.S. Appl. No. 08/146,635 dated Mar. 8, 1995.
Final Office Action for U.S. Appl. No. 08/146,635 dated Jul. 19, 1995.
Interview Summary for U.S. Patent No. 5,515,499 dated Apr. 24, 1996.
Notice of Allowance for U.S. Patent No. 5,515,499 dated Dec. 26, 1995.
Office Action for U.S. Patent No. 5,604,863 dated Sep. 27, 1995.
Office Action for U.S. Patent No. 5,604,863 dated Mar. 19, 1996.
Notice of Allowance for U.S. Patent No. 5,604,863 dated Sep. 7, 1996.
Office Action for U.S. Patent No. 5,457,793 dated Mar. 9, 1994.
Office Action for U.S. Patent No. 5,457,793 dated Aug. 16, 1994.
Notice of Allowance for U.S. Patent No. 5,457,793 dated Apr. 18, 1995.
Office Action for U.S. Patent No. 5,339,405 dated Nov. 18, 1993.
Notice of Allowance for U.S. Patent No. 5,339,405 dated Apr. 1, 1994.
Office Action for U.S. Patent No. 5,761,739 dated Jan. 23, 1995.
Office Action for U.S. Patent No. 5,761,739 dated Nov. 30, 1995.
Office Action for U.S. Patent No. 5,761,739 dated May 16, 1996.
Final Office Action for U.S. Patent No. 5,761,739 dated Nov. 29, 1996.
Office Action for U.S. Patent No. 5,761,739 dated Jan. 9, 1997.
Notice of Allowance for U.S. Patent No. 5,761,739 dated Sep. 24, 1997.
Office Action for U.S. Appl. No. 07/860,655 dated Dec. 16, 1993.
Final Office Action for U.S. Appl. No. 07/860,655 dated Sep. 1, 1994.
Office Action for U.S. Patent No. 5,742,830 dated Apr. 4, 1995.
Final Office Action for U.S. Patent No. 5,742,830 dated Oct. 19, 1995.
Advisory Action for U.S. Patent No. 5,742,830 dated Feb. 6, 1996.
Office Action for U.S. Patent No. 5,742,830 dated Mar. 20, 1996.
Final Office Action for U.S. Patent No. 5,742,830 dated Sep. 13, 1996.
Office Action for U.S. Patent No. 5,742,830 dated Mar. 28, 1997.
Notice of Allowance for U.S. Patent No. 5,742,830 dated Oct. 27, 1997.
Office Action for U.S. Appl. No. 07/860,646 dated Jul. 20, 1993.
Final Office Action for U.S. Appl. No. 07/860,646 dated Apr. 22, 1994.
Office Action for U.S. Appl. No. 08/147,697 dated Jun. 15, 1994.
Final Office Action for U.S. Appl. No. 08/147,697 dated Dec. 29, 1994.
Advisory Acton for U.S. Appl. No. 08/147,697 dated Mar. 9, 1995.
Examiner's Answer for U.S. Appl. No. 08/147,697 dated Oct. 13, 1995.
Supplemental Examiner's Answer for U.S. Appl. No. 08/147,697 dated Jan. 24, 1996.
Notice of Abandonment for U.S. Appl. No. 08/147,697 dated Sep. 9, 1997.
Order Withdrawing Appeal for U.S. Appl. No. 08/147,697 dated Aug. 15, 1997.
Final Office Action for U.S. Appl. No. 08/148,075 dated Nov. 24, 1995.
Office Action for U.S. Patent No. 5,317,739 dated Jun. 24, 1993.
Notice of Allowance for U.S. Patent No. 5,317,739 dated Dec. 6, 1993.
Office Action for U.S. Patent No. 5,339,427 dated Feb. 18, 1993.
Office Action for U.S. Patent No. 5,339,427 dated Aug. 6, 1993.
Notice of Allowance for U.S. Patent No. 5,339,427 dated Feb. 9, 1994.
Notice of Allowance for U.S. Patent No. 5,463,736 dated Jun. 23, 1995.
Office Action for U.S. Patent No. 5,537,574 dated Jan. 21, 1994.
Office Action for U.S. Patent No. 5,537,574 dated May 6, 1994.
Office Action for U.S. Patent No. 5,537,574 dated Nov. 1, 1994.
Office Action for U.S. Patent No. 5,537,574 dated Jul. 25, 1995.
Notice of Allowance for U.S. Patent No. 5,537,574 dated Feb. 5, 1996.
Office Action for U.S. Patent No. 5,561,809 dated Jul. 27, 1995.
Notice of Allowance for U.S. Patent No. 5,561,809 dated Apr. 16, 1996.
Office Action for U.S. Patent No. 5,630,050 dated Nov. 13, 1995.
Final Office Action for U.S. Patent No. 5,630,050 dated Mar. 4, 1996.
Advisory Action for U.S. Patent No. 5,630,050 dated Jul. 15, 1996.
Notice of Allowance for U.S. Patent No. 5,630,050 dated Oct. 22, 1996.
Office Action for U.S. Patent No. 5,634,072 dated Aug. 7, 1996.
Notice of Allowance for U.S. Patent No. 5,634,072 dated Nov. 20, 1996.
Office Action for U.S. Patent No. 5,860,115 dated Sep. 2, 1997.
Office Action for U.S. Patent No. 5,706,432 dated Jan. 8, 1997.
Interview Summary for U.S. Patent No. 5,706,432 dated Apr. 25, 1997.
Notice of Allowance for U.S. Patent No. 5,706,432 dated Apr. 28, 1997.
Final Office Action for U.S. Patent No. 5,860,115 dated Mar. 16, 1998.
Notice of Allowance for U.S. Patent No. 5,860,115 dated Jul. 17, 1998.
Notice of Allowance for U.S. Patent No. 5,887,135 dated Sep. 29, 1998.
Supplemental of Notice of Allowance for U.S. Patent No. 5,887,135 dated Oct. 1, 1998.
Office Action for U.S. Patent No. 5,923,890 dated Aug. 13, 1998.
Notice of Allowance for U.S. Patent No. 5,923,890 dated Dec. 21, 1998.
Office Action for U.S. Patent No. 5,948,060 dated May 4, 1998.
Office Action for U.S. Patent No. 5,948,060 dated Oct. 29, 1998.
Notice of Allowance for U.S. Patent No. 5,948,060 dated Mar. 4, 1999.
Office Action for U.S. Patent No. 6,438,654 dated Sep. 29, 2000.
Office Action for U.S. Patent No. 6,438,654 dated Apr. 4, 2001.
Advisory Action for U.S. Patent No. 6,438,654 dated Jul. 13, 2001.
Office Action for U.S. Patent No. 6,438,654 dated Oct. 25, 2001.
Notice of Allowance for U.S. Patent No. 6,438,654 dated Apr. 9, 2002.
Office Action for U.S. Patent No. 6,539,495 dated Sep. 25, 2001.
Final Office Action for U.S. Patent No. 6,539,495 dated Jun. 4, 2002.
Advisory Action for U.S. Patent No. 6,539,495 dated Sep. 24, 2002.
Notice of Allowance for U.S. Patent No. 6,539,495 dated Oct. 24, 2002.
Office Action for U.S. Patent No. 6,546,414 dated Apr. 30, 2002.
Notice of Allowance for U.S. Patent No. 6,546,414 dated Oct. 16, 2002.
Office Action for U.S. Patent No. 6,584,554 dated May 23, 2002.
Final Office Action for U.S. Patent No. 6,584,554 dated Sep. 12, 2002.
Notice of Allowance for U.S. Patent No. 6,584,554 dated Jan. 29, 2003.
Office Action for U.S. Patent No. 6,594,667 dated Nov. 6, 2001.
Final Office Action for U.S. Patent No. 6,594,667 dated Apr. 5, 2002.
Advisory Action for U.S. Patent No. 6,594,667 dated Jul. 11, 2002.
Office Action for U.S. Patent No. 6,594,667 dated Aug. 8, 2002.
Notice of Allowance for U.S. Patent No. 6,594,667 dated Dec. 12, 2002.
Office Action for U.S. Patent No. 6,609,214 dated Dec. 2002.
Notice of Allowance for U.S. Patent No. 6,609,214 dated Mar. 18, 2003.
Office Action for U.S. Patent No. 5,493,668 dated Apr. 15, 1994.
Office Action for U.S. Patent No. 5,493,668 dated Aug. 22, 1994.
Office Action for U.S. Patent No. 5,493,668 dated Mar. 10, 1995.
Notice of Allowance for U.S. Patent No. 5,493,668 dated Sep. 19, 1995.
Hamacher, Carl V. et al., "Computer Organization," 1990, pp. 402-409 & 461-483.
"Enterprise Systems Architecture/390 ESCON Channel-to Channel Adapter," Document No. SA22-7203-00, Oct. 1990.

* cited by examiner

| MPID=X | MPS | MPRL | SYID | IID | SRCND |
|---|---|---|---|---|---|
| | A | N1 | SYSID1 | IID1 | EMPTY |
| | I | N2 | ZERO | ZERO | EMPTY |
| | • | • | • | • | • |
| | • | • | • | • | • |
| →  | A | NX | SYSIDX | IIDX | SRCNDX |
| | • | • | • | • | • |
| | • | • | • | • | • |
| | I | N(Z-1) | ZERO | ZERO | EMPTY |
| | I | NZ | SYSIDZ | IID2 | EMPTY |
| | • | • | • | • | • |
| | • | • | • | • | • |

EXPLANATION:

- A      MESSAGE PATH IS ACTIVE
- I      MESSAGE PATH IS INACTIVE
- SYSIDX      SYSTEM IDENTIFIER FOR MPID=X
- IIDX      IMAGE - IDENTIFICATION CODE FOR MPID=X
- SRCNDX      SOURCE NODE DESCRIPTOR FOR MPID=X
- EMPTY      SOURCE NODE DESCRIPTOR NOT PROVIDED
- Nx      REQUEST LEVEL FOR MPID=X

*fig. 5*

| RX | CSN | CSGX | SGP1 | SGP2 | SGP3 |
|---|---|---|---|---|---|
| 1 | $CSN_1$ | $CSGX_1$ | $SGP1,1$ | $SGP2,1$ | $SGP3,1$ |
| 2 | $CSN_2$ | $CSGX_2$ | $SGP1,2$ | $SGP2,2$ | $SGP3,2$ |
| ... | ... | ... | ... | ... | ... |
| RXL | $CSN_{RXL}$ | $CSGX_{RXL}$ | $SGP1,RXL$ | $SGP2,RXL$ | $SGP3,RXL$ |

602: RX
604: CSN, CSGX
606: SIGNALING VECTOR (SGP1, SGP2, SGP3)
600

*fig. 6*

DUPLEXING SIGNAL FORMAT

| REQUEST OPERAND | | ACRONYM |
|---|---|---|
| MESSAGE HEADER | | |
| COMMAND CODE | | CC |
| LIST-NOTIFICATION-ENTRY NUMBER | | LNEN |
| BITS: | | |
| 0-8 | ZERO | |
| 9-24 | DUPLEXING RETRY INDEX | DRX |
| 25 | ZERO | |
| 26-27 | DUP. SIGNAL GROUP INDEX | DSGX |
| 28 | ZERO | |
| 29-31 | DUPLEXING SIGNAL | DS |
| SIGNALING VECTOR TOKEN | | SVT |

*fig. 14*

CONTROLLING THE STATE OF DUPLEXING OF COUPLING FACILITY STRUCTURES

CROSS-REFERENCE TO RELATED APPLICATIONS

This application is a continuation of U.S. patent application Ser. No. 10/140,622, filed May 8, 2002, entitled "CONTROLLING THE STATE OF DUPLEXING OF COUPLING FACILITY STRUCTURES," which is a divisional of U.S. Pat. No. 7,013,305, issued Mar. 14, 2006, entitled "MANAGING THE STATE OF COUPLING FACILITY STRUCTURES, DETECTING BY ONE OR MORE SYSTEMS COUPLED TO THE COUPLING FACILITY, THE SUSPENDED STATE OF THE DUPLEXED COMMAND, DETECTING BEING INDEPENDENT OF MESSAGE EXCHANGE," each of which is hereby incorporated herein by reference in its entirety.

This application contains subject matter which is related to the subject matter of the following applications/patents, each of which is assigned to the same assignee as this application. Each of the below listed applications/patents is hereby incorporated herein by reference in its entirety:

"TEST TOOL AND METHODS FOR FACILITATING TESTING OF DUPLEXED COMPUTER FUNCTIONS", Jones et al., U.S. Pat. No. 6,910,158 B2, issued Jun. 21, 2005;

"RESTARTING A COUPLING FACILITY COMMAND USING A TOKEN FROM ANOTHER COUPLING FACILITY COMMAND", Elko et al., U.S. Pat. No. 6,813,726 B2, issued Nov. 2, 2004;

"DYNAMICALLY DETERMINING WHETHER TO PROCESS REQUESTS SYNCHRONOUSLY OR ASYNCHRONOUSLY", Jordan et al., U.S. Pat. No. 7,099,935, issued Aug. 29, 2006;

"COUPLING OF A PLURALITY OF COUPLING FACILITIES USING PEER LINKS", Brooks et al., U.S. Pat. No. 6,954,817, issued Oct. 11, 2005;

"SYNCHRONIZING PROCESSING OF COMMANDS INVOKED AGAINST DUPLEXED COUPLING FACILITY STRUCTURES", Elko et al., U.S. Pat. No. 6,859,866 B2, issued Feb. 22, 2005;

"SYSTEM-MANAGED DUPLEXING OF COUPLING FACILITY STRUCTURES", Allen et al., U.S. Pat. No. 6,944,787, issued Sep. 13, 2005;

"METHOD, SYSTEM AND PROGRAM PRODUCTS FOR PROVIDING USER-MANAGED DUPLEXING OF COUPLING FACILITY CACHE STRUCTURES", Elko et al., U.S. Pat. No. 6,539,495 B1, issued Mar. 25, 2003;

"CASTOUT PROCESSING FOR DUPLEXED CACHE STRUCTURES", Elko et al., U.S. Pat. No. 6,438,654 B1, issued Aug. 20, 2002;

"SYSTEM-MANAGED REBUILD OF COUPLING FACILITY STRUCTURES", Allen et al., U.S. Pat. No. 6,266,783, issued Jul. 24, 2001;

"METHOD, SYSTEM AND PROGRAM PRODUCTS FOR COPYING COUPLING FACILITY STRUCTURES", Dahlen et al., U.S. Pat. No. 6,609,214 B1, issued Aug. 19, 2003;

"METHOD, SYSTEM AND PROGRAM PRODUCTS FOR MODIFYING COUPLING FACILITY STRUCTURES", Dahlen et al., U.S. Pat. No. 6,594,667 B2, issued Jul. 15, 2003;

"DIRECTED ALLOCATION OF COUPLING FACILITY STRUCTURES", Dahlen et al., U.S. Pat. No. 6,584,554 B1, issued Jun. 24, 2003;

"METHOD, SYSTEM AND PROGRAM PRODUCTS FOR COPYING COUPLING FACILITY LOCK STRUCTURES", Dahlen et al., U.S. Pat. No. 6,546,414 B1, issued Apr. 8, 2003;

"METHOD OF CONTROLLING THE FLOW OF INFORMATION BETWEEN SENDERS AND RECEIVERS ACROSS LINKS BEING USED AS CHANNELS", Gregg et al. U.S. Pat. No. 6,681,254, issued Jan. 20, 2004;

"SYSTEM OF CONTROLLING THE FLOW OF INFORMATION BETWEEN SENDERS AND RECEIVERS ACROSS LINKS BEING USED AS CHANNELS", Gregg et al., Ser. No. 09/150,942, filed Sep. 10, 1998, Abandoned, Apr. 21, 2003;

"SYSTEM OF PERFORMING PARALLEL CLEANUP OF SEGMENTS OF A LOCK STRUCTURE LOCATED WITHIN A COUPLING FACILITY", Dahlen et al., U.S. Pat. No. 6,233,644 B1, issued May 15, 2001;

"MULTI CHANNEL INTER-PROCESSOR COUPLING FACILITY PROCESSING RECEIVED COMMANDS STORED IN MEMORY ABSENT STATUS ERROR OF CHANNELS", Elko et al., U.S. Pat. No. 5,574,945, issued Nov. 12, 1996;

"METHOD, SYSTEM AND PROGRAM PRODUCTS FOR MANAGING CHANGED DATA OF CASTOUT CLASSES", Elko et al., U.S. Pat. No. 6,230,243 B1, issued May 8, 2001;

"METHOD AND SYSTEM FOR CAPTURING AND CONTROLLING ACCESS TO INFORMATION IN A COUPLING FACILITY", Neuhard et al., U.S. Pat. No. 5,630,050, issued May 13, 1997;

"DYNAMICALLY ASSIGNING A DUMP SPACE IN A SHARED DATA FACILITY TO RECEIVE DUMPING INFORMATION TO BE CAPTURED", Elko et al., U.S. Pat. No. 5,664,155, issued Sep. 2, 1997;

"METHOD AND APPARATUS FOR DISTRIBUTED LOCKING OF SHARED DATA, EMPLOYING A CENTRAL COUPLING FACILITY", Elko et al., U.S. Pat. No. 5,339,427, issued Aug. 16, 1994;

"METHOD AND SYSTEM FOR LOG MANAGEMENT IN A COUPLED DATA PROCESSING SYSTEM", Geiner et al., U.S. Pat. No. 5,737,600, issued Apr. 7, 1998;

"METHOD OF PERFORMING PARALLEL CLEANUP OF SEGMENTS OF A LOCK STRUCTURE", Dahlen et al., U.S. Pat. No. 6,178,421 B1, issued Jan. 23, 2001;

"SPEEDING-UP COMMUNICATION RATES ON LINKS TRANSFERRING DATA STRUCTURES BY A METHOD OF HANDING SCATTER/GATHER OF STORAGE BLOCKS IN COMMANDED COMPUTER SYSTEMS", Gregg et al., U.S. Pat. No. 5,948,060, issued Sep. 7, 1999;

"METHOD OF MANAGING RESOURCES IN ONE OR MORE COUPLING FACILITIES COUPLED TO ONE OR MORE OPERATING SYSTEMS IN ONE OR MORE CENTRAL PROGRAMMING COMPLEXES USING A POLICY", Allen et al., U.S. Pat. No. 5,634,072, issued May 27, 1997;

"METHOD AND APPARATUS FOR OPTIMIZING THE HANDLING OF SYNCHRONOUS REQUESTS TO A COUPLING FACILITY IN A SYSPLEX CONFIGURATION", Kubala et al., U.S. Pat. No. 5,923,890, issued Jul. 13, 1999;

"METHOD FOR RECEIVING MESSAGES AT A COUPLING FACILITY", Elko et al., U.S. Pat. No. 5,706,432, issued Jan. 6, 1998;

"COMMAND EXECUTION SYSTEM FOR USING FIRST AND SECOND COMMANDS TO RESERVE AND STORE SECOND COMMAND RELATED STATUS

INFORMATION IN MEMORY PORTION RESPECTIVELY", Elko et al., U.S. Pat. No. 5,392,397, issued Feb. 21, 1995;

"SOFTWARE CACHE MANAGEMENT OF A SHARED ELECTRONIC STORE IN A SUPPLEX", Elko et al., U.S. Pat. No. 5,457,793, issued Oct. 10, 1995;

"REQUESTING A DUMP OF INFORMATION STORED WITHIN A COUPLING FACILITY, IN WHICH THE DUMP INCLUDES SERVICEABILITY INFORMATION FROM AN OPERATING SYSTEM THAT LOST COMMUNICATION WITH THE COUPLING FACILITY", Neuhard et al, U.S. Pat. No. 5,860,115, issued Jan. 12, 1999;

"AUTHORIZATION METHOD FOR CONDITIONAL COMMAND EXECUTION", Elko et al, U.S. Pat. No. 5,450,590, issued Sep. 12, 1995;

"IN A MULTIPROCESSING SYSTEM HAVING A COUPLING FACILITY, COMMUNICATING MESSAGES BETWEEN THE PROCESSORS AND THE COUPLING FACILITY IN EITHER A SYNCHRONOUS OPERATION OR AN ASYNCHRONOUS OPERATION", Elko et al., U.S. Pat. No. 5,561,809, issued Oct. 1, 1996;

"COUPLING FACILITY FOR RECEIVING COMMANDS FROM PLURALITY OF HOSTS FOR ACTIVATING SELECTED CONNECTION PATHS TO I/O DEVICES AND MAINTAINING STATUS THEREOF", Elko et al., U.S. Pat. No. 5,463,736, issued Oct. 31, 1995;

"METHOD AND SYSTEM FOR MANAGING DATA AND USERS OF DATA IN A DATA PROCESSING SYSTEM", Allen et al., U.S. Pat. No. 5,465,359, issued Nov. 7, 1995;

"METHODS AND SYSTEMS FOR CREATING A STORAGE DUMP WITHIN A COUPLING FACILITY OF A MULTISYSTEM ENVIRONMENT", Elko et al., U.S. Pat. No. 5,761,739, issued Jun. 2, 1998;

"METHOD AND APPARATUS FOR COUPLING DATA PROCESSING SYSTEMS", Elko et al., U.S. Pat. No. 5,317,739, issued May 31, 1994;

"METHOD AND APPARATUS FOR EXPANSION, CONTRACTION, AND REAPPORTIONMENT OF STRUCTURED EXTERNAL STORAGE STRUCTURES", Dahlen et al., U.S. Pat. No. 5,581,737, issued Dec. 3, 1996;

"SYSPLEX SHARED DATA COHERENCY METHOD", Elko et al., U.S. Pat. No. 5,537,574, issued Jul. 16, 1996;

"MULTIPLE PROCESSOR SYSTEM HAVING SOFTWARE FOR SELECTING SHARED CACHE ENTRIES ON AN ASSOCIATED CASTOUT CLASS FOR TRANSFER TO A DASD WITH ONE I/O OPERATION", Elko et al., U.S. Pat. No. 5,493,668, issued Feb. 20, 1996;

"INTEGRITY OF DATA OBJECTS USED TO MAINTAIN STATE INFORMATION FOR SHARED DATA AT A LOCAL COMPLEX", Elko et al., U.S. Pat. No. 5,331,673, issued Jul. 19, 1994;

"COMMAND QUIESCE FUNCTION", Elko et al., U.S. Pat. No. 5,339,405, issued Aug. 16, 1994;

"METHOD AND APPARATUS FOR PERFORMING CONDITIONAL OPERATIONS ON EXTERNALLY SHARED DATA", Elko et al., U.S. Pat. No. 5,742,830, issued Apr. 21, 1998;

"METHOD AND SYSTEM FOR RECONFIGURING A STORAGE STRUCTURE WITHIN A STRUCTURE PROCESSING FACILITY", Allen et al., U.S. Pat. No. 5,515,499, issued May 7, 1996;

"METHOD FOR COORDINATING EXECUTING PROGRAMS IN A DATA PROCESSING SYSTEM", Allen et al., U.S. Pat. No. 5,604,863, issued Feb. 18, 1997; and "SYSTEM AND METHOD FOR MANAGEMENT OF OBJECT TRANSITIONS IN AN EXTERNAL STORAGE FACILITY ACCESSED BY ONE OR MORE PROCESSORS", Dahlen et al., U.S. Pat. No. 5,887,135, issued Mar. 23, 1999.

TECHNICAL FIELD

This invention relates, in general, to data processing within a distributed computing environment, and in particular, to the duplexing of structures, such as structures of one or more coupling facilities.

BACKGROUND OF THE INVENTION

Some distributed computing environments, such as Parallel Sysplexes, today provide a non-volatile shared storage device called the coupling facility, that includes multiple storage structures of either the cache or list type. These structures provide unique functions for the operating system and middleware products employed for the efficient operation of a Parallel Sysplex. For example, the cache structures provide directory structures and cross-invalidation mechanisms to maintain buffer coherency for multisystem databases, as well as a fast write medium for database updates. These are used by, for instance, the data sharing versions of DB2 and IMS, offered by International Business Machines Corporation, Armonk, N.Y.

The list structures provide many diverse functions. One such list structure function is to provide for high-performance global locking, and this function is exploited by such products as the IMS Resource Lock Manager (IRLM) and the Global Resource Serialization (GRS) function in OS/390, offered by International Business Machines Corporation, Armonk, N.Y. Another list structure function is to provide a message passing mechanism with storage for maintaining multiple messages on a per system basis and a mechanism for notifying a system of the arrival of new messages. This function is exploited by the XCF component of OS/390, which in turn is exploited by numerous multisystem applications for providing a capability to pass messages between their various instances. A third list structure function is to provide for shared queue structures that can be ordered and accessed by LIFO/FIFO ordering, by key, or by name. Workload Manager (WLM), IMS Shared Message Queues and MQ Series, all offered by International Business Machines Corporation, Armonk, N.Y., are examples of exploiters of this feature. While these functions provide examples of the list structure uses, other uses exist.

Various components of a Parallel Sysplex have been documented in numerous applications/patents, which are listed above and hereby incorporated herein by reference in their entirety. The capabilities defined in some of those patents provide the basic system structure to create and manage cache and list structure instances. Additionally, various of the applications/patents listed above provide extensions to the base functions of the Parallel Sysplex.

In many situations, a failure of the coupling facility that contains various structures requires significant recovery actions to be taken by the owning applications. For example, for database caches and queues, this may require using backup log data sets and/or tapes. This is a time-consuming process that results in a loss of access to the application during the recovery operation. Other structures, such as lock tables, may require reconstruction of partial lock tables from in-storage copies, along with failures of in-flight transactions. Still other structures, such as message-passing structures, may lose all data and require re-entry from the application. So, there is a proliferation of diverse recovery schemes with different recovery times and impacts. Moreover, since the failure of a coupling facility results in all resident structures failing, the diverse recovery actions are occurring concurrently, which can cause serious disruptions in the Parallel Sysplex.

Thus, a need exists for a configuration of a Parallel Sysplex that provides less disruptions. In particular, a need exists for a high-availability coupling facility, which improves on the recovery times and impacts of existing recovery techniques, while also provides for a consistent recovery design across various structure types. As a particular example, a need exists for one or more capabilities that facilitate duplexing of structures in separate coupling facilities coupled to one another.

SUMMARY OF THE INVENTION

The shortcomings of the prior art are overcome and additional advantages are provided through the provision of a method of controlling the state of duplexing of coupling facility structures in view of connection failures. The method includes, for instance, detecting that a connection between a first coupling facility having a first instance of a coupling facility structure and a second coupling facility having a second instance of the coupling facility structure has failed; determining whether another connection exists between the first coupling facility and the second coupling facility; and managing a state of duplexing of the coupling facility structure, in response to the determining.

System and computer program products corresponding to the above-summarized methods are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

FIG. 5 depicts one embodiment of a message-path status vector, in accordance with an aspect of the present invention;

FIG. 6 depicts one embodiment of a signaling vector, in accordance with an aspect of the present invention;

FIG. 14 depicts one example of a duplexing signal format, in accordance with an aspect of the present invention;

BEST MODE FOR CARRYING OUT THE INVENTION

Figure 1:
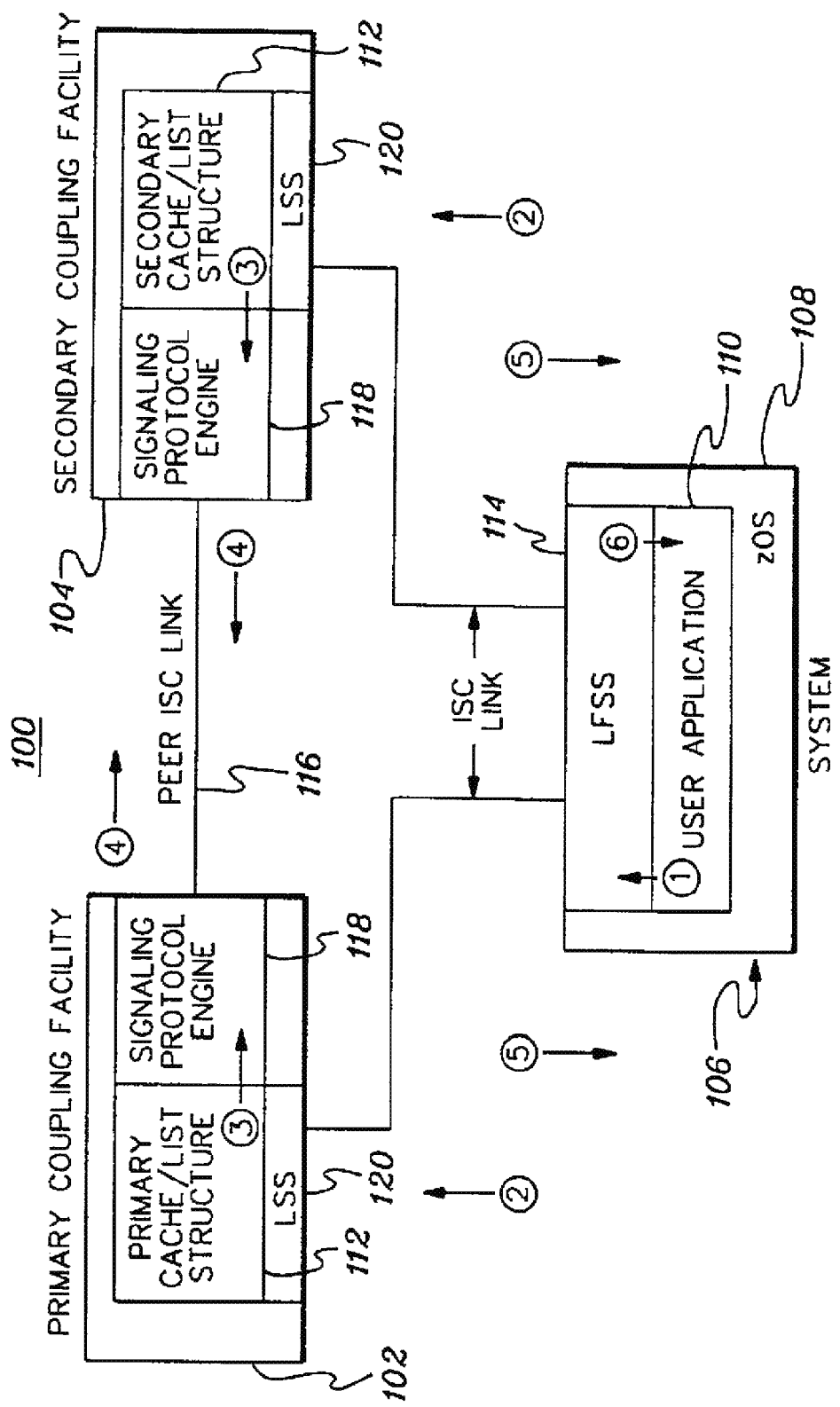
FIG. 1 depicts one example of a duplexing model in which a plurality of coupling facilities are coupled to one another via a peer link, in accordance with an aspect of the present invention.

In accordance with an aspect of the present invention, at least one coupling facility is coupled to one or more other coupling facilities using one or more peer connections. The coupling of the coupling facilities enables a variety of capabilities to be performed, including, but not limited to, the duplexing of coupling facility structures.

The duplexing of the structures is performed in a manner that is transparent to the users of the structures. That is, when a user of a structure issues a command against the structure, the user is unaware that the structure and thus, the command, are duplexed.

In one aspect of the present invention, a high-availability design of coupling facility structures is provided by duplexing a desired structure in two separate coupling facilities. This design improves on the recovery times and impacts of existing recovery techniques, while also provides for a consistent recovery design across the various structure types.

In one embodiment, various aspects of duplexing are accomplished by extending the architecture and physical configuration of components of the Parallel Sysplex. For instance, a coupling facility-to-coupling facility peer connection is provided that allows for protocol flows between the coupling facilities through a signaling mechanism. As a further example, a mechanism is provided for the operating system component of z/OS, the Locking Facility Support Services (LFSS) component, to create a duplexed copy of a given structure in two separate coupling facilities, and to then split commands into two separate commands, each sent in parallel to the two structure instances. This provides for parallel execution of the commands and for efficient re-execution of the commands on congested links. Moreover, in a further aspect of the present invention, a protocol extension to the command concurrency mechanism in the coupling facility is provided, which exchanges signals on the peer connection in a way that maintains synchronization of the structure contents for each command that is executed. These functions are provided in a manner, which has optimal Sysplex performance, in one example.

The duplexing state of a cache or list structure is maintained in a global control, referred to as the duplexing vector, which is indexed by a Structure Identifier (SID). When the bit corresponding to a SID value is B'1', duplexing is active and the duplexing controls in the structure are valid. The duplexing controls include a duplexing system identifier and a duplexing system signaling vector token, as described below. These controls are used in conjunction with information provided in a message command block (MCB) of a duplexed command to construct a duplexing signal.

In one embodiment, structures are not differentiated as primary or secondary within the structure. Primary or secondary structures are determined by how they are used. In some cases, new request operands are defined to allow certain actions in the secondary to be suppressed, but these are done on a command basis and do not create new states in the structure. This simplifies recovery when a primary structure fails, since no state changes are needed in the secondary to make it act as a primary.

While a secondary structure may be promoted to a primary structure, the opposite is not true, in this example. That is, a primary structure is not demoted to a secondary structure.

Duplexing Models

Three architectural models of structure duplexing are possible that meet the attributes of application transparency, failure isolation and command concurrency across two structures. These models include, for instance:

(1) A model that includes a coupling facility-to-coupling facility signaling protocol that coordinates command completion across the coupling facilities during command execution (FIG. 1).

Figure 2:
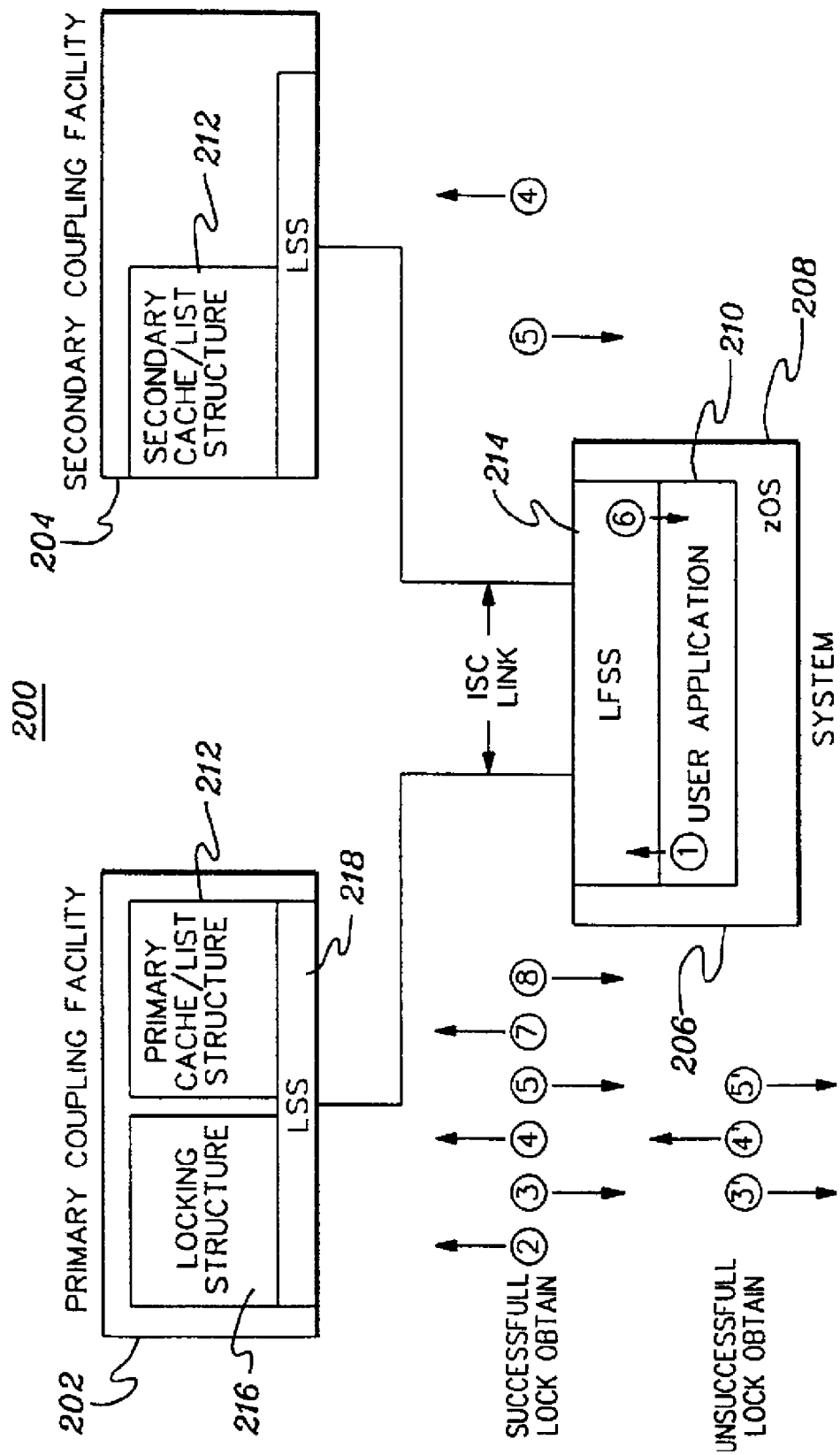
FIG. 2 depicts one alternative embodiment of a duplexing model, which uses an explicit lock for duplexing.

(2) A model that includes an external locking protocol that serializes command execution explicitly (FIG. 2). (A variation of this protocol that satisfies the desired attributes of failure isolation and command concurrency for a certain type of structure, but is not application transparent is described in co-pending U.S. patent application Ser. No. 09/255,382 entitled "Method, System and Program for Providing a User-Managed Duplexing of Coupling Facility Cache Structures", filed Feb. 22, 1999, which is hereby incorporated herein by reference in its entirety.)

Figure 3:
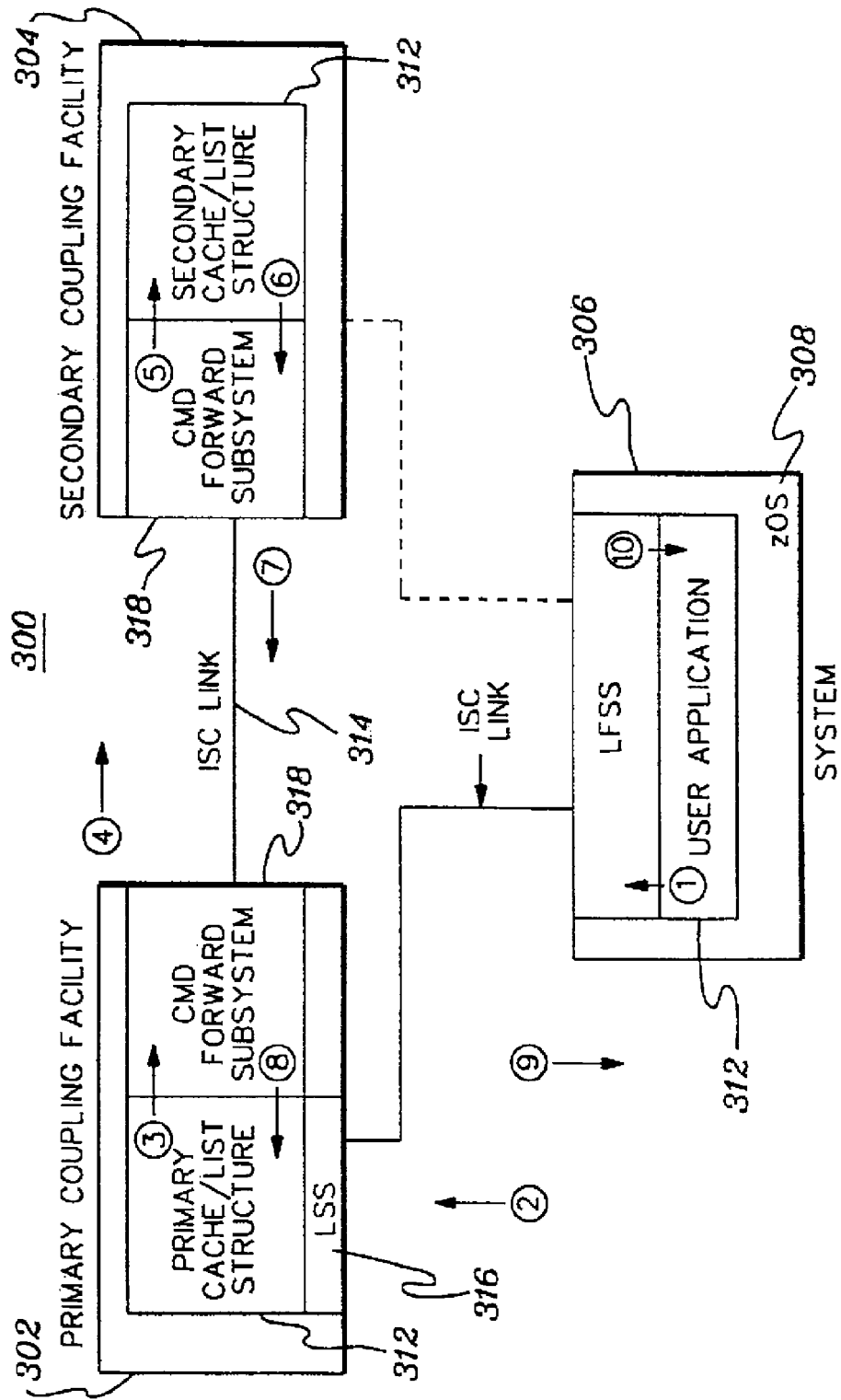
FIG. 3 depicts another alternative embodiment of a duplexing model with store-and-forward duplexing.

(3) A store-and-forward model where the primary coupling facility forwards each command on a standard ISC channel connected to a remote coupling facility. The remote coupling facility then executes the command and returns the result to the primary coupling facility, which then completes the command to the operating system. This model is depicted in FIG. 3.

Each of the models is described below.

(1) Coupling Facility-to-Coupling Facility Duplexing Model:

FIG. 1 depicts one embodiment of a configuration 100, which includes two coupling facilities 102, 104 coupled to a system 106 in a Parallel Sysplex. In one example, the system is running an instance of the z/OS operating system 108, offered by International Business Machines Corporation, Armonk, N.Y. Further, in one example, the system is running an application 110 that is coupled to a coupling facility structure 112 (either of a cache or list type), whose location is not known to the application. The actual physical connection is managed by a Locking Facility Support Services (LFSS) component 114 of the z/OS operating system and commands initiated by the user application flow through the LFSS component.

Two instances of the coupling facility structure are maintained in separate coupling facilities, referred to as the primary coupling facility and the secondary coupling facility. A peer connection 116, such as an Intersystem Channel (ISC) link, couples the two coupling facilities. The peer ISC link can transmit both primary message commands and secondary message commands in either direction. This may be physically represented by either two unidirectional links, one with a sender channel on the primary coupling facility and a receiver channel on the secondary coupling facility, and the second link oppositely configured. This may also be represented by a single physical link where the channel interface in each coupling facility supports both sender and receiver functionality. This latter capability exists in ISC3 links and their variants: ICB3 and IC3, all of which are offered by International Business Machines Corporation, Armonk, N.Y.

The peer ISC link between the coupling facilities is used, for instance, to exchange message path commands on the primary message command interface to configure and couple the two coupling facilities. Once configured and coupled, the peer ISC link is also used to send secondary commands of the list-notification type to exchange signals as part of a signaling protocol for command execution. The sending and receiving of these secondary commands is managed by a coupling facility component called a signaling protocol engine 118. Requests by the cache and list component of the coupling facility for sending and receiving duplexing signals flow through the signaling protocol engine.

One embodiment of the steps in a normal command execution for the coupling facility-to-coupling facility duplexing model are shown in FIG. 1 in numeric sequence that approximates the time sequence of the command. In these steps, various components of the signaling protocol are described. A more complete description of the signaling protocol is provided in a following section. The extensions to the protocol described later are used to enhance the performance and reliability of the basic protocol described here.

Step 1. The user application generates a command and communicates this command to the LFSS through a system macro interface.

Step 2. The LFSS creates two copies of the command, sending one to the primary coupling facility and the second to the secondary coupling facility. The LFSS uses an asynchronous SEND MESSAGE interface without notification to allow the two commands to be initiated in parallel. The LFSS also sets a synchronous completion on initial status (SCIS) bit of the SEND MESSAGE to minimize the effects of any busy conditions encountered on the channel interface. A link-subsystem (LSS) component 120 of the coupling facility control code (CFCC) in the primary coupling facility receives the command and transfers control to the cache or list component, as appropriate. Likewise, the link-subsystem (LSS) component in the secondary coupling facility receives the command and transfers control to the cache or list component, as appropriate.

Step 3. The cache/list component of the primary coupling facility executes the command to the point where a message response block (MRB) would be returned to the application. But, before sending the MRB and while the internal latches are held for the objects referenced by the command, a request is made to the signaling protocol engine in the primary coupling facility to send a completion signal on the peer ISC link to the secondary coupling facility. Likewise, the cache/list component of the secondary coupling facility executes the command to the point where the MRB would be returned to the application. But, before sending the MRB and while the internal latches are held for the objects referenced by the command, a request is made to the signaling protocol engine in the secondary coupling facility to send a completion signal on the peer ISC link to the primary coupling facility.

Step 4. The signaling protocol engine in the primary coupling facility sends the completion signal to the secondary coupling facility and then waits for the reception of the completion signal from the secondary coupling facility. Likewise, the signaling protocol engine in the secondary coupling facility sends the completion signal to the primary coupling facility and then waits for the reception of the completion signal from the primary coupling facility.

Step 5. When the primary coupling facility recognizes the reception of the completion signal from the secondary coupling facility, the primary coupling facility sends the MRB and releases the latches. Likewise, when the secondary coupling facility recognizes the reception of the completion signal from the primary coupling facility, it also sends the MRB and releases the latches. If a failure occurs during this period of time and either the primary coupling facility or the secondary coupling facility fails to recognize the reception of a completion signal, then duplexing is broken by the coupling facility by resetting the duplexing active indicator for the structure. (This is described in more detail in a subsequent section.)

Step 6. Assuming no errors have occurred, the LFSS receives both MRBs from the two coupling facilities and constructs a single message response block by reconciling the results of the two MRBs and gives this response to the application. If, on the other hand, duplexing has been broken by one of the two coupling facilities, then the operating system will invoke fail-over recovery and one of the two structures will be selected as the surviving instance. Once the error is corrected, duplexing can be reestablished.

User transparency is satisfied because the duplexing functions are performed by the LFSS without awareness by the user application.

Failure isolation is satisfied by creating two copies of the structure in separate facilities, each of which can continue as the surviving structure in a situation involving the failure of the other.

Command atomicity is satisfied by maintaining latches on both structures until both commands complete.

Performance is optimized in several ways. First, sending the commands in parallel allows for maximum overlap of data transfer and command execution. Second, by exchanging completion signals immediately upon reaching the MRB send point in the command, the completion can be detected with minimal intervening latency. Third, the amount of data sent in the signal itself is small relative to the amount of data sent on the primary link for the command. So, a single peer ISC link can handle the combined signal traffic generated by commands sent on a significant number of primary ISC links. In fact, for small distances, a single ISC link can handle the combined traffic of the commands generated in a 32-system Parallel Sysplex. Fourth, by using list notification as the signaling transport mechanism, the signal can be processed by the receiver channel engine without needing to interrupt the coupling facility control code (CFCC) to process the signal. Fifth, by using the SCIS facility, contention detected by a SEND MESSAGE can be minimized by causing redrives to be performed substantially immediately.

Although in the embodiment described above, an ISC link is used to couple the two coupling facilities, this is only one example. Other links may be used, including, for instance, an ICB or IC link. Further, more than two coupling facilities may be coupled to one another. However, it is not necessary for all coupling facilities to be coupled to each other. For instance, a third coupling facility may be coupled to Coupling Facility 2 via a peer connection, but not to Coupling Facility 1.

In addition to the above, the coupling facilities that are coupled may be in separate Central Processing Complexes (CPC), in separate partitions of one CPC, or a combination thereof. In the situation that the facilities are in separate partitions of one CPC, the same links can be used for both duplexing and command traffic.

In a further embodiment, multiple peer links can be configured as redundant connections. In this scenario, the process for sending duplexing signals on the peer links (described herein) recognizes a link failure and maintains signal exchanges on surviving links.

(2) Alternative Model—Duplexing with Explicit Locks:

FIG. 2 depicts one embodiment a configuration 200, which includes two coupling facilities 202, 204 coupled to a system 206 in a Parallel Sysplex. The system is running an instance of the z/OS operating system 208 and an application 210 that is coupled to a coupling facility structure 212 (either of cache or list type), whose location is not known to the application. The actual physical connection is managed by the LFSS component 214 of the z/OS operating system and commands initiated by the user application flow through the LFSS component.

Two instances of the coupling facility structure are maintained in separate coupling facilities, referred to as the primary coupling facility and the secondary coupling facility. In addition, a locking structure 216 owned and managed by LFSS is maintained in the primary coupling facility.

One embodiment of the steps in a normal command execution for the explicit locking alternative are shown in FIG. 2 in numeric sequence that approximate the time sequence of the command. Each of these steps is described below.

Step 1. The user application generates a command and communicates this command to the LFSS through the system macro interface.

Step 2. A lock-and-record command is generated by LFSS and sent to the locking structure in the primary coupling facility. A link-subsystem (LSS) component 218 in the primary coupling facility receives the command and transfers control to the list component which controls the locking function. Information recorded in the locking structure includes the MCB for the user command. The lock set by the command serializes access by other commands to the primary structure. (A modification would allow for a partitioning of the structure and the lock to cover the partition of the structure impacted by the user command.)

Step 3. The lock-and-record command is executed by the primary coupling facility and the MRB is returned to the LFSS. In this path, the lock is successfully obtained by the LFSS.

Step 4. The LFSS creates two copies of the command, sending one to the primary coupling facility and the second to the secondary coupling facility. The LFSS uses the asynchronous SEND MESSAGE interface without notification to allow the two commands to be initiated in parallel. The protection provided by the lock in the locking structure enables the two commands to be executed independently in the two coupling facilities. Parallel execution is preferred to minimize the elapsed time for executing the commands. The link-subsystem (LSS) component in the primary coupling facility receives the command and transfers control to the cache or list component, as appropriate. Likewise, the link-subsystem (LSS) component in the secondary coupling facility receives the command and transfers control to the cache or list component, as appropriate.

Step 5. Each coupling facility independently executes its copy of the user command and returns the result in the MRB. The two MRBs returned are identical. (Any differences that cannot be corrected by retrying the commands result in loss of duplexing mode.)

Step 6. The MRB is returned to the user application. From the user's perspective the command has been completed.

Step 7. The LFSS generates an unlock-and-clear command to the locking structure to free the lock and delete the recorded information.

Step 8. The primary coupling facility executes the locking command and returns the MRB indicating success.

This ends the normal path for this alternative duplexing design. However, in step 3, the lock may already be held when the locking command is executed. In this case, the lock operation fails with a non-zero response code and the record operation is suppressed. The following sequence of steps occurs beginning at step 3.

Step 3'. The locking command is executed unsuccessfully by the primary coupling facility. The lock is already held by another system. In this case, the record operation is not performed and a response code is generated that indicates 'lock held'. The MRB containing this response is returned to the LFSS.

Step 4'. The LFSS reissues the lock-and-record command to the primary coupling facility.

Step 5'. The primary coupling facility executes the locking command either successfully or unsuccessfully. The result is returned in the MRB with a response code. If execution is successful, the processing resumes at step 4 above. If execution is unsuccessful, the locking command is reissued at step 4'. This continues for a model-dependent time period by the LFSS, after which duplexing is broken.

User transparency is satisfied because the locking and duplexing functions are performed by the LFSS without awareness by the user application.

Failure isolation is satisfied by creating two copies of the structure in separate facilities, each of which can continue as the surviving structure in a situation involving the failure of the other. The locking structure is only used for duplexing purposes, and so it can be discarded by the recovery program performing structure fail-over.

Command atomicity is satisfied because all accesses to the primary and secondary structures are serialized by the explicit lock operation.

One shortcoming of this approach is the performance cost of the additional lock and unlock commands. These are not overlapped with the mainline commands. In addition to this shortcoming, there are several other performance concerns. First, there is a significant additional load placed on the links to the coupling facility containing the lock structure due to the generation of a pair of lock-and-record and unlock-and-clear commands for each user generated command. Also, the explicit serialization introduced at the structure level or at a partition of the structure introduces new contention that will block command execution. The current design of using internal latching in the coupling facility which optimizes concurrent execution is defeated by this approach.

(3) Alternative B—Store and Forward Duplexing

FIG. 3 depicts one embodiment of a configuration 300 including two coupling facilities 302, 304 in a Parallel Sysplex. The primary coupling facility is connected to a system 306 in the Sysplex that is running an instance of the z/OS operating system 308 and an application 310 that is coupled to a coupling facility structure 312 (either of cache or list type), whose location is not known to the application. The actual physical connection is managed by the LFSS component of the z/OS operating system and commands initiated by the user application flow through the LFSS component. The secondary coupling facility is coupled to the primary coupling facility by a standard ISC link 314 with the sender side connected to the primary coupling facility and the receiver side connected to the secondary coupling facility. The secondary coupling facility is also connected to the system, but the connection is not used for duplexing operations. The connection is used in the event of a structure failure where the secondary structure is selected. So, the connection is depicted in dashed lines to represent its state as a passive backup connection.

One embodiment of the steps in a normal command execution for the store-and-forward alternative are shown in FIG. 3 in numeric sequence that approximates the time sequence of the command.

Step 1. The user application generates a command and communicates this command to the LFSS through the system macro interface.

Step 2. The LFSS issues the command to the primary coupling facility. A link-subsystem (LSS) component 316 in the primary coupling facility receives the command and transfers control to the cache or list component, as appropriate.

Step 3. The cache/list component of the primary coupling facility executes the command to the point where the MRB would be returned to the application. However, before sending the MRB and while internal latches are held for the objects referenced by the command, a request is made to a command-forwarding subsystem 318 to forward the user command to the secondary coupling facility.

Step 4. The command-forwarding subsystem in the primary coupling facility issues a standard SEND MESSAGE instruction to send the command on the ISC link connected to the secondary coupling facility and waits on the MRB.

Step 5. The command forwarding component in the secondary coupling facility receives the command from the primary facility and transfers control to the cache or list component, as appropriate.

Step 6. The cache/list component of the secondary coupling facility executes the command against the secondary structure and hands the MRB to the command forwarding component.

Step 7. The command forwarding component in the secondary coupling facility sends the MRB to the command forwarding component in the primary coupling facility. Command execution is complete in the secondary coupling facility.

Step 8. The command forwarding component in the primary coupling facility receives the MRB from the secondary coupling facility and transfers control to the cache/list component.

Step 9. The cache/list component determines the command execution in the secondary coupling facility is successful and returns the primary MRB to the LFSS.

Step 10. The MRB is returned to the user application.

User transparency is satisfied because the duplexing functions are performed by the coupling facilities without awareness by the user application.

Failure isolation is satisfied by creating two copies of the structure in separate facilities, each of which can continue as the surviving structure in a situation involving the failure of the other.

Command atomicity is satisfied because accesses to the primary structure are serialized, while the command is forwarded to the secondary coupling facility.

There are shortcomings with this model, however. For instance, commands to the secondary structure are to pass over the peer ISC link, including the data transfers. This creates a funneling effect between the set of primary ISC links connected to the primary coupling facility from the systems in the Sysplex to the single peer ISC link, which creates a bottleneck in the system design. To overcome this, multiple links are to be established as peer ISC links to handle this combined traffic. This raises the expense of the configuration and reduces the connectivity of the coupling facilities to systems. Another problem is that the primary and secondary commands execute serially, with little opportunity for overlapping either command execution or data transfer. A third problem is that the peer ISC link is to be fully functional, including data transfers and timeouts. The peer ISC link for the coupling facility-to-coupling facility model only transfers simple message exchanges during the configuration phase and only transfers secondary commands during command processing. This significantly lowers the complexity of the link support in the CFCC, compared to the full-function support needed in the store-and-forward model.

Coupling-Facility Connections

A coupling facility is attached to a second coupling facility when a coupling facility link exists from the first facility to the second facility and the second facility is in the managed state. In this case, we say that the second coupling facility is remotely attached to the first coupling facility. A coupling facility may have any number of remotely attached coupling facilities and may have multiple coupling facility links to the same coupling facility.

The attachment to a remote facility is active, when at least one message path to the remote facility is placed in the active state by an Activate-Message-Path (AMP) command (described hereinafter). In one example, attachments are not activated, unless the coupling facility is in the managed state and a signaling vector is defined.

Two coupling facilities are connected if each coupling facility is remotely attached to the other by active attachments.

Connected coupling facilities can be used to support many functions, including, for instance the duplexing of structures. The coupling facility links that enable the connection are used to transport signals to remote signaling vectors (described hereinafter) in the attached facilities. The program (e.g., LFSS) issues commands to the coupling facilities containing the two structures, and a sequence of signals are exchanged between the two coupling facilities as part of command execution. The sequence of signals, referred to as the signaling protocol, is used to coordinate the updates to the structure objects so that the pair of structures can be synchronized. The signaling protocol extends the command atomicity rules across the pair of structures, ensuring that updates to the set of objects referenced by the command are either applied or suppressed as a single atomic operation in both coupling facilities.

A pair of structures that is synchronized across a coupling facility connection is called a duplexed pair of structures, and each of the two structures is in the duplexing-active state. An error condition or configuration action may cause the duplexing state to be broken. When duplexing is broken, one of the two structures is chosen to continue to support command execution against the objects in the structure. The surviving structure is said to be executing in the simplex state. The other structure no longer accepts commands and is deallocated by the program. If a copy of the structure running in simplex state is created on a connected coupling facility, the duplexing state can be reestablished between the active structure and the copied structure.

Figure 4:
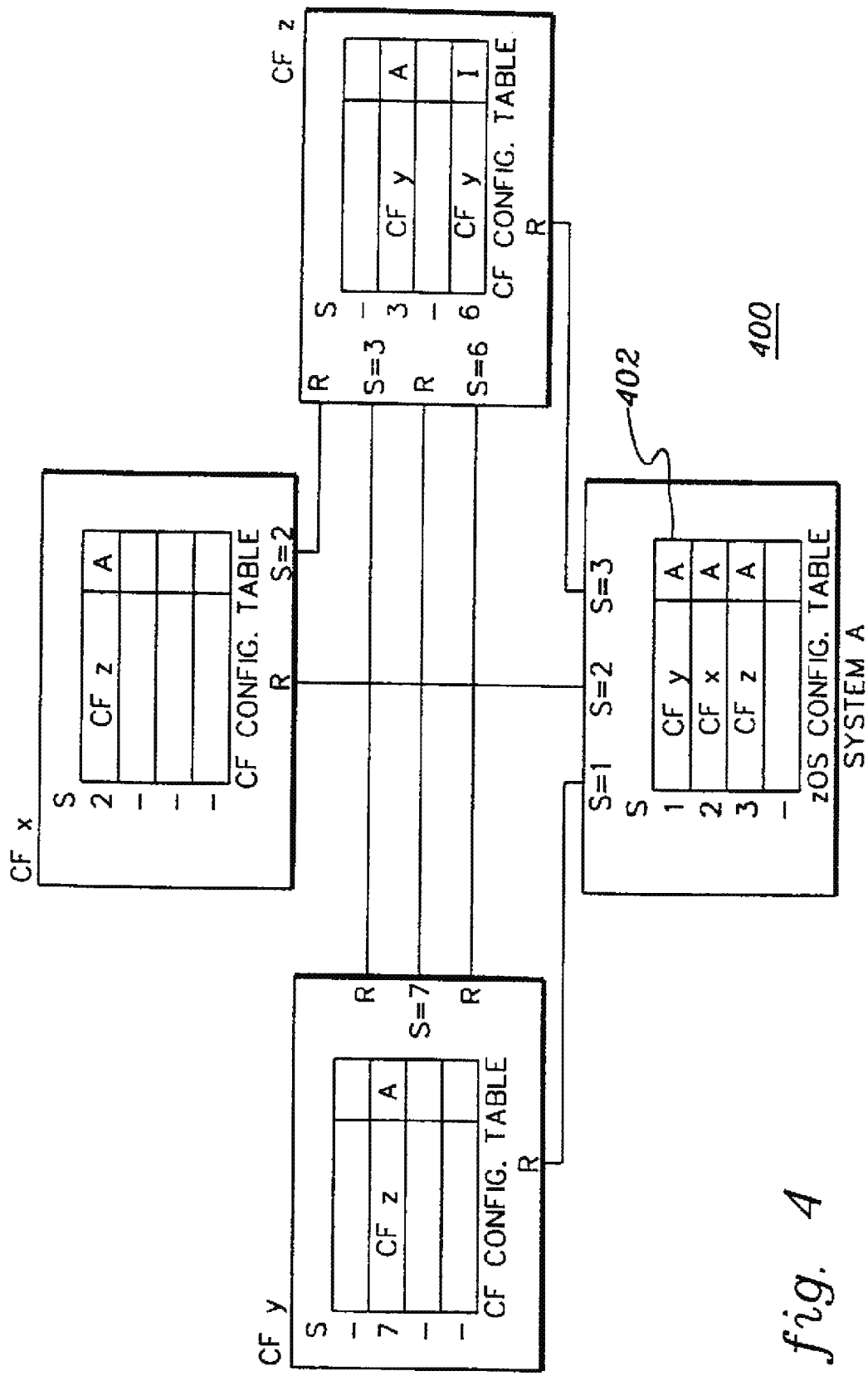
FIG. 4 depicts one embodiment of a Sysplex configuration that couples a plurality of coupling facilities, in accordance with an aspect of the present invention.

FIG. 4 depicts an example configuration 400 of a collection of coupling facilities. In FIG. 4, System A, which is one of potentially many systems in a Parallel Sysplex, is attached to three coupling facilities: System A is attached to Coupling Facility y via sender ISC Channel (S) 1, to Coupling Facility x via sender ISC Channel 2, and to Coupling Facility z via sender ISC Channel 3. All of these attachments are in the active state. The association of sender ISCs to coupling facility's and their attached state are reflected in a configuration table 402 in the z/OS operating system. Other systems in the Parallel Sysplex may also be attached to Coupling Facilities x, y and z and their configuration tables would reflect the state of their attachments.

In addition, the coupling facilities are attached to each other, but they are not fully interconnected. Coupling Facility x is attached to Coupling Facility z by sender ISC Channel 2, but Coupling Facility x is not attached to Coupling Facility y, in this example. This is reflected in the coupling facility x configuration table, which shows a single active (A) attachment for sender ISC 2 to Coupling Facility z. Likewise, Coupling Facility y is attached to Coupling Facility z by sender ISC 7. Coupling Facility z is attached to Coupling Facility y, but not to Coupling Facility x. In fact, Coupling Facility z has two attachments to Coupling Facility y, sender ISC 3 and 6. However, while sender ISC 3 is an active attachment, the attachment via sender ISC 6 has not yet been activated (I).

This collection of attachments generates one pair of connected coupling facilities. Namely, the pair of ISC links represented by sender ISC 7 in Coupling Facility y and sender ISC 3 in Coupling Facility z are active attachments in each direction, and therefore, form a peer ISC link between Coupling Facility y and Coupling Facility z. Therefore, Coupling Facility y and Coupling Facility z are connected coupling facilities. No such connection exists between Coupling Facility x and Coupling Facility y or between Coupling Facility x and Coupling Facility z. So, a structure is duplexed by placing one structure in Coupling Facility y and the other structure in Coupling Facility z.

A program running on System A can allocate a duplexed pair of structures: one in Coupling Facility y and one in Coupling Facility z. If at some point in time, Coupling Facility y fails, or one of the ISC links in the peer ISC link attaching Coupling Facility z to Coupling Facility y fails, the duplexing-active state can be broken by the program and the surviving structure on one of Coupling Facility y or Coupling Facility z can be selected and accessed as a single structure and the structure executes in a simplex state. The change from duplex state to simplex state is done without loss of data and with minimal recovery time required for switching states. Assuming the surviving structure is on Coupling Facility z and later a second copy of the structure is created on Coupling Facility y, the structure can reenter the duplexed state. If, in the interim, an ISC link is established from Coupling Facility z to Coupling Facility x and attachments in both directions are activated, the second copy of the structure could be placed on Coupling Facility x and the signaling protocol would flow between Coupling Facility z and Coupling Facility x. Likewise, if Coupling Facility z or it's corresponding ISC link fails, then the structure in Coupling Facility y is the surviving structure and is accessed in simplex mode. In this case, however, the lack of a signaling channel between Coupling Facility x and Coupling Facility y prevents reentering the duplexed state until Coupling Facility z is repaired, or until ISC links are configured between Coupling Facility x and Coupling Facility y in both directions.

The coupling facility configuration tables reflect the states of each of the ISC links associated with the sender ISC channels. A similar table exists for the receiver ISC channel, called the Message-Path Status Vector (MPSV). This is an architected table in the coupling facility that is extended for duplexing connections. The MPSV and its extensions are described in the next section. The CFCC determines the collection of connected coupling facilities from information in both the configuration table and the MPSV. A source node descriptor in the MPSV is the information that links the sender and receiver ISC channels.

Message-Path Objects for Coupling Facility Duplexing

In general, several processors issue coupling-facility commands, and several links may connect each processor to the coupling facility. The coupling facility assigns message-path identifiers that distinguish among the different sources of commands. Further, associated with a message path are various objects, which are used to, for instance, define the path, provide status, etc.

Examples of message-path objects are summarized in the following table and described below. There may be more, less or different message-path objects.

| Message-Path Objects | Acronym |
| --- | --- |
| Image identification code | IID |
| Message-path identifier | MPID |
| Message-path request level | MPRL |
| Message-path state | MPS |
| Source node descriptor | SRCND |
| System identifier | SYID |
| Path group | |
| Message-path status vector | |

Image Identification Code (IID): A value that specifies the image associated with the message path. The object is initialized to zero and is set to the value of the IID field in the message header, when an Activate-Message-Path command (described hereinafter) is processed.

Message-Path Identifier (MPID): A value that is used to identify a message path at the coupling facility. There is a unique message-path identifier for each source of direct or intermediate commands. The values of the message-path identifiers are set by an installation procedure. They are not modified by any command.

Message-Path Request Level (MPRL): A value associated with each message path that indicates the maximum number of commands that may be processed concurrently for the message path. The value is initialized when the message path becomes operational and remains unchanged, while the path is in the operational state.

Message-Path State (MPS): A value that specifies the state of the message path. A value of X'00' indicates the path is in the inactive state, and a value of X'01' indicates the path is in the active state.

Source Node Descriptor (SRCND): An optional value that is designated by the program when the message path is activated, which contains the node-descriptor object of the message path source. When a message path is activated and a source node descriptor is not provided, the source-node-descriptor object is in the empty state.

System Identifier (SYID): A value that is designated by the program when the message path is activated.

Path Group: The set of message paths with the same system-identifier (SYID) value for message paths that do not have source node descriptors. For the message paths that have source node descriptors, the path group includes the set of message paths with the same system-identifier value and source-node-descriptor value.

Message-Path Status Vector: A message-path-status-vector object includes state information for each message path in the coupling facility. The message-path status vector includes, for instance, the following objects for each message path:

The message-path state (MPS);

The message-path request level (MPRL);

The source node descriptor (SRCND) (optional);

The system identifier (SYID); and

The image identification code (IID).

After coupling facility initialization is complete, the state of each message path is inactive.

One example of a message-path status vector is depicted in FIG. 5. As shown, the fields include, for instance, MPS, MPRL, SYID and the IID field. It also includes a column for the source node descriptor, which is a field used for duplexing. The field is set by an Activate Message Path command under control of the SRCNDC operand. (See the section on message-path operands and message-path commands below.) The source node descriptor field is marked as empty for message paths originating within an operating system partition and is set to the value of the node descriptor object for paths originating in remote coupling facilities. The source node descriptor object is used by the CFCC to match coupling facility receiver chpids (CFR) and coupling facility sender chpids (CFS). Activating a message path to a remote coupling facility indicates that the remote coupling facility is attached. If there is also an active message path in the MPSV for the same remote coupling facility (i.e., the source node descriptor is equal to the remote coupling facility node descriptor), then the two coupling facilities are connected.

Global Objects

In addition to message path objects, global objects resident within the coupling facility are used to identify the coupling facility, describe its state, define its model-dependent limitations and summarize the status of its resources. Global objects include, for instance, fixed global controls, which are set at coupling facility power-on reset and are not modified by any command or coupling facility process; and program-modifiable global controls, which are initialized at coupling facility power-on reset and may be modified by subsequent commands or coupling facility processes. Although various global objects are described below, more, less or different objects may exist.

One embodiment of a fixed global control used for duplexing is summarized in the following table and described below.

| Fixed Global Controls | Acronym |
| --- | --- |
| Signaling-vector token | SVT |

Signaling-Vector Token (SVT): A value that identifies the signaling vector. When the signaling-vector token is zero, a signaling vector is not provided in the coupling facility.

Likewise, examples of program-modifiable global controls are summarized in the following table and described below.

| Program-Modifiable Global Controls | Acronym |
|---|---|
| Authority | AU |
| Channel-connection controls | |
| Duplexing vector | DV |
| Remote-facilities table | RFT |
| Remote-facilities-access counter | RFAC |
| Remote-facility controls | |
| Retry vector | |
| SID vector | |
| Signal group | SV |
| Signaling controls | SGP |
| Signaling vector | SGNLV |

Authority (AU): A program-designated coupling-facility-state value. When the value is non-zero, the coupling facility commands are executed normally. When the value is zero, the execution of certain coupling facility commands is suppressed. The authority value is initialized to zeros. The authority contains a sub-object, called the system identifier (SYID).

Channel-Connection Controls: One set of channel-connection controls exists for a coupling facility. Examples of channel-connection controls are summarized in the following table and described below.

| Channel-Connection Controls | Acronym |
|---|---|
| Count of Installed and Not Operational Channels | CINOPC |
| Inst. And Not Oper. Chan. Path Descriptors | INOPCP |

Count of Installed and Not Operational Intersystem Channels (CINOPC): A value that includes the number of channel-path identifiers assigned to intersystem channels that are installed in the coupling facility and are in the not operational state. The value of the count of installed and not operational intersystem channels is, for instance, between zero and sixty four.

Installed and Not Operational Channel-Path Descriptors (INOPCP): An ordered collection of values that include the channel-path-identifier (CHPID) values that are installed in the coupling facility and are not operational. The number of installed and not operational channel path descriptors is included in the CINOPC control. The installed and not operational channel paths are ordered by type and by value. The sender channel paths are listed first followed by the receiver channel paths. Within each type, the channel-path identifiers are ordered from lowest to highest. When the number of installed and not operational channel paths exceeds 64, then the list is truncated and the first 64 channel-path identifiers are returned.

Duplexing Vector (DV): A bit string with an initial value of zero. The bit positions start at 0 and increase sequentially to the SID limit. The bit at position (i) in the string is set to one, when a structure is made duplexing active with a SID value of (i). The bit at position (i) is reset to zero when duplexing is broken by the CFCC or explicitly deactivated by the OS, or the structure is deallocated. All bits in the duplexing vector are reset to zero when the authority object is changed by a Set-Facility-Authority command and a preserve-duplexing indicator (described hereinafter) is zero, or when a coupling facility power-on reset occurs. A bit in the duplexing vector is referred to as the duplexing-active bit for the associated structure.

In one aspect, the obtaining of this vector includes, but is not limited to, defining the vector, receiving the vector or otherwise, being provided the vector.

Remote-Facilities Table (RFT): Information that is returned as a result of a Read Connected Facility Controls command (described hereinafter).

Remote-Facilities-Access Counter (RFAC): A value that is incremented, whenever a remote coupling facility's accessibility level changes either from not connected to connected or from connected to not connected. The value is set to zero, when a coupling facility power-on reset occurs.

Remote-Facility Controls:

One or more remote coupling facilities may be accessible by message paths between the facilities. There are two possible levels of accessibility to a remote facility:

Not connected;
Connected.

The remote facility is connected, when at least one message path to the remote facility is in the active state and at least one message path from the remote facility is in the active state, as recorded in the message-path status vector. Otherwise, the remote facility is not connected.

As examples, a remote facility may be not connected for any of the following reasons:

No message paths exist to the remote coupling facility. It may be the case that no message path ever existed to the remote facility, or that the coupling facility had previously been accessible, but all message paths have been removed.

All the message paths to the remote facility are inactive. This state may exist for several reasons: (1) The coupling facility link has been varied online and the coupling facility has not yet activated the message path; (2) the remote facility is not in the managed state or does not possess a signaling vector; or (3) a Deactivate Message Path (DMP) command (described hereinafter) has been issued on the last active message path to the remote facility.

At least one message path to the remote facility is in the active state, but no active message paths from the remote facility exist.

The remote-facility node descriptor matches the node-descriptor object. This ensures that a coupling facility cannot be connected to itself as a remote facility.

A set of remote facility controls exists for each recognized remote facility.

The remote-facility controls are created when an Identify Message Path command (described hereinafter) completes and the node descriptor and system identifier that are returned do not match any existing remote facilities.

Examples of remote-facility controls are summarized in the following table and described below.

| Remote-Facility Controls | Acronym |
|---|---|
| Remote-facility accessibility level | RFAL |
| Remote-facility channel path identifiers | RFCHP |
| Remote-facility-controls time of creation | RFCTOC |
| Remote-facility disconnect time | RFDT |
| Remote-facility disconnect time validity indicator | RFDTVI |
| Remote-facility node descriptor | |
| Remote-facility path descriptors | RFND |
| Remote-facility path-group size | RFPD |
| Remote-facility sender channel-path identifiers | RFPGS |
| Remote-facility sender path descriptors | RFSCHP |
| Remote-facility sender path group size | RFSPD |
| Remote-facility signaling-vector token | RFSPGS |

-continued

| Remote-Facility Controls | Acronym |
|---|---|
| Remote-facility system identifier | RFSVT |
| Remote-facility signaling counters | RFSYID |

Remote-Facility Accessibility Level (RFAL): A value that describes the current level of accessibility to the remote coupling facility. It has the following encoding:

> 0    Not connected;
> 1    Connected.

Remote-Facility Channel-Path Identifiers (RFCHP): An ordered collection of values that include the channel-path-identifier (CHPID) values assigned to the message paths in the remote-facility path group. There is a remote-facility channel-path identifier for each active message path in the path group, and therefore, the number of remote-facility channel-path identifiers is equal to the remote-facility path-group size (RFPGS). The ordering of the remote-facility channel-path identifiers matches the ordering of the remote-facility path descriptors, i.e., the ith remote-facility path descriptor includes the value of the descriptor field returned by the store-channel-path-descriptor command of the Channel Subsystem Call (CHSC) instruction when the ith remote-facility channel is specified as the input operand.

Remote-Facility-Controls Time of Creation (RFCTOC): A time-of-day (TOD) value indicating the time when the remote facility controls are created.

Remote-Facility Disconnect Time (RFDT): A value that includes the elapsed time that has occurred since the remote facility changed from connected to not connected. The format of the remote-facility disconnect time matches the S/390 time-of-day clock. For example, bit 51 corresponds to 1 millisecond.

Remote-Facility Disconnect Time Validity Indicator (RFDTVI): A value that determines the validity of the remote-facility disconnect time object. It has the following encoding:

> 0   Value of the RFDT object is not valid;
> 1   Value of the RFDT object is valid.

Remote-Facility Node Descriptor (RFND): A value that includes the node-descriptor object of the remote coupling facility.

Remote-Facility Path Descriptors (RFPD): A collection of values that define the channel-path types for the channel paths in the path group associated with the remote facility. There is a remote-facility path descriptor for each active message path in the path group, and thereby, the number of remote-facility path descriptors is equal to the remote-facility path-group size (RFPGS).

Remote-Facility Path-Group Size (RFPGS): A value that includes the number of active message paths in the path group associated with the remote facility. The value of the remote-facility path-group size is between zero and eight, as one example.

Remote-Facility Sender-Channel-Path Identifiers (RFSCHP): An ordered collection of values that include the channel-path-identifier (CHPID) values of the sender intersystem channels that are connected to the remote facility. A sender intersystem channel is connected to a remote facility, when the channel is operational and an Identify-Message-Path command issued on the channel path returns the node-descriptor object associated with the remote facility. There is a remote-facility sender channel-path for each connected sender intersystem channel, and therefore, the number of remote-facility sender-channel-path identifiers is equal to the remote-facility sender-path-group size (RFSPGS). The ordering of the remote-facility sender-channel-path identifiers matches the ordering of the remote-facility sender path descriptors; i.e., the ith remote-facility path descriptor contains the value of the descriptor field returned by the store-channel-path-description CHSC command when the ith remote-facility sender-channel-path identifier is specified as the input operand.

Remote-Facility Sender Path Descriptors (RFSPD): An ordered collection of values that define the channel-path types for the sender intersystem channels that are connected to the remote facility. There is a remote-facility sender path descriptor for each sender intersystem channel that is connected to the remote facility, and thus, the number of remote-facility sender path descriptors is equal to the remote-facility sender-path-group size (RFSPGS). The value of the remote-facility sender path descriptor is set to the value of the descriptor field (DESC) for the associated channel-path type returned by the store-channel-path-description CHSC command.

Remote-Facility Sender-Path-Group Size (RFSPGS): A value that includes the number of sender intersystem channel that are operational and connected to the remote facility. The value of the remote-facility sender-path-group size is between, for instance, zero and eight.

Remote-Facility Signaling-Vector Token (RFSVT): A value used to identify the signaling vector in the remote coupling facility.

Remote-Facility System Identifier (RFSYID): A value that is designated by the program when the remote coupling facility is placed in the managed state.

Remote-Facility Signal Counters: A set of remote-facility signal counters is associated with each remote facility. The signal counters are initialized to zero when the remote-facility controls are created. The signal counters are defined as substantially accurate.

Examples of remote-facility signal counters are summarized in the following table and described below.

| Remote-Facility Signal Counters | Acronym |
|---|---|
| Delayed signal counter | DSC |
| Halt-execution signal counter | HESC |
| Ready-to-complete signal counter | RTCSC |
| Ready-to-execute signal counter | RTXSC |
| Request-for-suppression signal counter | RFSSC |
| Request-for-suppression-accepted signal counter | RFSASC |
| Signal delay time first moment | SDTFM |
| Signal delay time second moment | SDTSM |
| Signal-redrives signal counter | SRDSC |
| Signal service time first moment | SSTFM |
| Signal service time second moment | SSTSM |

Delayed-Signal Counter (DSC): A value that indicates the number of signals delayed in being sent to the remote facility.

Halt-Execution Signal Counter (HESC): A value that indicates the number of halt-execution signals sent to the remote facility.

Ready-to-Complete Signal Counter (RTCSC): A value that indicates the number of ready-to-complete signals sent to the remote facility.

Ready-to-Execute Signal Counter (RTXSC): A value that indicates the number of ready-to-execute signals sent to the remote facility.

Request-for-Suppression Signal Counter (RFSSC): A value that indicates the number of request-for-suppression signals sent to the remote facility.

Request-for-Suppression-Accepted Signal Counter (RFSASC): A value that indicates the number of request-for-suppression-accepted signals sent to the remote facility.

Signal Delay Time First Moment (SDTFM): A value that includes the accumulated delay time in, for instance, microseconds for signals delayed in being sent to the remote facility.

Signal Delay Time Second Moment (SDTSM): A value that includes the accumulated squares of delay time in squared-microsecond units for signals delayed in being sent to the remote facility.

Signal-Redrives Signal Counter (SRDSC): A value that indicates the total number of redrives of signals to the remote facility.

Signal Service Time First Moment (SSTFM): A value that includes the accumulated service time, excluding delay time, in microseconds for signals sent to the remote facility.

Signal Service Time Second Moment (SSTSM): A value that contains the accumulated squares of service time, excluding delay time, in squared-microsecond units for signals sent to the remote facility.

Notes on Remote Facility Controls:
1. If the counters are sampled at periodic intervals, the sampling program verifies that the counters have not been reset during the sampling interval. This can occur if the remote facility becomes disconnected, the controls released and then subsequently reacquired. The program can detect this by storing the remote-facility-controls time of creation and comparing this value each time the counters are read with the current value.
2. The signal counters include logical requests to deliver signals, including signals that are never successfully delivered. But, the signal counters do not include any redrives of signals.
3. Redrives of signals are included in the first and second moments of service time, provided at least one signal is successfully delivered.
4. The signals delivered to a remote facility should be distributed uniformly across the message paths in the path group, through a scheduling technique, such as round-robin. This allows for full utilization of link resources configured between the facilities.
5. The remote-facility controls should not be released until the last sender channel is configured to a different remote facility. If the remote facility is disconnected, but at least one sender channel remains associated with the path group, then the possibility exists that the connection may be reestablished and the controls should be preserved. This minimizes the effect of resetting the signal counters in the presence of transient link errors.
6. The remote-facility disconnect time can be determined by storing a time stamp in the controls associated with a sender ISC whenever the corresponding message path becomes inactive. The disconnect time value can be calculated when a Test Remote Facility Access (TRFA) command (described hereinafter) is executed by subtracting the stored time stamp from the current Time of Day (TOD) value. If more than one path exists in the path group to the remote facility, then the disconnect time is calculated when all the message paths are inactive. In this case, the value of the disconnect time is calculated using the most recent message path to become inactive.
7. If a message path is reactivated for a sender ISC, but the new remote facility is different from the previous remote facility, then the time stamp should be reset. If this is the last message path in the path group to the old remote facility, then the remote-facility-disconnect-time validity indicator should be set to zero.
8. The remote-facility disconnect time is returned by a Test Remote Facility Access (TRFA) command (described hereinafter), when the remote-facility is disconnected. The program can limit the spin time for waiting for a lost connection to be restored by using the RFDT value to bound the spin rather than a locally maintained time value.
9. The count of installed and not operational intersystem channels includes both sender and receiver ISCs. If the channel is a coupling-facility peer channel (CFP), then the channel may appear to be installed twice, once for the sender side of the channel and once for the receiver side. If a CFP channel is installed in a coupling facility as both a sender channel and a receiver channel and is recognized as not operational, the count of installed and not operational intersystem channels is increased by two.
10. A receiver intersystem channel may be connected to a sender intersystem channel that is shared by two or more remote coupling facilities. So, the same CHPID value may appear in multiple RFCHP controls.
11. A sender intersystem channel may be connected to a receiver intersystem channel that is shared by two or more remote coupling facilities. So, the same CHPID value may appear in multiple RFSCHP controls.
12. The remote facility path group has a message path for each receiver channel over which it has processed an AMP command from the remote facility and for which the paths are still active. The CHPID values for the receiver channels associated with the path group are returned in the RFCHP object, the corresponding path descriptors are returned in the RFPD object, and the count of receiver channels is returned in the RFPGS object.

Referring back to the program-modifiable global controls table above, additional controls exist, which are described below.

Retry Vector: A vector that includes retry-index (RX) values for the retry buffers of a coupling facility.

SID Vector: A vector that includes structure identifier (SID) values for the structures of a coupling facility.

Signal Group (SGP): A collection of signal values associated with the execution of a command or a portion of a command. Each signal group includes, for instance, the following signals:

| RTE | Ready To Execute | The duplexed command is ready to begin execution. |
|---|---|---|
| RTC | Ready To Complete | The duplexed command has completed execution of the command or a portion of the command and is ready to commit completion status. |
| HE | Halt Execution | The duplexed command has encountered an asymmetric resource condition, including, for instance, a timeout condition, a latch contention condition, a storage constraint, or failure of a conditional test request. The command execution is to stop at the completion of the previous command portion, or lacking a previous portion, the command is suppressed. |
| RFS | Request For Suppression | A command-sequence-number conflict has occurred for the duplexed command and command suppression is requested. |

| | | |
|---|---|---|
| RFSA | Request For Suppression Accepted | The duplexed command has accepted an RFS signal. The command execution is to stop at the completion of the previous command portion, or lacking a previous portion, the command is suppressed. |

When a signal is received for a signal group, the signal is set to one and remains in this state until the signal group is reset. When the signal group is reset, each signal is set to zero.

Signaling Controls:

One example of various signaling controls are summarized in the following table and described below.

| Signaling Controls | Acronym |
|---|---|
| Command sequence number | CSN |
| Current-signal-group index | CSGX |

Command Sequence Number (CSN): A number associated with a currently executing duplexed command. The initial value is zero.

Current Signal-Group Index (CSGX): A value that identifies the currently active signal group in a signaling vector entry (described below). The initial value is B'01', as one example.

Signaling Vector (SGNLV): The signaling-vector object includes a linear array of signaling-vector entries, where each entry includes signaling controls and a plurality of (e.g., three) signal groups, as depicted in FIG. 6. Each entry 600 is associated with a retry index (RX) 602, which is the index into the signaling vector, and each entry includes two signaling controls 604: the command sequence number and the current signal-group index, and three signal groups 606. The reset and initial state of a signaling-vector entry are the same. When an entry is reset, the command sequence number is set to zero, the current signal-group index is set to one, and each signal group is reset. After coupling facility initialization is complete or after the authority object is changed by, for instance, a Set-Facility-Authority command (described hereinafter) and the preserve-duplexing indicator is zero, each signaling-vector entry is in the reset state.

In one example, the signaling vector is to be large enough to map each retry buffer available in the coupling facility. If a vector of sufficient size cannot be created, then no signaling vector is established and no remote facility connections are made.

Notes on Signaling Controls:
1. The signaling vector is created, for instance, by a DEFINE VECTOR instruction, using the list-notification option. The CFCC creates the vector when the CFCC initializes. The list-notification token returned by the instruction is placed in the signaling-vector-token object. In one example, Bit 17 is set to B'1', when the token is assigned. Thus, the token returned by the DEFINE VECTOR instruction is non-zero.
2. Signals are implemented as list-notification commands using the list-notification token to identify the signaling vector in the neighboring facility. The semantic content of the signal is coded in the list-notification entry number.
3. The synchronization protocol for duplexing list-form commands employs, for instance, three signal groups to be provided for each signaling-vector entry. This allows signals to be received on the previous, current, or next list item that is processed.
4. The duplexing state of a structure may be changed from the active state to the inactive state, when the coupling facility detects a loss of connectivity that may result in the loss of one or more signals sent between the paired coupling facilities. Once the duplexing state is set to inactive, duplexing can only be reactivated by the program.
5. A message path from each remote coupling facility is activated by means of an Activate-Message-Path (AMP) command sent on the coupling link to the remote facility. The SYID request operand in the AMP command is set equal to the value of the system identifier in the authority object.
6. A coupling facility cannot be included in its own list of remote facilities. Duplexing is only activated, in this example, when the two structures reside in distinct coupling facilities. This is enforced by requiring that for a remote facility to be connected, the RFND is not to be equal to the node-descriptor object.
7. The maximum number of retry buffers that a coupling facility can support with duplexing is limited by the maximum size vector that can be defined for a logical partition. The LNEN format for duplexing signals places the retry index in bits 9-24 (for example), allowing for 128 bits per signaling vector entry. So the retry index limit is not to exceed one less than the maximum vector size divided by 128. On G6 machines, this limit is '40000'X or 256K bits. So, the retry index limit is not to exceed 256K/128−1 or 2047. However, the coupling facility is to provide at least as many retry buffers as there are recipient channel buffers. This is for the OS/390 IFCC recovery techniques. If the signaling vector size cannot support this amount of retry buffers, then the retry index limit is not changed and the signaling vector is not created. Remote facility connections are not made, and hence, duplexing is not established for structures in this facility.

This completes a description of one embodiment of various global objects. One or more global objects are used, in one example, along with one or more message path objects, to define a configuration. One such configuration is described in FIG. 7.

Figure 7:
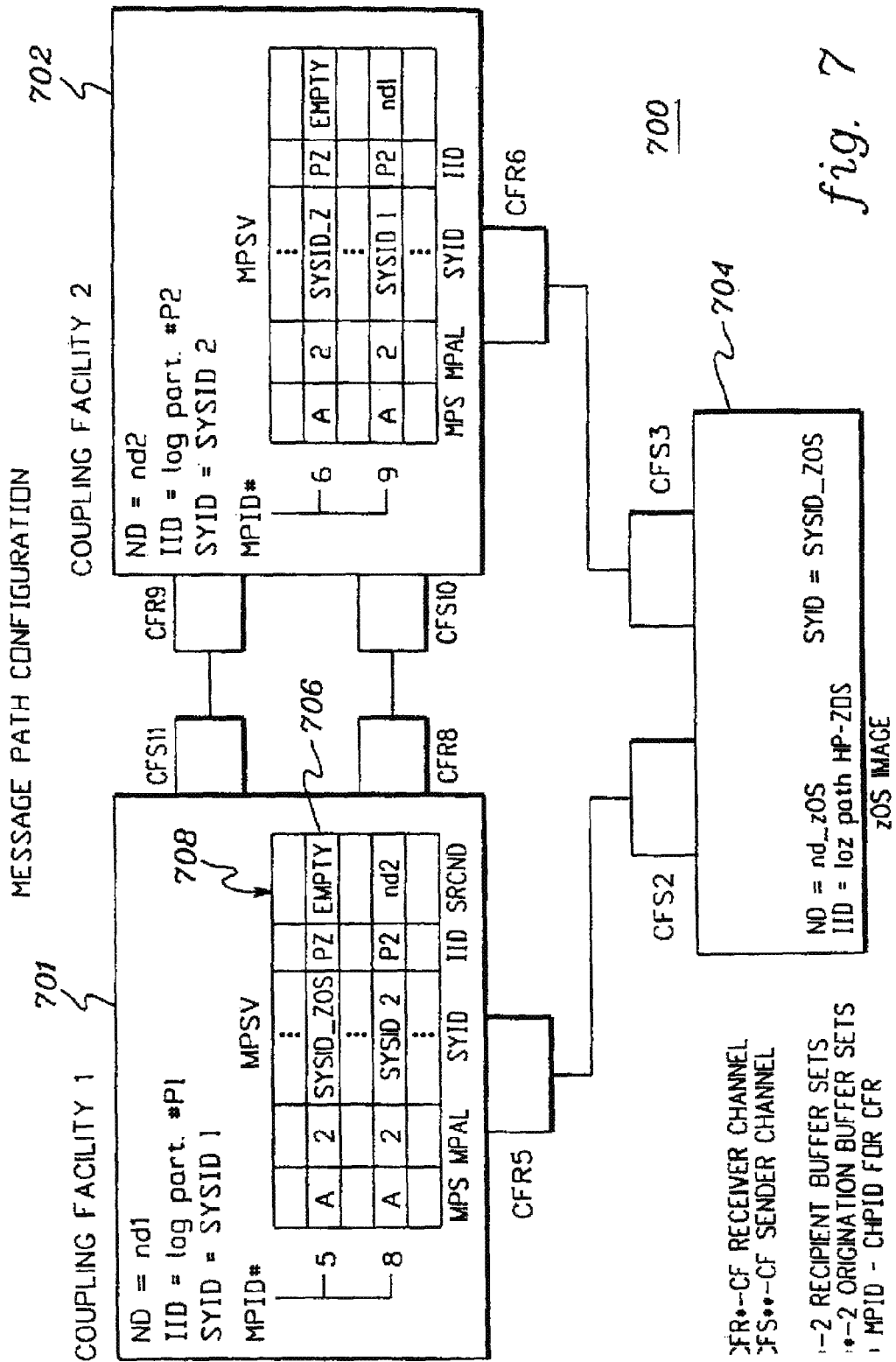
FIG. 7 depicts one embodiment of a message-path configuration, in accordance with an aspect of the present invention.

As depicted in FIG. 7, a configuration 700 includes two coupling facilities 701, 702 coupled to a single system 704 running the z/OS operating system. In this configuration, the z/OS image has two sender channels, CFS 2 and CFS 3. CFS 2 is connected to receiver channel CFR 5 on CF 1, and CFS 3 is connected to receiver channel CFR 6 on CF 2. In this implementation, the MPID is set equal to the chpid number for the receiver chpid. In CF 1, the message path originating in the z/OS image is reflected in row 5 (706) of the MPSV 708. The state of the message path is 'active' (A), the MPRL is 2, the system id (SYID) is the system id for z/OS, the image id is the partition number of the z/OS image and the source node descriptor is empty. The entry in the MPSV in CF 2 for the message path originating in CFS 3 is similar.

There are two additional message paths defined between the two coupling facilities. The first originates in CF 1 in CFS 11 and is connected to CFR 9 in CF 2. Row 9 in the MPSV in CF 2 reflects the state of this message path. The path is active, which shows that CF 1 is attached to CF 2. The MPRL is 2, the system identifier is set to the value of the high order doubleword of the authority in CF 1, the IID is set to the partition number for the logical partition that is running CF 1, and the source node descriptor is set to the node descriptor for the system containing CF 1. These fields are all established by the AMP command issued by CF 1 to CF 2 over CFS 11.

A similar set of fields is set in the MPSV on CF 1 for the message path originating in CFS 10 on CF 2 and connected to CFR 8 on CF 1. The two coupling facilities are in the connected state and are eligible to contain a duplexed pair of structures. Duplexing signals sent from CF 1 to CF 2 use the secondary message buffers on CFR 8 via list notification commands. Likewise, CF 2 sends duplexing signals to CF 1 using the secondary message buffers on CFR 9. The MPRL value of 2 indicates that two duplexing signals may be sent in parallel in each direction. The CFCC monitors the state of the connection to allow duplexing to be maintained by monitoring the state of both the CFR link and the CFS link. In the case of CF 1, that means both CFR 8 and CFS 11 are to be operational and active. Likewise, CF 2 monitors CFR 9 and CFS 10.

Retry-Buffer Objects

Other objects are also employed to support coupling facility processing. These objects include, for instance, retry-buffer objects, which are described below.

A retry buffer is an area of coupling facility storage that includes information relevant to command recovery. The retry buffers are assigned by the LFSS component of z/OS when a coupling facility is initially connected. The LFSS assigns a retry index within the range of retry indexes assigned to that system to a message subchannel that contains a sender ISC channel, which is connected to the coupling facility. The retry index identifies a unique collection of objects in the coupling facility that constitute the retry buffer. These include, for instance, the retry authority, the retry information, the retry data block, and a signaling vector entry.

Figure 8:
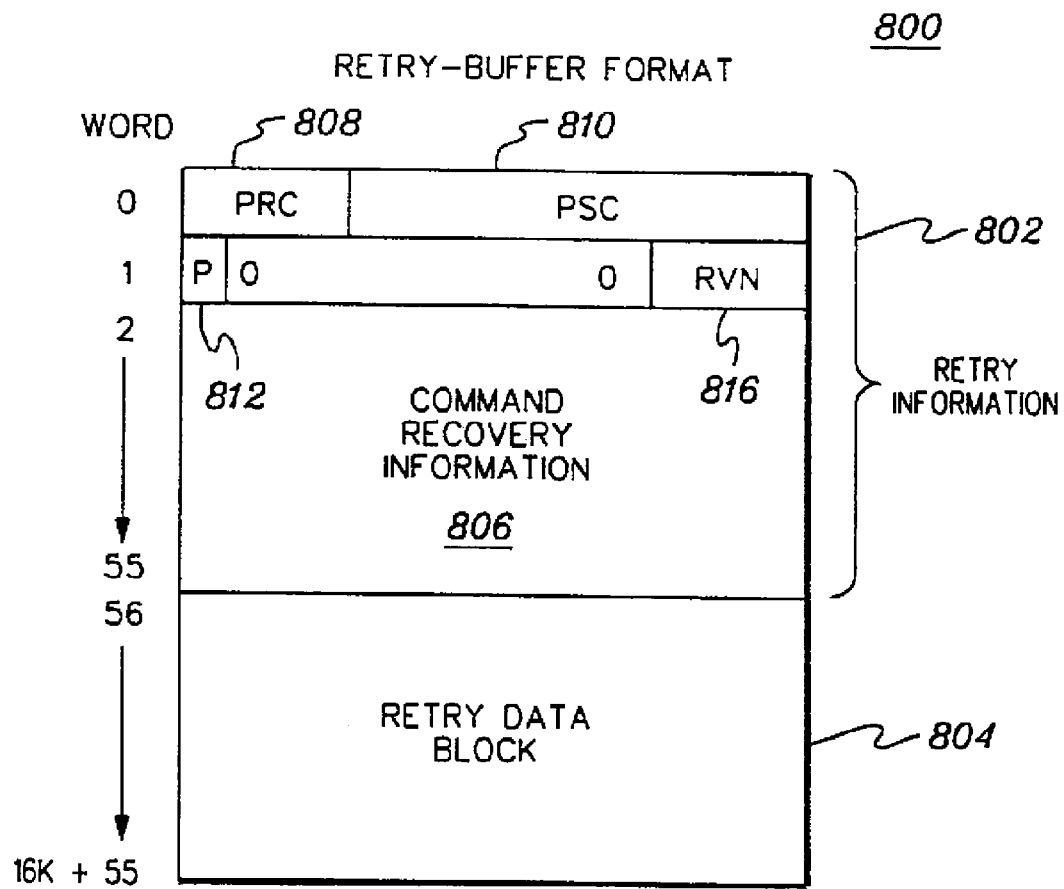
FIG. 8 depicts one example of a retry buffer format, in accordance with an aspect of the present invention.

As depicted in FIG. 8, a retry buffer 800 includes a retry-information portion 802, which is assigned from an area of coupling facility storage that is not available for structure allocation; and a retry-data-block portion 804, which is assigned from the structure-storage area associated with the retry data.

Each command that uses a retry buffer specifies a retry index (RX) as a request operand. The coupling facility places the retry data into the specified retry buffer as part of command execution. The retry information is returned in the message-response block and the retry-data block is returned to the location specified by the data-block address in the message-command block.

When the size of the data stored in the retry-data block is less than the maximum data size, the data is left justified in the retry-data block. The length of the retry data is placed in the data-count field of the response header.

Examples of retry-buffer objects are summarized in the following table and described below with reference to FIG. 8.

| Retry-Buffer Objects | Acronym |
|---|---|
| Command-recovery information | |
| Previous response code | PRC |
| Previous status conditions | PSC |
| Previous duplexing-deactivated indicator | PDDI |
| Retry-buffer authority | RBAU |
| Retry version number | RVN |

Command-Recovery Information 806: An area that includes command-specific recovery information used for command retry.

Previous Response Code (PRC) 808: The resulting response code for the last command to execute with the specified retry index. The object contains zeros when the retry index is assigned, but not in use.

Previous Status Conditions (PSC) 810: The resulting status conditions for the last command to execute with the specified retry index when the previous response code is a preferred value (e.g., 254 or 255). Otherwise, the object contains zeros.

Previous Duplexing Deactivated Indicator (PDDI) 812: The resulting duplexing deactivated indicator for the last command to execute with the specified retry index. The object is zero, when the retry index is assigned, but not in use.

Retry Version Number (RVN) 816: A value provided by the program and stored in the retry buffer as part of the retry data. The retry version number indicates command-execution status. When the retry version number matches the value in the message-command block, the command has completed, and the completion status is indicated by the values of the PRC and PSC fields. The retry version number is initialized to the value X'00', in one example, when the retry buffer is placed in the assigned-but-not-in-use state.

Retry-Buffer Authority (RBAU): A value set by the program when a retry buffer is assigned. The initial value of the retry-buffer authority is zero. In this example, RBAU is a separate component of the Retry-Buffer.

Cache Structure

In addition to global objects and retry objects, various objects are associated with individual types of structures of the coupling facility, such as, for instance, cache and list structures. Various of these objects are described below. Again, more, less or different objects may exist.

Examples of cache structure objects, located within a cache structure, that are associated with duplexing include, for instance:

Duplexing State (DPLXST): A value that indicates the duplexing state for the cache structure. It has the following encoding:

0 The cache structure is in the simplex state;
1 The cache structure is in the duplexing-active state.

The duplexing state is set to the simplex state or the duplexing-active state in correspondence with the duplexing-vector bit located at the offset in the duplexing vector equal to the value of the structure identifier (SID). The structure is in the simplex state, when the duplexing-vector bit is zero, and the structure is in the duplexing-active state, when the duplexing-vector bit is one.

Remote-Facility Node Descriptor (RFND): A value that includes the node-descriptor object of the remote coupling facility that has the duplexed copy of the cache structure. The remote-facility node descriptor is set, when duplexing is activated, and may be updated, while duplexing is active by an Activate-Duplexing command (described hereinafter). The initial state is zero.

Remote-Facility Structure Authority (RFSAU): A value that includes the structure authority of the duplexed copy of the cache structure. The remote-facility structure authority is set, when duplexing is activated, and may be updated, while duplexing is active by the Activate-Duplexing command. The initial state is zero.

Remote-Facility Structure Identifier (RFSID): A value that includes the structure identifier of the duplexed copy of the cache structure. The remote-facility structure-identifier is set, when duplexing is activated, and may be updated, while duplexing is active by the Activate-Duplexing command. The initial state is zero.

Remote-Facility System Identifier (RFSYID): A value that includes the system identifier of the remote coupling facility that has the duplexed copy of the cache structure. The remote-facility system-identifier is set, when duplexing is activated and may be updated, while duplexing is active by the Activate-Duplexing command. The initial state is zero.

List Structure

Examples of list structure objects, located within a list structure, that are associated with duplexing include, for instance:

Duplexing State (DPLXST): A value the indicates the duplexing state for the list structure. It has the following encoding:

| | |
|---|---|
| 0 | The list structure is in the simplex state; |
| 1 | The list structure is in the duplexing-active state. |

The duplexing state is set to the simplex state or the duplexing-active state in correspondence with the duplexing-vector bit located at the offset in the duplexing vector equal to the value of the structure identifier (SID). The structure is in the simplex state, when the duplexing-vector bit is zero, and the structure is in the duplexing-active state, when the duplexing-vector bit is one.

Remote-Facility Node Descriptor (RFND): A value that includes the node-descriptor object of the remote coupling facility that has the duplexed copy of the list structure. The remote-facility node descriptor is set, when duplexing is activated, and may be updated, while duplexing is active by the Activate-Duplexing command. The initial state is zero.

Remote-Facility Structure Authority (RFSAU): A value that includes the structure authority of the duplexed copy of the list structure. The remote-facility structure authority is set, when duplexing is activated, and may be updated, while duplexing is active by the Activate-Duplexing command. The initial state is zero.

Remote-Facility Structure Identifier (RFSID): A value that includes the structure identifier of the duplexed copy of the list structure. The remote-facility structure-identifier is set, when duplexing is activated, and may be updated, while duplexing is active by the Activate-Duplexing command. The initial state is zero.

Remote-Facility System Identifier (RFSYID): A value that includes the system identifier of the remote coupling facility that has the duplexed copy of the list structure. The remote-facility system-identifier is set, when duplexing is activated, and may be updated, while duplexing is active by the Activate-Duplexing command. The initial state is zero.

Message-Path Commands

Messages are communicated between a system, such as system 106 (FIG. 1), and one or more coupling facilities via a message command/response block. In one example, a message command/response block has a message command block, which includes a command block and a plurality of request operands; a message response block, which includes a response descriptor and a plurality of response operands; and an optional data block.

The message command/response blocks are employed by commands used for messaging. Examples of such commands include an Activate Message Path (AMP) command and an Identify Message Path (IMP) command, which are described below. The commands are issued by an operating system and executed by a coupling facility.

Activate Message Path (AMP)

One example of the request operands provided in the message command block for the AMP command are summarized in the following table.

| Request Operands | Acronym |
|---|---|
| Message Header | |
| Command Code | CC |
| Source ND Control | SRCNDC |
| Node Descriptor | ND |
| System Identifier | SYID |
| Message-path Identifier | MPID |
| Source Node Descriptor | SRCND |

In the above table, a source-node-descriptor control is listed. Since this operand has been added for duplexing, it is described below.

Source-Node-Descriptor Control (SRCNDC): A value that controls the setting of the contents of the source-node-descriptor object in the message-path status vector for the message path designated by the Activate-Message-Path command. It has the following encoding:

| | |
|---|---|
| 0 | No source-node-descriptor is provided. The state of the SRCND object is empty; |
| 1 | The source-node-descriptor operand is placed in the SRCND object. |

In execution of one embodiment of the Activate Message Path command, the node-descriptor operand is compared to the node-descriptor object, and the designated message path is compared to the message path used for communication. If both are the same, the message path enters the active state, the system identifier is placed in the message-path status vector; the source node descriptor is placed in the SRCND object, when the SRCNDC operand is B'1'; the SRCND object is placed in the empty state, when the SRCNDC operand is B'0'; the message-path request level is placed in the MPRL operand; and response code 0 is stored in the response-code operand. Otherwise, the message-path state is not changed, and response code 1 is stored.

The following response codes may be returned:
Message path activated—MPRL is returned;
Node Descriptor or MPID mismatch.

Note for the AMP Command:
1. When the Activate-Message-Path command is issued by the CFCC to a remote coupling facility, the SYID request operand is set equal to the value of the system-identifier sub-object of the authority object.

Identify Message Path (IMP)

One example of the request operands provided in the message command block for the IMP command are summarized in the following table and described herein.

| Request Operands | Acronym |
|---|---|
| Message Header | |
| Command Code | CC |
| Node Descriptor | |
| Message-Path Identifier | |
| Message-Path State | |
| Message-Path Request Level | |

In execution of one embodiment of the Identify Message Path, the node descriptor for the coupling facility is stored in the ND operand; the identifier of the message path used for communication is stored in the MPID operand; the message-path state is placed in the MPS operand; the message-path request level is stored in the MPRL operand; the system identifier is moved from the authority object to the SYID operand; the signaling-vector token is stored in the SVT operand; the contents are placed in the SRCND operand, when the source-node-descriptor object is not empty; and zeros are stored in the SRCND operand, when the source-node-descriptor object is empty.

The following response codes may be returned:

Message path information returned.

The response operands provided in the message response block for the IMP command are summarized in the following table.

| Response Operands | Acronym |
| --- | --- |
| Response Descriptor | |
| Response Code | RC |
| Message-Path State | MPS |
| Message-Path Request Level | MPRL |
| Message-Path Identifier | MPID |
| Node Descriptor | ND |
| System Identifier | SYID |
| Signaling-Vector Token | SVT |
| Source Node Descriptor | SRCND |

Global Commands for Duplexing

In addition to the messaging commands described above, there are other types of commands that are employed for processing associated with coupling facilities. One type of commands is global commands for duplexing, which are used to control the duplexing of coupling facility structures (e.g., activate duplexing, deactivate duplexing, etc.). These commands are described below, but before describing the commands, various global operands are described, which are employed by the duplexing commands, as well as other coupling facility commands.

Global Operands

Examples of global operands used as request/response operands for commands associated with coupling facility processing are described below:

Comparative Authority (CAU): A value that is compared with the value of the authority control.

Comparative Structure Authority (CSAU): A value that is compared with the value of the structure-authority control.

Comparative Remote-Facility Structure Authority (CRFSAU): A value that is compared with the value of the remote-facility-structure-authority control.

Connection Operation Request Type (COPRT): A value that determines the type of connection operation that is requested on a Probe-Remote-Facility-Connection (PRFC) command (described hereinafter). It has the following encoding:

| | |
| --- | --- |
| 0 | Verify remote-facility attachment; |
| 1 | Drop remote-facility connection. |

Data-Block Size (DBS): A value that specifies the size of the data block as an integral multiple of, for instance, 4096-byte units. Valid values range from 1 to 16, in this example.

Preserve-Duplexing Indicator (PDI): A value that indicates whether the duplexing vector and the signaling vector should be preserved, when a Set-Facility-Authority command updates the authority control. It has the following encoding:

| | |
| --- | --- |
| 0 | Reset both the duplexing vector and the signaling vector; |
| 1 | No change is made to the duplexing vector or the signaling vector. |

Read CFIB Type (RCFIBT): A value that determines the type of coupling-facility information block returned by a Read-Connected-Facility-Controls (RCFC) command (described hereinafter). It has the following encoding:

| | |
| --- | --- |
| 0 | Return remote facility controls only; |
| 1 | Return remote facility controls and signal counters. |

Remote-Facility Node Descriptor (RFND): A value that includes the node-descriptor object of the remote coupling facility that has the duplexed copy of the structure. The remote-facility node descriptor is to be different from the local node-descriptor object.

Remote-Facility Structure Authority (RFSAU): A value that includes the structure authority of the duplexed copy of the structure.

Remote-Facility Structure Identifier (RFSID): A value that includes the structure identifier of the duplexed copy of the structure.

Remote-Facility System Identifier (RFSYID): A value that includes the system identifier of the remote coupling facility that has the duplexed copy of the structure.

Examples of duplexing commands include an Activate Duplexing Command, a Deactivate Duplexing Command, a Probe Remote Facility Connection command, a Read Connected Facility Controls command, a Read Duplexing Vector command, a Test Remote Facility Access command, and a Set Retry-Buffer Authority command, each of which is issued by an operating system and executed by a coupling facility and described below.

Activate Duplexing (ADPLX)

One embodiment of various request operands provided in the message command block for the ADPLX command are summarized in the following table and described herein.

| Request Operands | Acronym |
| --- | --- |
| Message Header | |
| Command Code | CC |
| Structure Identifier | SID |
| Remote-Facility Structure Identifier | RFSID |
| Remote-Facility System Identifier | RFSYID |
| Remote-Facility Node Descriptor | RFND |
| Comparative Structure Authority | CSAU |
| Remote-Facility Structure Authority | RFSAU |

Figure 9:
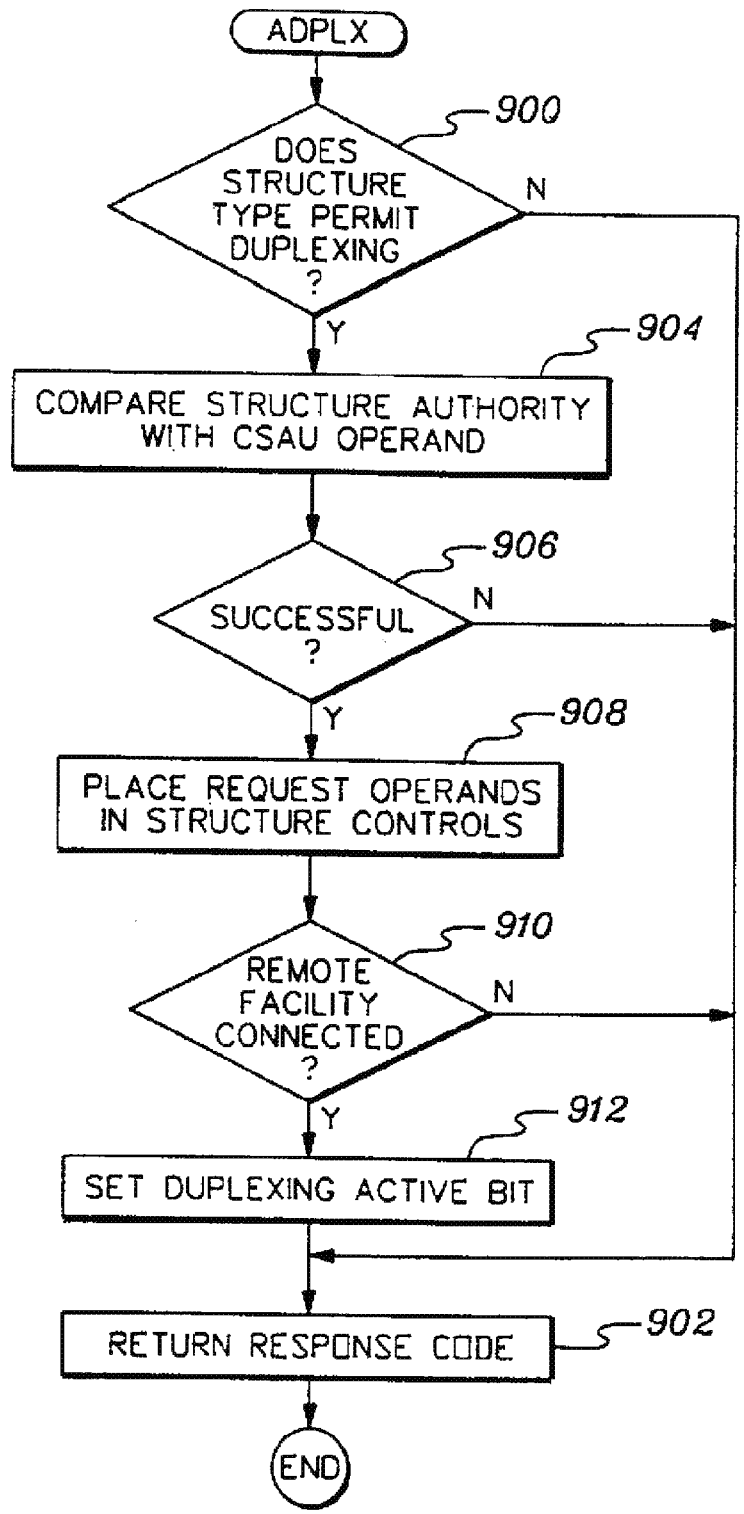
FIG. 9 depicts one embodiment of the logic associated with activating duplexing, in accordance with an aspect of the present invention.

Moreover, one embodiment of the logic associated with the ADPLX command is described below with reference to FIG. 9.

Initially, a determination is made as to whether the structure type permits duplexing, INQUIRY 900. For instance, if the structure is a list structure that includes a list set, and a Programmable List Entry Identifier (PLEIDI) control is B'0', the structure type does not permit duplexing to be activated.

In this case, the command is completed without updating any objects and a response code (e.g., 3) is returned, STEP 902.

When the structure type permits duplexing to be activated, the structure authority is compared with the CSAU operand, STEP 904. If the comparison succeeds, INQUIRY 906, the remote-facility node descriptor, the remote-facility structure authority, the remote-facility structure identifier, and the remote-facility system identifier request operands are placed in the structure controls, STEP 908, and the accessibility of the remote facility is determined, INQUIRY 910.

If the structure-authority comparison succeeds and the designated remote facility is connected, the duplexing-active bit in the duplexing vector is set to one, STEP 912, and a response code (e.g., 0) is returned, STEP 902.

If the structure-authority comparison succeeds, but the designated remote facility is not connected, INQUIRY 910, then the duplexing-active bit in the duplexing vector is not updated, and a response code (e.g., 1) is returned, STEP 902.

If the structure authority is not equal to the CSAU operand, INQUIRY 906, then the command is completed without updating any objects. The value of the structure authority and a response code (e.g., 2) are returned, STEP 902.

The following response codes may be returned:
Remote facility is connected
Remote facility is not connected
CSAU mismatch—Structure authority is returned
Invalid structure type.

Disallowing of Duplexing for List Structures with LEID-Based Addressing

The extension of the command atomicity rules to a duplexed command pair is accomplished by the implementation of latches on structure objects or internal control structures. Latches are obtained and held in both structures until the ready-to-complete signal is exchanged. Reception of a ready-to-complete signal confirms that latches have been obtained in the remote facility. However, if the structure is a list structure that has a list set, but where LEIDs are internally generated (PLEIDI=B'0'), then it may be possible to violate the command atomicity rules, as the following example demonstrates.

Suppose that a duplexed pair of list structures located on coupling facilities CF0 and CF1 with internally generated LEIDs concurrently process a Write List Entry (WLE) command pair with an unconditional create request and a Delete List Entry (DLE) command pair with a request to locate by LEID. Further, suppose that the DLE command specifies an LEID value of X that is identical to the internally generated LEID for the WLE command. Finally, assume the commands are processed out of order by the two facilities, where the WLE command is processed first by CF0 and the DLE command is processed first by CF1.

The WLE command succeeds in processing the create request, generates a list entry with LEID=X, issues a ready-to-complete signal and maintains the latch on the list entry until a read-to-complete signal is received from the duplexed WLE command. The DLE command is delayed by the latch in CF0.

The DLE command executes in CF1 and does not find a list entry with the specified LEID. The DLE command completes with a RC=8 condition, issues a ready-to-complete signal, and waits until a ready-to-complete signal is received from the duplexed DLE command. No latches are held and the WLE command is free to execute.

The WLE command on CF1 succeeds in processing the create request, generates a list entry with LEID=X, and issues a ready-to-complete signal. Both WLE commands recognize the reception of a ready-to-complete signal and both complete with RC=0 and the latches on the list entry are released in both structures.

The DLE command in CF0 is now free to execute, finds the newly created list entry with LEID=X, deletes the entry and sends a ready-to-complete signal. Both DLE commands recognize the reception of a ready-to-complete signal and complete processing. However, the DLE command from CF0 returns a RC=0 condition and the DLE command from CF1 returns an RC=8 condition, entry not found. More importantly, the list structures are no longer synchronized; a list entry with LEID=X exists in CF1, but not in CF0.

The failure to maintain command atomicity across the structures results from two events:
1. The lack of an object to latch by the DLE command that executes in CF1,
2. The specification of the 'next LEID' to be generated by the DLE command.

This problem is avoided if PLEIDs are used; the PLEID collision list in the list structure controls provides the required object for serialization.

One solution to this problem is to disallow duplexing to be activated for structures of this type. In this case, the Activate-Duplexing command ends with a response code (e.g., 3) condition. For list structures with list sets, assignment of LEIDs are to be under the control of the operating system and the PLEIDI control is to be b'1' in the list structure type, Deactivate Duplexing (DDPLX)

One embodiment of the request operands provided in the message command block for a DDPLX command are summarized in the following table and described herein.

| Request Operands | Acronym |
| --- | --- |
| Message Header | |
| Command Code | CC |
| Structure Identifier | SID |
| Comparative Structure Authority | CSAU |
| Comparative Remote-Facility Structure Authority | CRFSAU |

Figure 10:
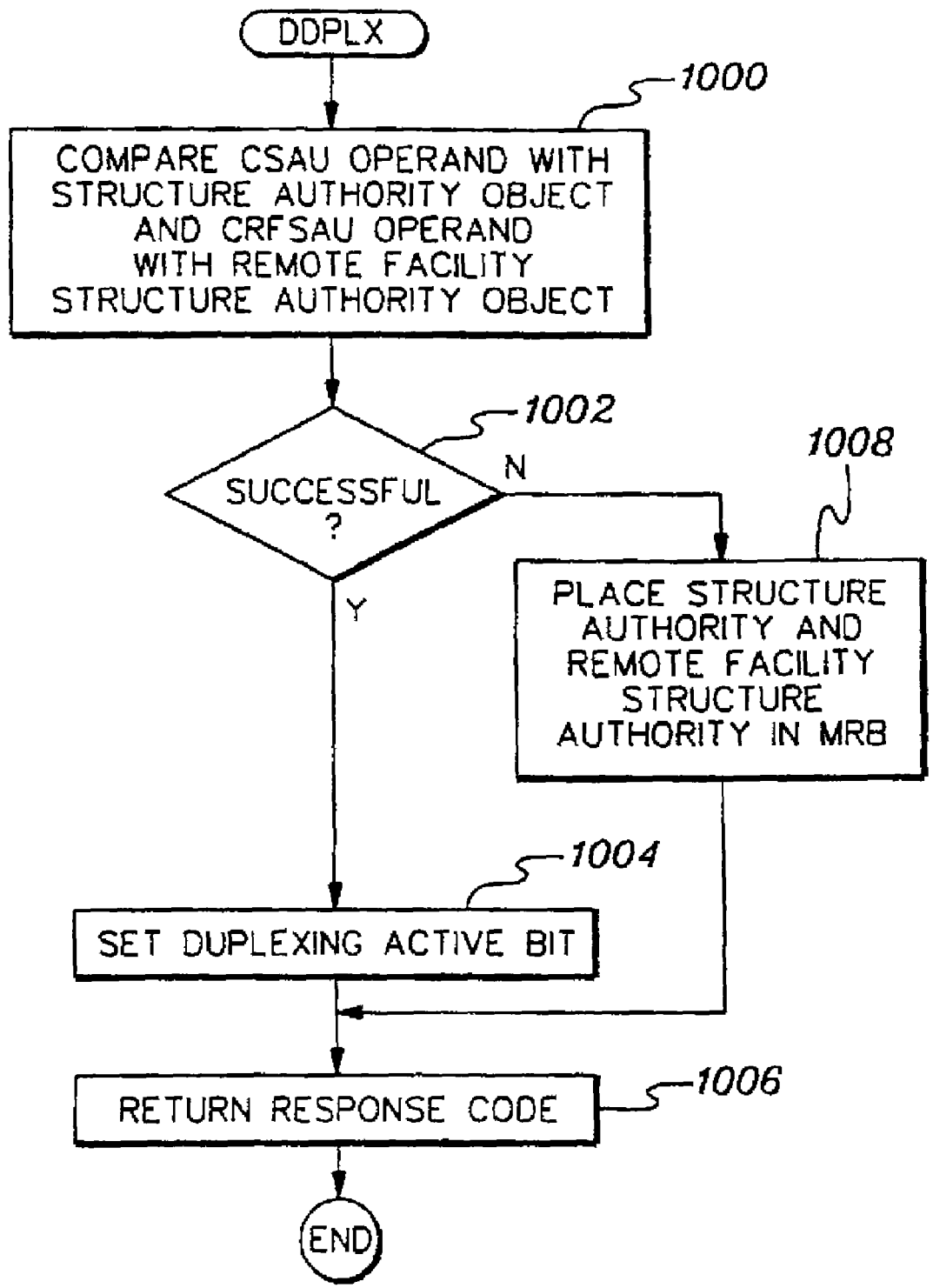
FIG. 10 depicts one embodiment of the logic associated with deactivating duplexing, in accordance with an aspect of the present invention.

Moreover, one embodiment of the logic associated with the DDPLX is described with reference to FIG. 10.

Initially, the CSAU operand is compared with the structure-authority object and the CRFSAU operand is compared with the remote-facility structure authority object, STEP 1000. If both comparisons are successful, INQUIRY 1002, the duplexing-active bit specified by the SID operand is set to zero, STEP 1004, and a response code (e.g., 0) is returned, STEP 1006. The remote-facility-node-descriptor, the remote-facility-system-identifier, the remote-facility-structure-identifier, and the remote-facility-structure-authority objects are not updated.

If the structure authority is not equal to the CSAU operand or if the remote-facility structure authority is not equal to the CRFSAU operand, INQUIRY 1002, then the structure authority and remote-facility structure authority are placed in the MRB, STEP 1008. The MRB and a response code (e.g., 2) are returned, STEP 1006.

The following response codes may be returned:
Duplexing deactivated;
CSAU or CRFSAU mismatch—Structure authorities are returned.

Probe Remote Facility Connection (PRFC)

One embodiment of the request operands provided in the message command block for the PRFC command are summarized in the following table and described herein.

| Request Operands | Acronym |
|---|---|
| Message Header | |
| Command Code | CC |
| Connection Operation Request Type | COPRT |
| Retry Index | RX |
| Retry Version Number | RVN |
| Remote-Facility Node Descriptor | RFND |
| Remote-Facility System Identifier | RFSYID |

Figure 11:
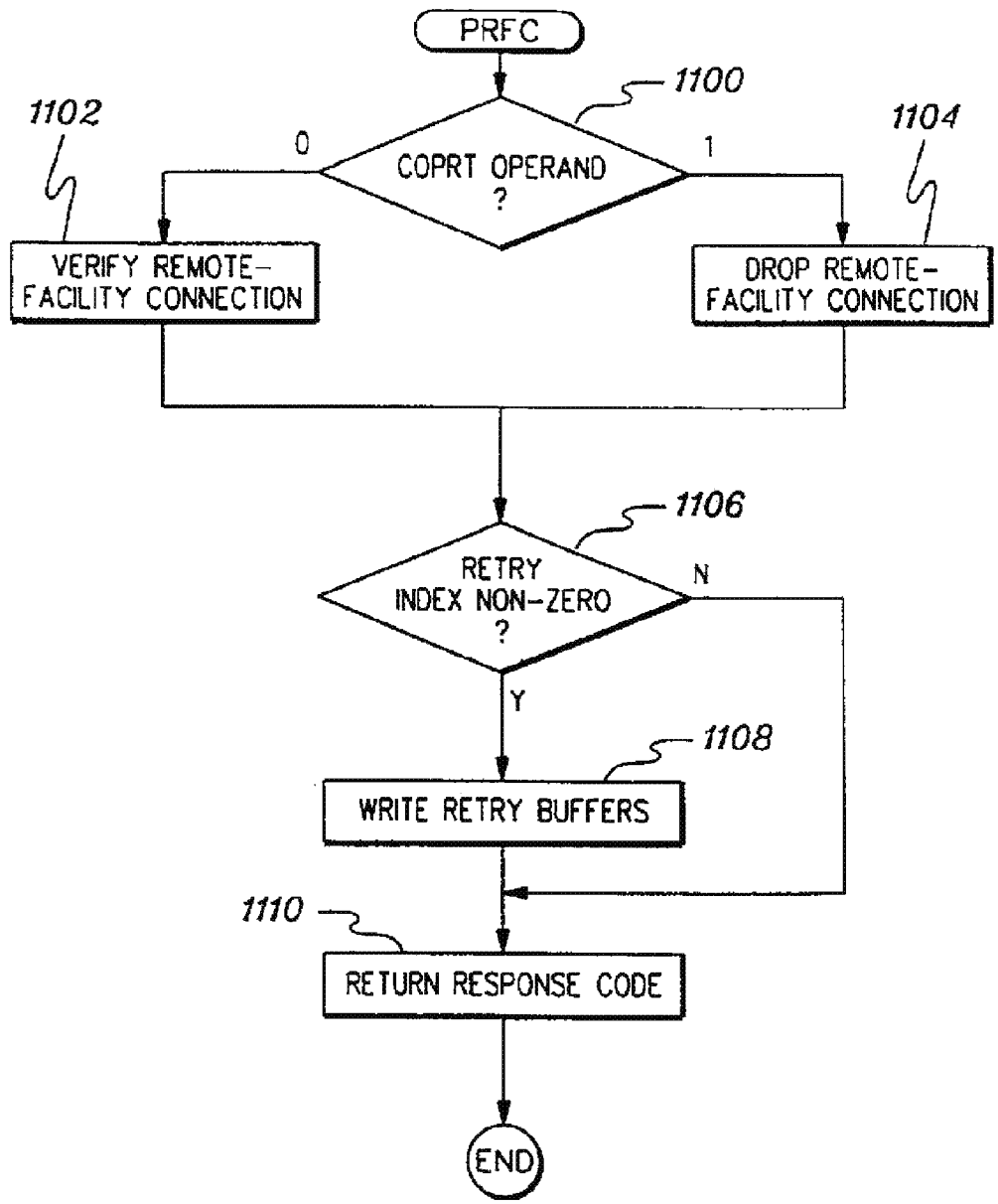
FIG. 11 depicts one embodiment of the logic associated with a Probe Remote Facility Connection command, in accordance with an aspect of the present invention.

Further, one embodiment of the logic associated with the PRFC command is described with reference to FIG. 11.

An operation is performed for the specified remote-facility connection and the results of the operation are returned in the response block.

The operation that is performed depends on the connection operation request type. When the COPRT operand is zero, INQUIRY 1100, the remote-facility attachment is verified, STEP 1102, as follows:
 1. A message path in the remote facility path group is selected.
 2. An Identify Message Path (IMP) command (described herein) is issued to the remote facility on the selected message path.
 3. If the IMP command completes successfully, the ND, SYID and SVT response operands are compared with the RFND, RFSYID, and RFSVT remote facility controls. If the controls match, the remote-facility is verified as attached and the command completes. A response code (e.g., 0) is returned.
 4. If the IMP command fails to complete successfully, or if the values returned do not match the corresponding remote-facility controls, another path in the path group is selected and another IMP command is issued.
 5. If no IMP command has successfully verified the attachment, and if no paths remain in the path group, the attachment verification fails. The command completes and a response code (e.g., 1) is returned.

When the COPRT operand is one, INQUIRY 1100, the remote-facility connection is dropped, STEP 1104, by initiating a coupling facility link initialization operation for each coupling facility link with an available sender CHPID at the local coupling facility and an available receiver CHPID at the remote coupling facility. (In one example, this step is performed by a channel subsystem.) Model-dependent means are used to initiate the coupling facility link initialization procedure. When the coupling facility link initializations have been successfully initiated, the command completes and a response code (e.g., 0) is returned. After the link initialization operations have completed, the remote-facility connection may be reestablished at any time.

When the retry index is non-zero, INQUIRY 1106, the retry buffer is written, STEP 1108.

The following response codes may be returned, STEP 1110:
 Operation Successful—Retry version number returned;
 Attachment not verified—Retry version number returned.
Note for the PRFC Command:
 1. The Probe-Remote-Facility Connection operation is performed as a single continuous process. In some cases, the length of the process may exceed a 300 millisecond time limit and an interface control check may be presented before the operation completes. The retry buffer is used in this case to present the results of the operation to the program. Command-quiescing rules ensure that the retry buffer cannot be read before the process is completed and the MRB is stored in the retry buffer.

Read Connected Facility Controls (RCFC)

One embodiment of various request operands provided in the message command block for the RCFC command are summarized in the following table and described herein.

| Request Operands | Acronym |
|---|---|
| Message Header | |
| Command Code | CC |
| Read CFIB Type | RCFIBT |
| Data Block Size | DBS |

In execution of one embodiment of the RCFC command, when sufficient message-buffer space is provided, a connected-facility information block (CFIB) is added to the data block and the processed count is increased by one for each connected coupling facility.

When the RCFIBT operand is, for instance B'0', a 128-byte CFIB including the remote facility controls is stored in the data block. One example of a CFIB, when the RCFIBT is B'0' is, as follows:

| Data Operands | Acronym |
|---|---|
| Remote-Facility System Identifier | RFSYID |
| Remote-Facility Signaling Vector Token | RFSVT |
| Remote-Facility Path Group Size | RFPGS |
| Remote-Facility Controls Time of Creation | RFCTOC |
| Remote-Facility Path Descriptor #1 | RFPD 1 |
| Remote-Facility Path Descriptor #2 | RFPD 2 |
| ... | ... |
| Remote-Facility Path Descriptor # PGS | RFPD PGS |
| Remote-Facility Node Descriptor | RFND |

When the RCFIBT operand is, for instance, B'1', a 256-byte CFIB including the remote-facility controls and signal counters is stored in the data block. One example of the CFIB, when the RCFIBT is B'1' is, as follows:

| Data Operands | Acronym |
|---|---|
| Remote-Facility System Identifier | RFSYID |
| Remote-Facility Signaling Vector Token | RFSVT |
| Remote-Facility Path Group Size | RFPGS |
| Remote-Facility Sender Path Group Size | RFSPGS |
| Remote-Facility Controls Time of Creation | RFCTOC |
| Remote-Facility Path Descriptor #1 | RFPD 1 |
| Remote-Facility Path Descriptor #2 | RFPD 2 |
| ... | ... |
| Remote-Facility Path Descriptor # PGS | RFPD PGS |
| Remote-Facility Node Descriptor | RFND |
| Ready-to-Execute Signal Counter | RTESC |
| Ready-to-Complete Signal Counter | RTCSC |
| Halt-Execution Signal Counter | HESC |
| Request-for-Suppression Signal Counter | RFSSC |
| Request-for-Suppression Accepted Signal Counter | RFSASC |
| Signal-Service Time First Moment | SSTFM |
| Signal Service Time Second Moment | SSTSM |
| Delayed Signal Counter | DSC |
| Signal Delay Time First Moment | SDTFM |
| Signal Delay Time Second Moment | SDTSM |

| Data Operands | Acronym |
| --- | --- |
| Signal Redrives Signal Counter | SRDSC |
| Remote-Facility Channel Path Identifier #1 | RFCHP 1 |
| Remote-Facility Channel Path Identifier #2 | RFCHP 2 |
| ... | ... |
| Remote-Facility Channel Path Identifier # PGS | RFCHP PGS |
| Remote-Facility Sender Path Descriptor #1 | RFSPD 1 |
| Remote-Facility Sender Path Descriptor #2 | RFSPD 2 |
| ... | ... |
| Remote-Facility Sender Path Descriptor # SPGS | RFSPD SPGS |
| Remote-Facility Sender Channel Path Identifier #1 | RFSCHP 1 |
| Remote-Facility Sender Channel Path Identifier #2 | RFSCHP 2 |
| ... | ... |
| Remote-Facility Sender Channel Path Identifier # SPGS | RFSCHP SPGS |

When all connected coupling facility controls have been placed in a CFIB list, the CFIB list, the processed count and a response code (e.g., 0) are returned to the program.

When the data block is full and additional connected facility controls are to be added to the list, the CFIB list, the processed count and a response code (e.g., 4) are returned to the program.

When the product of the value of the DBS operand and 4096 is larger than the message-buffer size, there is insufficient message-buffer space to contain the data block. In this case, the command is completed and a response code (e.g., 11) is returned.

The following response codes may be returned:
All CFIBs returned—CFIB list and processed count are returned;
Data-block size too small—CFIB list and processed count are returned;
Insufficient message-buffer space.

Read Duplexing Vector (RDV)

The request operands provided in the message command block for the RDV command are summarized in the following table and described herein.

| Request Operands | Acronym |
| --- | --- |
| Message Header | |
| Command Code | CC |
| Data Block Size | DBS |

In execution of one embodiment of the RDV command, when sufficient message-buffer space is provided, the duplexing vector is placed in the data block, the SID limit is placed in the Sid Limit (SL) operand, and a response code (e.g., 0) is placed in the Response Code (RC) operand.

When the product of the value of the DBS operand and 4096 is larger than the message-buffer size, there is insufficient message-buffer space to contain the data block. In this case, the command is completed and a response code (e.g., 11) is returned.

The following response codes may be returned:
Duplexing vector is returned;
Insufficient message-buffer space.

Test Remote Facility Access (TRFA)

The request operands provided in the message command block for the TRFA command are summarized in the following table and described herein.

| Request Operands | Acronym |
| --- | --- |
| Message Header | |
| Command Code | CC |
| Remote-Facility System Identifier | RFSYID |
| Remote-Facility Node Descriptor | RFND |

In execution of one embodiment of the TRFA command, when the remote facility accessibility level is connected, a response code (e.g., 0) is returned. When the remote facility is not connected, the remote-facility disconnect time, the remote-facility-disconnect-time validity indicator, and a response code (e.g., 1) are returned.

The following response codes may be returned:
Remote Facility Connected;
Remote Facility Not Connected—Remote-Facility Disconnect Time returned.

Set Retry-Buffer Authority (SRBA)

The request operands provided in the message command block for the SRBA command are summarized in the following table and described herein.

| Request Operands | Acronym |
| --- | --- |
| Message Header | |
| Command Code | CC |
| Retry Index | RX |
| Comparative Retry-Buffer Authority | CRBAU |
| Retry-Buffer Authority | RBAU |

Figure 12:
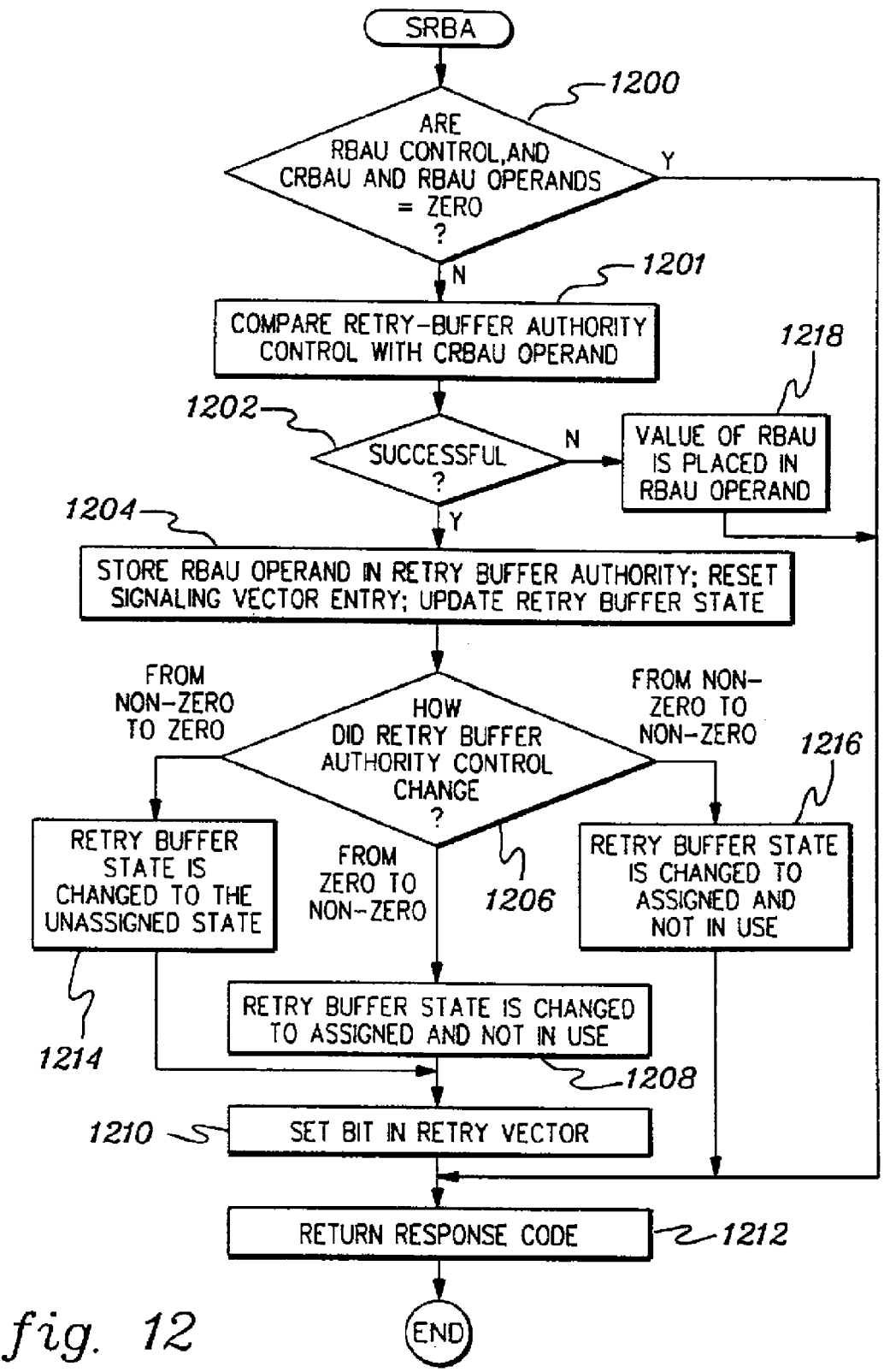
FIG. 12 depicts one embodiment of the logic associated with a Set Retry Buffer Authority command, in accordance with an aspect of the present invention.

One embodiment of the logic associated with the SRBA command is described with reference to FIG. 12.

Initially, a determination is made as to whether the RBAU control, and CRBAU and RBAU operands are zero, INQUIRY 1200. If not, then processing continues with a comparison of the retry-buffer-authority control value to the CRBAU operand, STEP 1201. When they compare as equal, INQUIRY 1202, the value of the RBAU operand is stored in the retry-buffer authority, the signaling-vector entry associated with the retry index is reset, and the retry-buffer state is updated, STEP 1204.

When the retry-buffer-authority control is changed from zero to a non-zero value, INQUIRY 1206, the retry-buffer state is changed from unassigned to assigned and not in use, STEP 1208, the bit in the retry vector addressed by the retry index is set to one, STEP 1210, and a response code (e.g., 0) is returned, STEP 1212.

When the retry-buffer-authority control is changed from a non-zero value to zero, the retry-buffer state is changed to the unassigned state, STEP 1214, the bit in the retry vector addressed by the retry index is set to zero, STEP 1210, and a response code (e.g., 1) is returned, STEP 1212.

When the retry-buffer-authority control is changed from a non-zero value to a non-zero value, the retry-buffer state is set to assigned and not in use, STEP 1216, and a response code (e.g., 2) is returned, STEP 1212.

When the compare fails, INQUIRY 1202, the retry-buffer state is not changed. The value of the retry-buffer authority is placed in the RBAU operand, STEP 1218. The RBAU operand and a response code (e.g., 4) are returned, STEP 1212.

When the retry-buffer-authority control is initially zero and both the CRBAU and RBAU operands are zero, INQUIRY 1200, the retry-buffer remains in the unassigned state, and a response code (e.g., 3) is returned, STEP 1212.

The following response codes may be returned:
Retry buffer enters assigned state;
Retry buffer enters unassigned state;
Retry buffer remains assigned;
Retry buffer remains unassigned;
Comparison failed—Retry-Buffer Authority returned.
Notes on Set Retry Buffer Authority command:
1. When a cache or locking command completes with an interface control check, the MRB is lost, and thus the value of the current-signal-group index cannot be determined. The operating system can reset the signaling-vector entry by issuing a Set-Retry-Buffer-Authority command, specifying the retry index that was used by the command and setting the CRBAU and RBAU operands equal to the RBAU object.
2. When a command completes with interface control check and the command was a duplexed command, the signaling-vector entry in the coupling facility associated with the duplexing retry index and the duplexing signal group index is in an unknown state. Signals may continue to be sent from the coupling facility that presented the interface control check until the command clear status is recognized. The operating system can reset the signaling-vector entry by issuing a Set-Retry-Buffer-Authority command. However, the execution of the SRBA command is to be delayed until at least one command is observed to complete at the coupling facility that presented the IFCC. An example sequence of this recovery is the following:
   i. A duplexed command is sent to CF 1 and CF 2.
   ii. The command on CF 1 completes, but the command on CF 2 ends with an IFCC.
   iii. An IMP command is issued to CF 2 and completes. The rules for command quiesce in the coupling facility require, in one example, the duplexed command to be completed or suppressed, prior to executing the IMP command. So, completion of the IMP command indicates that the duplexed command is no longer executing in CF 2.
   iv. The SRBA command is issued to CF 1 to reset the signaling vector entry associated with the retry index and current signal-group index in CF 1.
   v. The SRBA command is issued to CF 2 to reset the signaling vector entry associated with the retry index and current signal-group index in CF 2. The two SRBA commands can be issued in parallel.
   An alternate sequence would be for the IMP command sent to CF 2 to be replaced by the SRBA command. This would eliminate one step, but would place an ordering requirement on the retry-buffer commands sent to each coupling facility.
3. If the IMP command issued in step iii in the previous note fails to complete, then connectivity to the structure in CF 2 is lost and duplexing is broken. However, one is to guarantee that no signals are being sent from CF 2 to CF 1 before the SRBA command can be issued to CF 1. This can be accomplished by issuing a Probe-Remote-Facility-Connection command to CF 1, specifying CF 2 as the remote facility. This can be done in two steps, with the first step requesting the operation of verifying the attachment. This operation is benign in that only IMP commands are issued and no state changes are made to any objects. However, this command may not succeed, in which case the operation of dropping the connection should be invoked. This operation is guaranteed to complete.

Figure 13A:
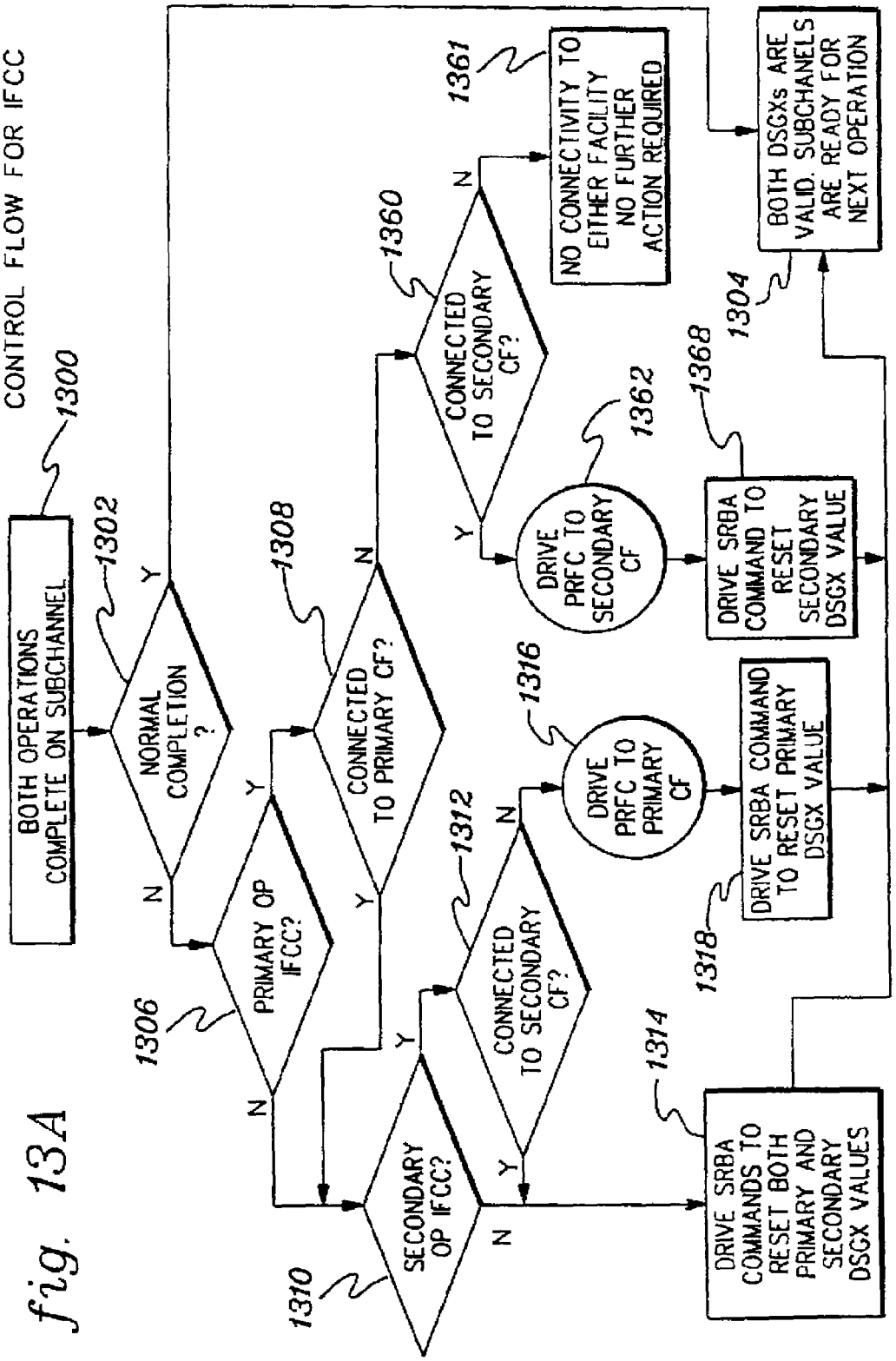
FIGS. 13a and 13b depict one embodiment of the logic associated with the control flow for an Interface Control Check (IFCC), in accordance with an aspect of the present invention.
Figure 13B:
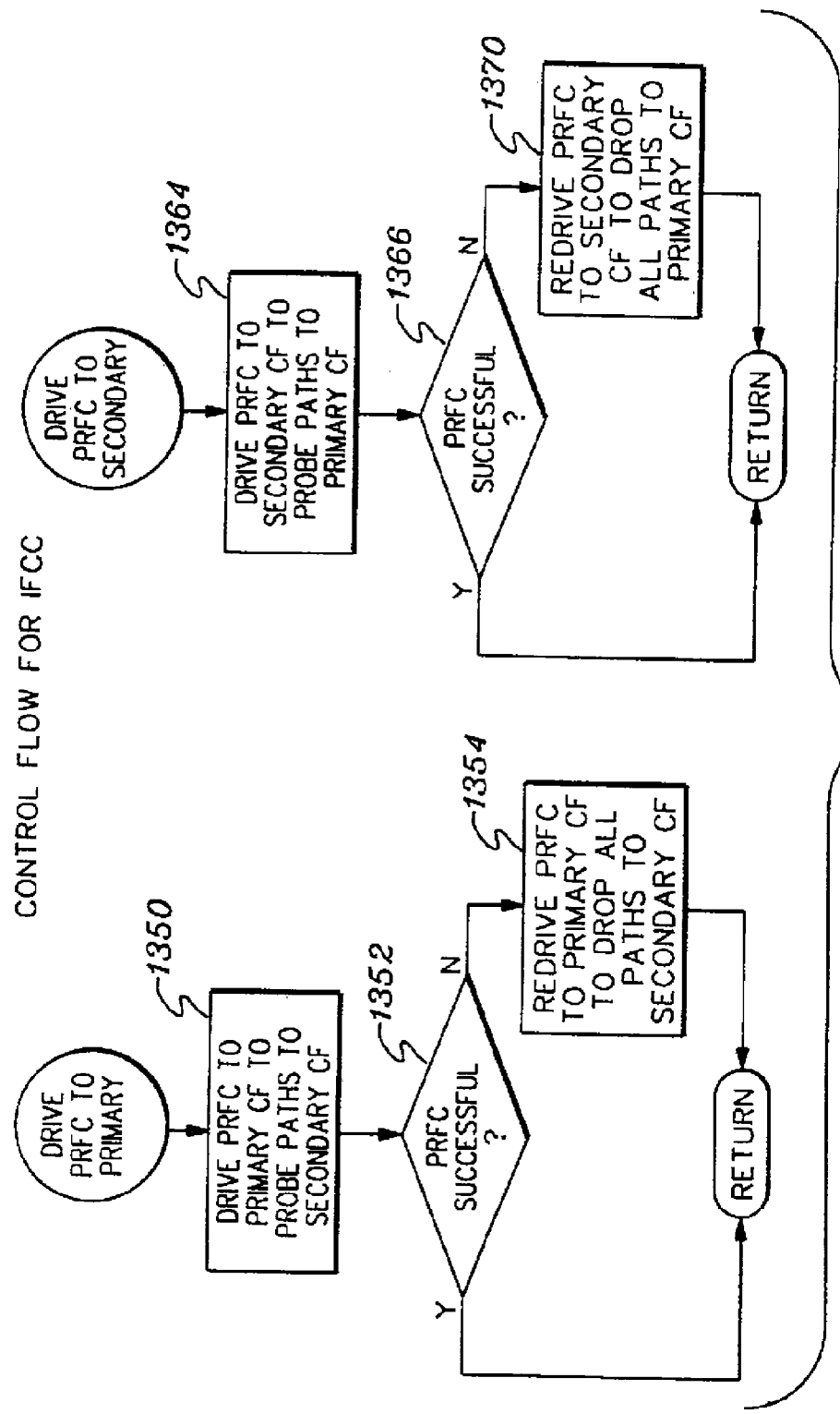

FIGS. 13a & 13b describe one embodiment of the flow of control in the OS for handling interface control checks (IFCC). First, the OS waits for both operations to complete at the subchannel, STEP 1300. If both end with normal completions, INQUIRY 1302, as indicated by, for instance, valid duplexing signal group indices (DSGXs) (described below), then the duplexing signal group index that is to be used by the next operation selecting these subchannels (and associated retry index) is updated in internal controls to the values returned in the CSGX fields in the respective response descriptors, STEP 1304. At that point, the subchannels are made available for use by the next operation. However, if one or both commands complete with an interface control check, then the signaling vector entries associated with the subchannel and retry index in each facility are recovered before the subchannels are made available.

One embodiment of the recovery flow is described next. If the primary operation ended with an IFCC, INQUIRY 1306, then the connection to the primary coupling facility is tested by issuing an IMP command, STEP 1308. Successful completion of the IMP command implies two things. First, the connection itself is verified. Second, the command quiescing rules dictate that execution of the IMP command indicates that the command being recovered has completed. So, in particular, no signals are being issued by CF 1 on behalf of that command.

Should the primary coupling facility be connected or if the primary operation did not end with an IFCC, then a similar check is made of the secondary command, INQUIRY 1310. If the secondary command ended with an IFCC, then the connection to the secondary coupling facility is tested, INQUIRY 1312. If the secondary command succeeded successfully, or if the secondary command had an IFCC and the subsequent IMP command succeeded, then all signals are guaranteed to have stopped flowing and the signal group index in each signaling vector can be reset by issuing an SRBA command to each coupling facility, STEP 1314. If, however, the secondary command had an IFCC and the IMP command fails, then a Probe-Remote-Facility command (PRFC) is issued to the primary coupling facility, STEP 1316. This is described further with reference to FIG. 13b.

Initially, the PRFC command is issued with the verify option, STEP 1350. If unsuccessful, INQUIRY 1352, the OS escalates to the function of dropping the remote facility connection, STEP 1354. In one example, this is done by redriving the PRFC. Forcing this connection to be dropped ensures that the remote coupling facility recognizes a state change in the peer ISC link which stops any signals from being issued once the connection is dropped. (It should be noted that the connection can be immediately reestablished, so long as the state transition is made in the connection.)

Subsequent to redriving the PRFC or if the initial PRFC is successful, then the SRBA command is issued to reset the primary DSGX value, STEP 1318 (FIG. 13a).

Returning to INQUIRY 1308, if there is no connection to the primary coupling facility, then there is a further determination is made as to whether there is a connection to the secondary coupling facility, INQUIRY 1360. If there is no connection to either facility, then no further action is required, STEP 1361.

However, if there is connectivity to the secondary facility, then a Probe-Remote-Facility command is issued to the secondary coupling facility, STEP 1362, as described further with reference to FIG. 13b.

Similar to the logic described above, the PRFC command is issued with the verify option, STEP 1364. If the PRFC command is unsuccessful, INQUIRY 1366, then the operating system escalates to the function of dropping the remote facility connection, STEP 1370. Thereafter, or if the initial PRFC is successful, then an SRBA command is driven to reset the secondary DSGX value, STEP 1368 (FIG. 13*a*).

Once the SRBA command has been successfully completed to each coupling facility that had an IFCC, the DSGX value associated with the subchannel is set to one and the subchannels are made available for reuse. In this case, they will most likely be reused for retrying the failed duplexed operation. But, other subchannels may also be selected.

Duplexing Signal Processing

Duplex-command pairs, when they execute in the coupling facilities, exchange duplex signals between the coupling facilities. In one embodiment, the list notification command is used to exchange the duplex signals. Further, to facilitate exchanges of duplex signals, each coupling facility has one or more sender channels and one or more receiver channels that connect the two coupling facilities. (See, e.g., FIG. 4.) The duplex signals are used to extend the object and command concurrency rules across the synchronized objects in each coupling facility. The set of duplex signals and their protocols are described next.

Duplex Signaling

Signaling Vector Entries

In one embodiment, the duplex signaling protocol employs a signaling vector, which has a plurality of entries. In one example, there is a signaling vector entry for each retry buffer.

The duplex commands use signal groups in the signaling vector to coordinate the progress of the first and subsequent entries in a command. In a duplex command, there is a signal-group-index value which indicates which of the signal groups is the current-signal group in the duplex coupling facility. The current-signal-group-index value designates the current signal group in the recipient coupling facility. The value of this index points to the signal group that is to be used for the entry of the command in the respective coupling facility's signaling vector. The signal-group indexes are incremented as part of the process of committing an entry, or completing the command. When the signal-group-index object reaches three and increments, the value wraps to one.

The Set-Retry-Buffer-Authority command (described above) is used to set the signal-group values for all signal-group indexes to zero and reset the signal-group index to one.

Duplex commands return the incremented signal-group-index value in the MRB. This value is used in subsequent duplex commands as the current-signal-group-index value.

In one embodiment, the LFSS component manages the assignments of signal-group-index values.

Notes on Signaling Vector Entries:

1. Retry indexes are assigned on a subchannel basis. A single retry index value is not used by two different operating system images.
2. The LFSS component, as one example, maintains a table of index values to be used for the next issuance of a command on a subchannel. This means that the operating system remembers one signal group index value per subchannel (or per RX, equivalently).

Duplex Signaling Operands

This section defines the signaling operands. Request operand validity is checked by the receiving coupling facility. Detection of invalid values results in the command failing.

One embodiment of duplex signaling operands, used in accordance with an aspect of the invention, include, for instance:

Duplex Retry Index (DRX): A value that designates the duplex retry buffer. The duplex retry index is provided as a request operand on the duplexing command.

Duplex Signal Group Index (DSGX): A value that identifies the duplex signal group to be updated in the signaling vector. Valid DSGXs are assigned DSGX values within the range of one to three, as an example. An invalid DSGX does not update the signal-vector.

Duplex Signal (DS): A value that indicates the duplex signal to be set in the signaling vector. Valid values are, for instance, one through five. An invalid value results in a signal vector bit not being set. It has the following encoding, as example:

| | |
|---|---|
| 000 | Invalid |
| 001 | Ready to execute |
| 010 | Ready to complete |
| 011 | Request for suppression |
| 100 | Request for suppression accepted |
| 101 | Halt execution |
| 110-111 | Invalid |

Duplex Signals

Duplex signals coordinate the execution of duplex commands in each of the two coupling facilities. In one embodiment, the halt-execution signal has precedence over the other duplex signals.

Duplex signals are communicated, for instance, by using list notification commands, which are generated secondary message commands. For example, the duplex signals are sent using the list notification command with a nonempty-state-change operand value of zero, a summary-update operand value of zero, the signal-vector token for the remote coupling facility, and a list-notification-entry-number operand. One embodiment of a format of the duplex signal command block of a list-notification command is shown in FIG. 14.

A successful MRB returned for a duplex signal indicates that the signal was received in the signal vector. However, it does not indicate, in this example, that the signal was recognized by the duplex command at the duplex coupling facility.

Signals are used by the duplex-command pair to communicate the progress of the command in the respective coupling facility.

Association of Systems, Retry Buffers, and Signal Groups

Figure 15:
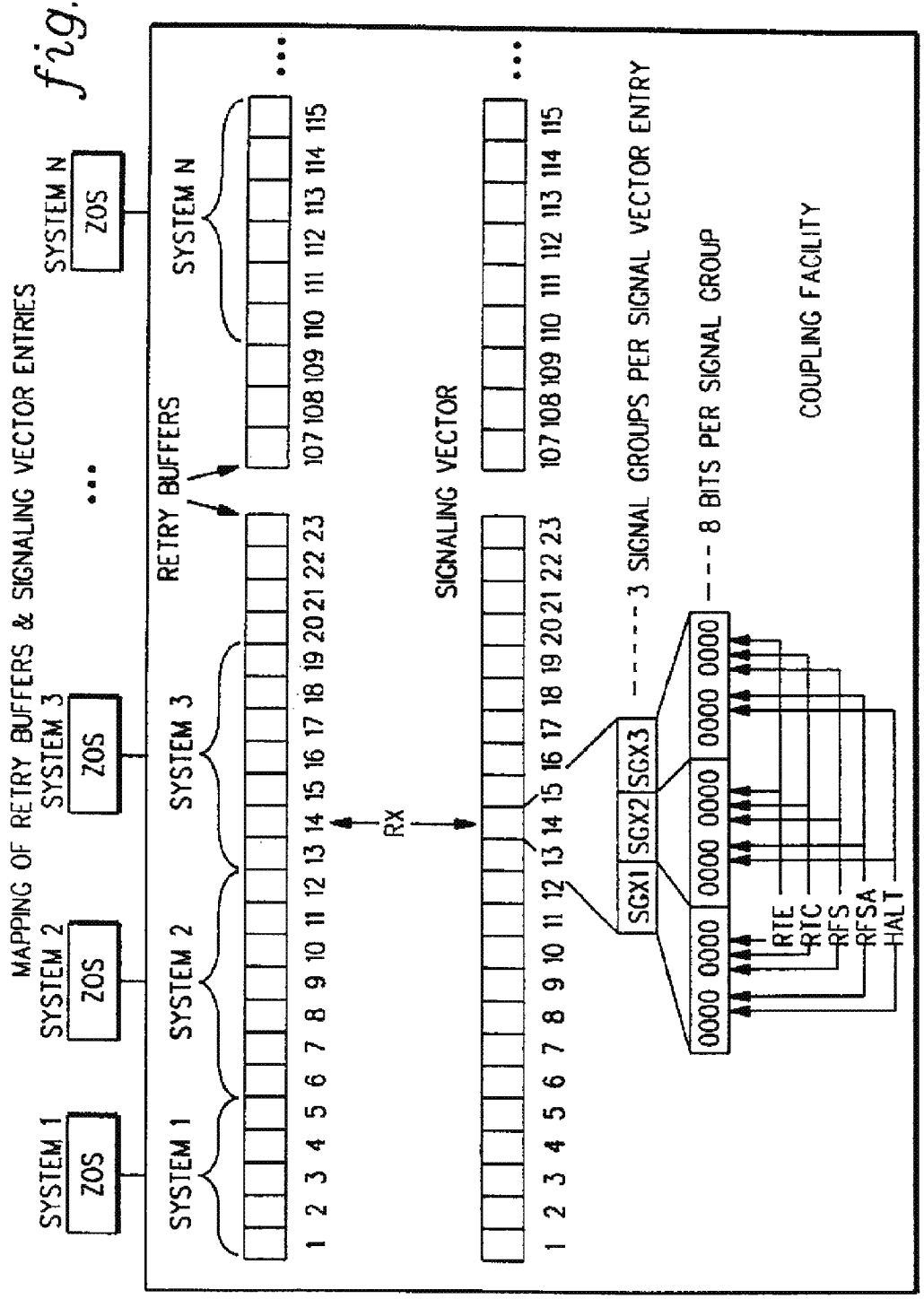
FIG. 15 depicts one embodiment of a mapping of retry buffers and a signaling vector, in accordance with an aspect of the present invention.

FIG. 15 depicts one example of an association of systems to retry buffers, signaling-vector entries and signal groups. Each of the retry buffers in a coupling facility is assigned to be available to one operating system image. This is accomplished by assigning a range of retry buffer indices (RX) to each system at the point in time when the system joins the Parallel Sysplex. Retry buffers are assigned by the z/OS image on a subchannel basis. For example, each system takes a number of retry buffers and assigns them internally. One example of an assignment of retry indices is depicted in FIG. 15, in which index values 1 to 5 are assigned to System 1, values 6 to 12 are assigned to System 2, values 13 to 19 are assigned to System 3, and values 110 to 115 are assigned to System N.

The association of retry buffers to signaling vector entries is a one-to-one correspondence and the partitioning of the retry buffers by a system defines a corresponding partitioning of the signaling vector entries. The retry index then becomes the index for both the retry buffer and the signaling vector entry. For instance, a retry index value of 14 points to both a retry buffer and a signaling vector entry, as depicted in FIG. 15.

FIG. 15 also shows the layout of the physical signaling vector. An extended logical view is shown in FIG. 6. As FIG. 15 depicts, the physical signaling vector entry is further divided into three signal groups indexed by the signal group index. Each signal group contains an eight bit value that is set by the signaling commands and checked and cleared by the signaling protocol engine, as described herein.

Duplex Commands

Each of the duplex commands in the duplex-command pair designates a retry buffer and a signal group to coordinate the signaling between the two coupling facilities. Each duplex command includes the retry-index for the coupling facility that is receiving the command and the retry-index and signal-group index for the coupling facility that has the duplexed structure. The current-signal-group index is used for the coupling facility receiving the command. The retry index and signal-group-index value may not be the same in both coupling facilities. The set of retry-index and signal-group-index values are mirrored in the commands of the duplex-command pair.

The commands of a duplex-command pair are associated by the retry-index values in the MCB. The signal-group-index values used to do signaling for these retry buffers are associated by the signal-group-index values in the MCBs.

Notes on Duplexing Commands

1. The retry buffer to subchannel binding prevents multiple systems (e.g., Central Processing Complexes (CPCs)) from trying to use the same signal-group bits at the same time.

Duplex Command Execution

The execution of duplex commands is divided into three phases, each of which is executed in a coupling facility: command decode, command execution, and command completion phases. The first phase is command decode. In this phase, the command starts execution and sends a ready-to-execute command to the other coupling facility. The ready-to-execute signal is sent to determine if the command has been command suppressed at the other coupling facility. If no ready-to-execute or ready-to-complete signal is recognized, the command does not proceed beyond the command decode phase and the command can be terminated without breaking duplexing. The ready-to-execute signal is sent, when, for instance, the following conditions are met: (1) a path to the duplex-coupling facility is active; (2) the SID is active, (3) duplexing is active; (4) a path in the duplex class path group is active; (5) dumping serialization is not active. The ready-to-complete signal is used as command decode completion indication due to the fact that the ready-to-execute and ready-to-complete signals can be sent in parallel on different channel paths.

The execution phase of the command is different for single entry commands and list-form commands (i.e., commands that process multiple entries one at a time). For single entry commands other than Write-And-Register and Write-When-Registered, after the command decode phase is completed, a single ready-to-complete signal is sent. When the ready-to-complete signal has been sent and a ready-to-complete signal has been recognized, the entry is committed and the command enters the command completion phase. For the Write-And-Register and Write-When-Registered commands, the execution phase is dependent on the setting of the WRTCI request operand (described below). When the WRTCI request operand is B'0', the execution phase is substantially identical to the execution phase for any single-entry command. When the WRTCI request operand is B'1', the sending of the ready-to-complete signal is delayed until both the command decode phase is complete and a ready-to-complete signal or a halt-execution signal is recognized. When a ready-to-complete signal is recognized and the command decode phase is complete, a ready-to-complete signal is sent and the command enters the command completion phase. When a halt-execution signal is recognized, the command execution is halted.

For list-form commands, after the command decode phase is completed, a ready-to-complete signal is sent. When the ready-to-complete signal has been sent and a ready-to-complete signal has been recognized, the entry is committed and another ready-to-complete signal is sent. This exchange of ready-to-complete signals continues until the last entry is committed or a halt execution signal is recognized, then the command enters the command completion phase.

In the command completion phase, the current-signal index is incremented and the MRB for the command is returned with the appropriate response code.

Note on Duplexing Command Execution:

1. Inconsistency of response codes from the two coupling facilities for duplexed command pairs are reconciled. In some instances, no action is taken, and in others, duplexing is broken. The operating system is responsible for performing this function.

Duplexing Processes

During the various phases of duplex command execution, one or more duplexing processes may be invoked. Examples of processes that may be executed are described below.

No Command Active Process

Since a duplex-command pair is issued on two separate coupling facilities and each of the coupling facilities services these commands at differing rates, it is possible for a coupling facility to receive signals for a duplex command that has not yet started at the receiving coupling facility. For example, the ready-to-execute signal can be received by a coupling facility that has not yet started command execution of a duplex command.

The duplex command when it executes examines the signals in the current-signal group to see if any have been received prior to command execution and continues execution based on the received signals for the command. The duplex command may also time-out and be invalidated prior to the command being executed at the coupling facility after receiving these signals.

Entry Commit Process

An entry is committed when the entry object is updated in the coupling facility and can be observed by subsequent accesses of the entry. Prior to an entry being committed, the entry remains unchanged as observed by subsequent accesses of the entry.

The current-signal-group index and the duplex-signal-group index are incremented by one, when an entry is committed.

Single Entry Duplex Command Process

When a duplex command executes and it is ready to start processing for an entry, a ready-to-execute signal is sent. The ready-to-execute signal is sent when, for instance, the following conditions are met: (1) a path to the duplex-coupling facility is active; (2) the SID is active; (3) duplexing is active; (4) a path in the duplex class path group is active; (5) dumping serialization is not active. The ready-to-execute signal, when it is recognized, indicates that the duplex command at the other coupling facility has started execution of the command and a ready-to-complete signal can be sent. A ready-to-complete signal cannot be sent until a ready-to-execute or ready-to-complete signal has been recognized. The ready-to-complete signal may be recognized before the ready-to-execute due to the fact that they both may be sent in parallel and the ready-to-complete may arrive and be recognized first.

The ready-to-complete signal is sent when the command is ready to commit completion status or a request exception condition exists for the command. When the ready-to-complete signal has been sent, the MRB for the ready-to-complete signal has been recognized, and the ready-to-complete signal from the other coupling facility has been recognized, the entry is committed, and the command completes or command execution stops at the completion of command decode and the request exception is presented for the command.

If a halt-execution or request-for-suppression signal is received, the entry is not committed and command execution stops at the completion of command decode.

If a command has received a ready-to-execute command, is ready to commit the entry and has sent a ready-to-execute command, but not received an MRB in response, the command may send a ready-to-complete command on another message path. The command cannot send a halt-execution, request-for-suppression, or request-for-suppression-accepted signal until the ready-to-execute and ready-to-complete MRBs have been received. Note that a halt cannot be sent after a ready-to-complete has been sent for single entry commands.

The ready-to-complete signal cannot be sent before the ready-to-execute signal has been sent. The ready-to-complete signal may be sent on a separate message path in parallel with the ready-to-execute signal.

List-form Duplex Command Process

When a duplex command executes and it is ready to start processing for an entry, a ready-to-execute signal is sent. The ready-to-execute signal is sent when, for instance, the following conditions are met: (1) a path to the duplex-coupling facility is active; (2) the SID is active; (3) duplexing is active; (4) a path in the duplex class path group is active; (5) dumping serialization is not active. The ready-to-execute signal, when it is recognized, indicates that the duplex command at the other coupling facility has started execution of the command and a ready-to-complete signal can be sent. A ready-to-complete signal cannot be sent until a ready-to-execute or ready-to-complete signal has been received. The ready-to-complete signal may be recognized before the ready-to-execute due to the fact that they both may be sent in parallel and the ready-to-complete may arrive and be recognized first.

The ready-to-complete signal is sent when the command entry is ready to commit completion status for the entry or a request exception condition exists for the command. When the ready-to-complete signal has been sent and a ready-to-complete signal has been recognized, the entry is committed or command execution stops at the completion of command decode and the request exception is presented for the command. Subsequent entries then send and receive ready-to-complete signal pairs. The ready-to-execute signal is exchanged only once, prior to the first entry.

If one or more entries have been committed and a halt-execution or request-for-suppression signal is received, the entry is not committed and command execution stops at the previous entry and a timeout response code is returned. If no entries have been committed and a halt-execution or request-for-suppression signal is received, the entry is not committed and command execution stops at the completion of command decode and a halt response code is returned.

If a command has recognized a ready-to-execute signal, is ready to commit the entry and has sent a ready-to-execute signal, but not received an MRB in response, the command may send a ready-to-complete signal on another message path. The command cannot send a halt-execution, request-for-suppression, or request-for-suppression-accepted signal, until the ready-to-execute and ready-to-complete MRBs have been received.

When the ready-to-complete signal has been sent, the MRB for the ready-to-complete signal has been recognized, and the ready-to-complete signal from the other coupling facility has been recognized, the entry is committed, and the command completes or advances to the next entry, if additional entries exist. Note that a halt cannot be sent after a ready-to-complete has been sent without first advancing to the next entry. If a ready-to-complete has been sent for the last entry in the list, then no halt signal can be sent.

The ready-to-complete signal cannot be sent before the ready-to-execute signal has been sent. The ready-to-complete signal may be sent on a separate message path in parallel with the ready-to-execute signal.

Request for Suppression Process

When a command that is waiting on resources held by other commands recognizes a ready-to-complete signal for itself or for a command of lower priority, the command sequence numbers of the other commands holding resources desired by this command are examined. For each such command, one of three cases can occur, as examples:

1. If the command sequence number is less than the command sequence number of the resource owning command, the waiting command is of higher priority. The resource owning command sends a request-for-suppression signal.
2. If the command sequence number is greater than the command sequence number of the resource owning command and the resource owning command has obtained all desired resources, the resource owning command has priority and no action occurs.
3. If the command sequence number is greater than the command sequence number of the resource owning command and the resource owning command cannot obtain all desired resources, the resource owning command recognizes a ready-to-complete signal for the lower priority command and issues a request for suppression signal on its behalf.

If the command-sequence number of the waiting command and the selected resource owning command are equal, then the system identifier associated with each system that sent the command is used as a tie breaker. If the system identifier of the waiting command is less than the system identifier of the selected resource owning command, then the waiting command is of higher priority and case 1 applies. Otherwise, cases 2 and 3 apply.

The request-for-suppression signal, when received, causes the receiving command to either suppress the command or to allow the command to continue, if the resources are available. If the command is suppressed, a request-for-suppression-accepted signal is sent and the command is suppressed. If the command does not need to be suppressed, then the ready-to-complete or halt execution signal is sent, as is appropriate.

The request-for-suppression signal can only be sent, in this example, after a ready-to-execute signal and ready-to-complete signal have been sent and their respective MRBs have been recognized.

Request-for-suppression-accepted can only be sent, in this example, after a ready-to-execute signal has been sent and the MRB has been recognized.

Note on the Request for Suppression Process:
1. The request-for-suppression signals are sent based on the assumption that the commands may be in a deadlock situation. This may or may not be the case, but over-reaction is preferred to deadlock situations. A command can be legitimately locked out due to a resource lock from an earlier command holding the resource and have later commands that have issued ready-to-complete signals be suppressed, even if they are not dependent on the latches held for the original command.

Halting Execution

A halt-execution signal can be sent by a coupling facility once all outstanding signals have received an MRB. A halt-execution signal can be sent or received after any other signal, once the ready-to-execute signal exchange has taken place.

When a halt-execution signal is recognized, command execution stops at the completion of command decode or at the previous entry for list-form commands after the first entry has been committed. The receiving command completes any outstanding signals for the entry being processed.

A halt condition can occur due to a resource condition, such as any of the following, as examples:
  Model dependent timeout.
  Cache full condition.
  List set full condition.
  List full condition.
  Local Cache Entry (LCE) not registered.
  Entry not found for the Invalidate-Name-List command and a halt-invalidation control is set to B'1', or for an Unlock-Castout-Locks command and the skip-nonexisting-entries control is set to B'0'.
  A request exception with exception code 31, 'local-cache identifier not attached', for the Unlock-Castout-Locks command and the detachment emulation control is set to B'1'.
  Failed version number comparison for cache commands.
  When a link failure or link timeout is recognized on the link that received the command and the ready-to-execute signal exchange has taken place.
  Event Monitor Control (EMC) object space is full.
  Dump serialization held.
  Name assignment suppressed in a write and register command.
  Shared or exclusive access to coupling facility objects is not available and contention exists with a command with a lower command sequence number.
  As well as for other resource conditions.

Any time one of these conditions occurs, a halt-execution signal is sent, if a duplex command is being executed.

When a halt-execution signal is sent and the MRB for the halt-execution signal is recognized, the command is suppressed and the response code defined for the halt condition in the command is returned with these exceptions:
  1. If the halt condition is due to a link failure or link timeout and the command is a single-list-entry command, a list-form command where no list items have been processed, or a list-form command with no retry buffer specified, the MRB is discarded.
  2. If the halt condition is due to a link failure or link timeout and the command is a list-form command with a retry buffer specified and one or more list items have been processed, the command completes with a model-dependent timeout.
  3. If the halt condition is due to shared or exclusive access to coupling facility objects being unavailable and contention exists with a command with a lower command sequence number, the command completes with an implicit suppression-request-accepted condition. If the command is a single-list-entry command or a list-form command where no list items have been processed, a response code (e.g., 19) is returned. If the command is a list-form command and one or more list items have been processed, the command completes with a model-dependent timeout.

When a halt signal is recognized, the command is backed out, and if it is a list-form command and at least one list item was executed to completion, the entry is backed out and the current object index is set to the entry that was backed out, and then the response code is set. If both a command suppression condition, and halt-execution signal occur, the command suppression response code is returned. If only the halt-execution signal occurs and the command is either a single-list-entry command or a list-form command where no list items have completed execution, the command execution is halted and a response code (e.g., 18) is returned.

Signal Group Processing

The duplex-signal-group-index and duplex-retry-index values are sent as part of the LNEN operands in the list notification command. The signal-vector bit in the signaling vector is set based on the LNEN value. Each duplex-signal list-notification command sets only a single bit in the signal group. The MRB for the list notification command is returned once the bit has been set. The recognition of the MRB for the list notification command is not used as an indication that the signal has been recognized at the receiver of the signal, it only indicates that the bit has been set.

When any of the following conditions exist, the signal group with an index value that is one greater than the current-signal-group-index value is set to zero:
  A ready-to-complete signal is sent.
  A request-for-suppression signal is sent.
  A request-for-suppression-accepted signal is sent.
  A halt-execution signal is sent or recognized.

For signals sent, the signal group is cleared prior to the signal being sent. When the current-signal-group-index value reaches three and an incremented value is needed, the index value wraps to a value of one.

The duplex commands have a retry index, duplex-retry index, and duplex-signal-group-index value as operands. The retry index and current-signal-group-index values are used to determine the signaling vector entry and signal group in the signaling vector that are to be used in the coupling facility. The current-signal-group index indicates which set of signaling bits is the initial set of duplex signals to be used for the command. The duplex-retry index and duplex-signal-group index are used as part of the LNEN operand in the list notification command to be sent to the duplex coupling facility.

Notes on Signal Group Processing:
  The following signal groups can be actively used in a single command:
    The current-signal-group;
    Clearing of the next signal group.
  In one embodiment, three signal groups are employed for list-form commands. In the case of list-form commands, the three signal groups are employed for the following reasons:
    The current entry for the entry being operated on;
    The RTC for the current entry is received and followed by the RTC for the next entry before the current signal group index is incremented;
    The previous entry, in the event that the MRB for the received RTC is lost and a subsequent RTC is returned for the last entry, as a result of the timeout at the other coupling facility.

Execution of a Duplex-Signal List-Notification Command

The duplex-signal list-notification command provides the information used by the designated system to update one signaling-vector entry bit.

Execution of a list-notification command involves first selecting a message path from the set of message paths that form an active connection with the remote coupling facility and making the list notification command pending on this path.

When a pending list-notification command is executed, the command is issued to the duplex coupling facility.

Execution of a duplex-signal list-notification command is completed, when a message-response block is received at the coupling facility in response to the command. Duplexing is broken when, for instance: (1) all message paths in the path group are inactive at the time of path selection or (2) the state of all of the active message paths to the associated system is made error state pending by the system and inactive by the coupling facility.

Duplex-signal list-notification commands are ensured to complete, in this embodiment.

Notes on the Execution of a Duplexing Signal
1. When a duplex-signal list-notification command cannot be successfully delivered to a system (e.g., the message times out), the coupling facility attempts to deliver the command over each of the remaining active message paths to the system until a message-response block is received or all paths in the path group have been made error state pending by the system and inactive by the coupling facility.
2. Broadcasting the same list-notification command on multiple paths in the path group allows for faster completion of the list-notification process when link errors are present. However, the broadcast protocol should be limited to situations where the error-state-pending condition has been set after an unsuccessful attempt to send a single list-notification command for the transition. Broadcasting in non-error situations could add significant load to the link and should be avoided. Broadcasting the same list-notification command on multiple paths is allowed, but the signal-group index is not incremented by one until such time as all list-notifications commands in the broadcast have completed or been suppressed
3. When the path group is empty at the time of path selection, or when all paths in the path group are inactive, the generated list-notification command completes without initiating a link operation. If the duplexing signal is RTE, the command is completed and a response code (e.g., 253) is returned. Otherwise, duplexing is broken.
4. The signal-vector token is assigned by the IMP command and returned in the MRB for the IMP command. The coupling facility provides the signal-vector token in the list-notification command. The system uses the signal-vector token to determine the location of the signal vector in processor storage.

Duplex Command Timeouts

When the duplex command times out and an invalidate request is received at the coupling facility, if (1) the ready-to-execute signal has not been sent, then the response code is set to, for instance, 253, and the invalidate response is sent and the command is suppressed; if (2) the ready-to-execute signal has been sent, and the ready-to-execute or ready-to-complete has not been recognized, then a halt-execution signal is sent, the response code is set to, for instance, 253, and the invalidate response is sent and the command is suppressed; if (3) the ready-to-execute signal has been sent and the ready-to-execute or ready-to-complete has been recognized, the invalidate response is sent, and the command is allowed, for example, 300 milliseconds after the ready-to-execute or the first ready-to-complete signal was recognized to complete. Otherwise, the command is suppressed, when the 300 milliseconds expires setting the duplexing inactive bit, and a response code of, for instance, 20 (duplexing inactive). During the 300 millisecond window, no new commands are executed at the coupling facility, and the duplex command continues to execute. After the additional 300 milliseconds has transpired, the command is command suppressed and new commands can then be executed in the coupling facility.

Notes on Duplex Command Timeouts:
1. It is possible for a duplex command to be delayed in the decode of the command, resulting in a duplex command timeout, while the command is in the process of executing. In order to avoid the chance that duplexing is broken, an additional 300 milliseconds is added to allow the command time to execute and complete. The suspension of new commands decoding at the coupling facility allows the normal coupling command recovery actions to take place without the chance that a subsequent command has compromised the integrity of the objects in the coupling facility.
2. These actions reduce the likelihood that duplexing will be broken. Breaking of duplexing is an action that is to be avoided, if possible.

Breaking of Duplexing

Duplexing is broken, when the objects in the two coupling facilities are not synchronized.

When a duplexing command is executing and the command ends in a coupling facility, a ready-to-complete signal has been sent, and the entry is not committed or backed out, then the duplex active bit for the SID in the duplexing vector is set to zero. If the command is a single-list entry command, the command is completed and the MRB is returned. If the command is a list-form command, processing of the current list item is completed, processing of the command is completed at the current list item, and the MRB is returned. In either case, the duplexing-deactivated indicator is set to B'1' in the response descriptor.

If a duplex command attempts to execute and there are no paths available between the two coupling facilities, then the duplex active bit for the SID in the duplexing vector is set to zero, the command is suppressed and a response code (e.g., 20) is returned.

When a duplex command is executed and the duplex active bit for the SID in the duplexing vector is zero, the command is suppressed and a response code (e.g., 20) is returned.

Notes on Breaking Duplexing:
1. The breaking of duplexing design allows the coupling channels that connect duplexed coupling facilities to lose connectivity and recover connectivity without breaking duplexing, so long as a duplex command is not being executed during the time that connectivity is lost.

Implementation of Coupling Facility Duplexing Signaling Protocol

Further details regarding one implementation of a duplexing signaling protocol is described below.

Commands that are duplexed between coupling facility structures use peer signaling, in accordance with an aspect of the present invention, to keep the commands in synchronization. There are three steps that the signals keep in synch:

The Exchange of the Ready-to-Execute (RTE) signal;
The Latching of Resources required to complete the command;
The Exchange of the Ready-to-Complete (RTC) signal.

The latching of resources step presents a problem since many commands, both simplex and duplex, may be competing for the same resources. For one coupling facility structure, Command A may win the race to latch a resource, but for the duplexed structure, Command B may win the race for the same resource. This implementation resolves conflicts in latching resources by using a combination of techniques, all of which include communications between tasks within a structure. A Task Control Block (TCB) is used as a communications medium. Each task has its own Task Control Block and is able to access and update the Task Control Block of the other tasks. Each update of an item in the TCB is done atomically, so that no partial updates occur.

In one example, the Task Control Block (TCB) includes, for instance:

- A command sequence number (CSN) used to assign a priority to each duplexed command. (The smaller the CSN, the higher the priority. The CSN for a simplex command is 0, the highest priority).
- A Suppress Command flag is used as means of resolving conflicts. A command which has received an RTC signal, but is waiting for a resource, and determines its CSN has higher priority than the resource holder's CSN, sets this flag in the TCB of the holder of the desired resource. When a task sees this flag set in its TCB, while it is waiting for an RTC signal, it requests suppression for the command in the duplexed structure by sending a Request for Suppression (RFS) signal to the duplexed structure. Additionally, it suppresses its command, when the request for suppression is acknowledged via a Request for Suppression Acknowledgment (RFSA) signal from the duplexed structure.
- A Proxy RTC flag is used to indicate a duplexed command has received a Ready-to-Complete signal and is waiting for a resource. The command which has received the RTC signal does not have priority to the resource, but the holder of the resource may be a simplex command which does not participate in the signaling, and it may be waiting for a resource held by a lower priority duplexed command. The proxy RTC flag also indicates that there is a proxy CSN that should be compared with the CSN in the TCB of any latch holders of a resource in a chain of commands in which each is waiting for some resource. The task which has its Proxy RTC flag set compares its proxy CSN with the CSN of the task holding a resource for which it is waiting.
- A Proxy CSN is stored in the TCB of a holder of a resource whenever the Proxy RTC flag is set.

Figure 16A:
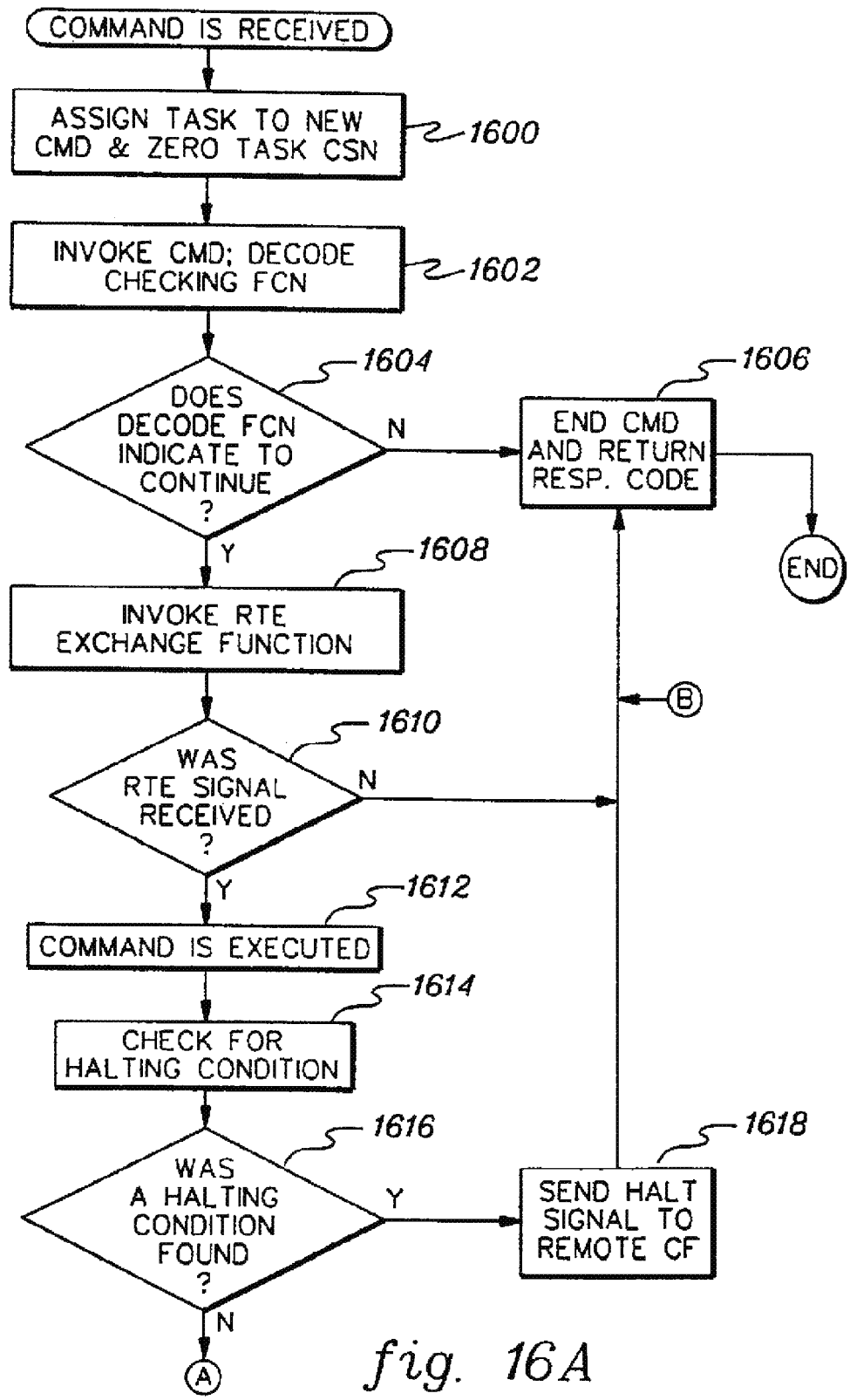
FIGS. 16a and 16b depict one embodiment of an overview of a coupling facility duplexing signal protocol, in accordance with an aspect of the present invention.
Figure 16B:
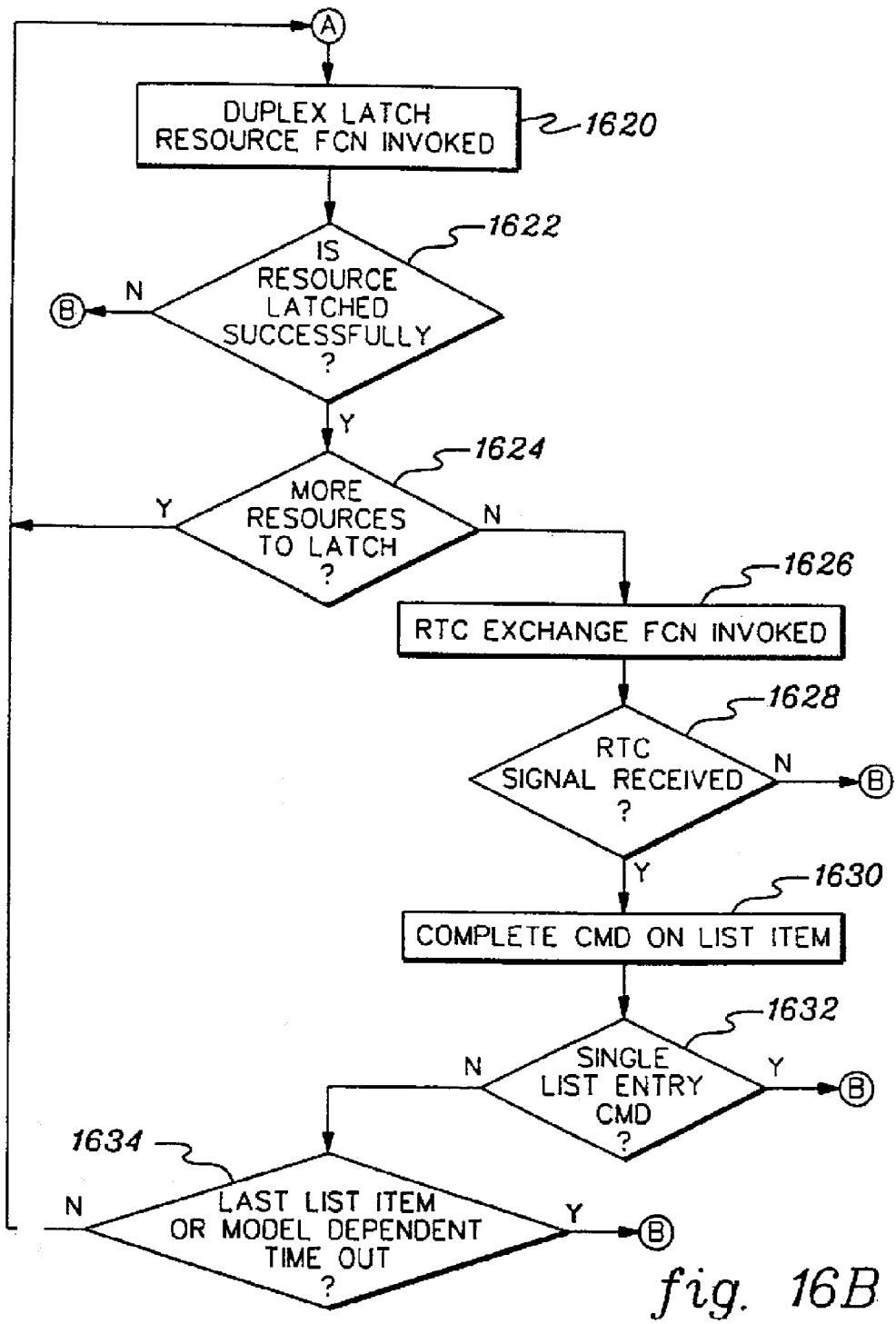

Further details regarding the signaling protocols employed in one or more aspects of the present invention are described with reference to FIGS. 16a-21. In particular, FIGS. 16a-16b provide an overview control flow of duplexed commands, and FIGS. 17, 18, 20-21 provide embodiments of control flows for various functions invoked in the overview and/or used by the protocol. FIG. 19 provides an extension of latch management for simplex commands, which intersects with this control flow. In one example, the logic of FIGS. 16a-21 are executed by the coupling facility.

Referring to FIG. 16a, initially, a command is received by the CFCC and a task control block (TCB) is assigned to the command, STEP 1600. Also, the CSN for the task is zeroed. Next, a duplex command decode checking function is invoked, STEP 1602. (This is described further below with reference to FIG. 17.) Should one of the checks of the decode checking function fail, INQUIRY 1604, the command is suppressed and the appropriate response code is returned, STEP 1606. If, however, all of the checks are successful, then an RTE exchange function is invoked, STEP 1608. (This is described further below with reference to FIG. 18.) Should the RTE exchange fail, INQUIRY 1610, the command is suppressed and a response code (e.g., 253) is returned, STEP 1606. If, however, the RTE exchange is successful, then the command is executed, STEP 1612. During execution, a check is made as to whether any halting conditions have been recognized, STEP 1614.

If any halting conditions are encountered during command execution, INQUIRY 1616, then a halt signal is sent, STEP 1618, and the command completes with the response code appropriate for the halting condition that was encountered, STEP 1606. Otherwise, a duplex latch resource function is invoked for each resource that needs to be latched by the command for processing of the current list item, STEP 1620 (FIG. 16b). (This is described in further detail with reference to FIG. 20.) If all latch obtains are successful, INQUIRIES 1622, 1624, then the command completes processing of the current list item and the RTC exchange function is invoked, STEP 1626. (This is described in further detail with reference to FIG. 21.) However, if a latch is not successfully obtained, then the command ends and a response code is returned, STEP 1606 (FIG. 16a).

Returning to FIG. 16b, should the RTC exchange function end without receiving an RTC signal, INQUIRY 1628, the command is completed and a response code is returned step, 1606 (FIG. 16a). If, however, an RTC signal is received, the processing of the current list item is completed, STEP 1630 (FIG. 16b). If the command is a single-list entry command, INQUIRY 1632, the MRB is returned and the latches are released. In this case, processing is complete, STEP 1606 (FIG. 16a). If the command is a list-form command and either a model-dependent timeout is exceeded or the last list item is processed, INQUIRY 1634 (FIG. 16b), then, the command is completed with either an RC=1 or RC=0, as appropriate; the MRB is returned and the latches are released. Again, processing for the command is completed, STEP 1606 (FIG. 16a). If the command is a list-form command, the current list item is not the last list-item, and a model-dependent timeout has not been reached, the latches are released and the next list item is processed, STEP 1620 (FIG. 16b). This completes a description of one embodiment of an overview of duplex signal processing.

Figure 17:
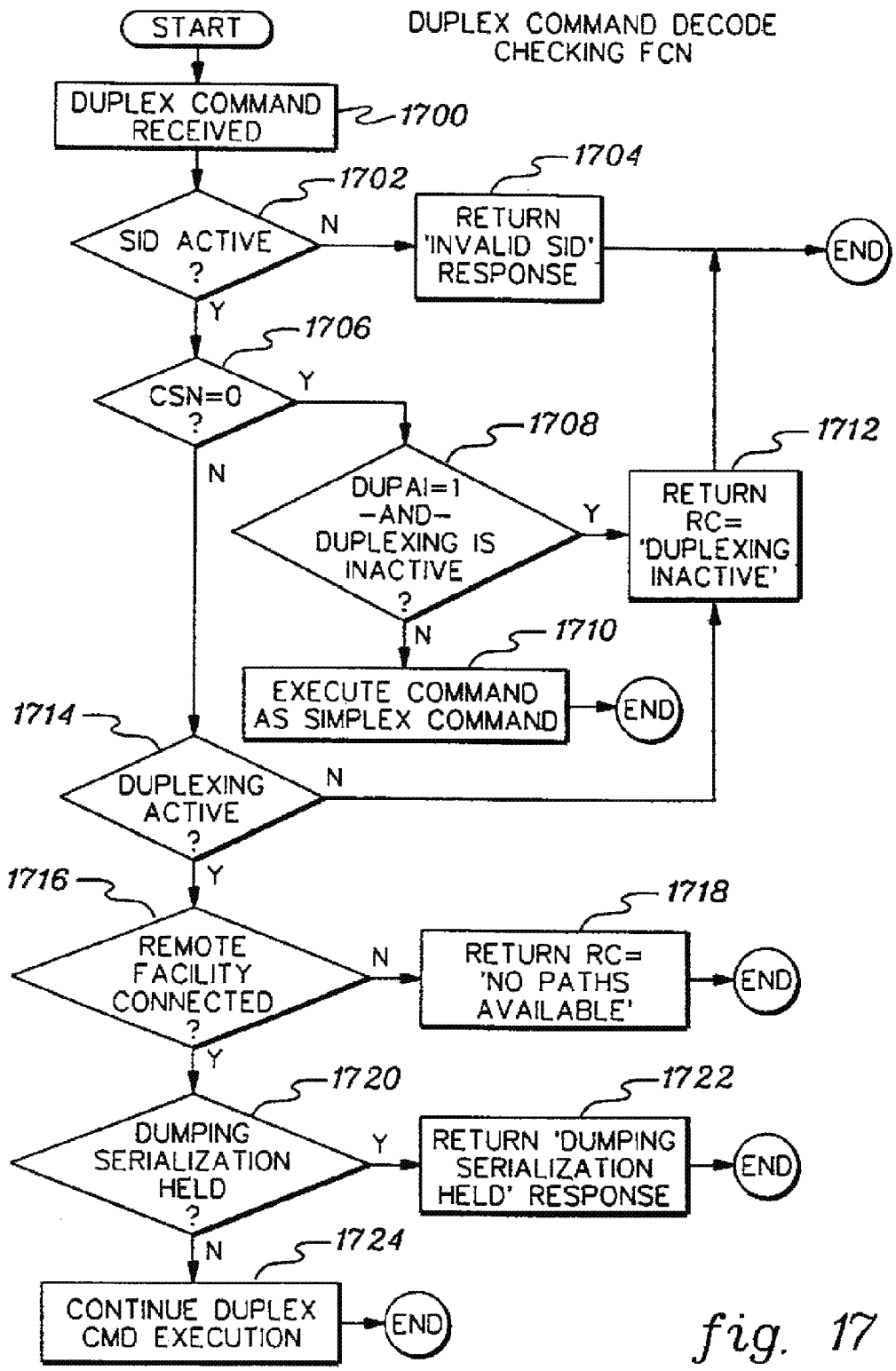
FIG. 17 depicts one embodiment of the logic associated with a duplex command decode checking function, in accordance with an aspect of the present invention.

FIG. 17 describes one embodiment of the set of checks performed during the command decode phase of a duplexed command. Initially, a duplex command is received, STEP 1700. Then, the first check is made to ensure that a valid SID is specified, INQUIRY 1702. If not, the command has specified an invalid structure. Thus, the command is suppressed and an 'invalid SID' response is returned, STEP 1704. If, however, the SID specifies a valid structure, then the command sequence number (CSN) is tested, INQUIRY 1706.

If the CSN is zero, the command is not executed as a duplexed command. It may be executed as a simplex command or not executed at all based on the setting of the DUPAI indicator and the current state of the structure. For instance, if the DUPAI indicator is B'0', INQUIRY 1708, the command is executed as a simplex command, no matter the structure state, STEP 1710. If the DUPAI indicator is B'1' and the structure is in the duplexing active state, the command is also executed as a simplex command, STEP 1710. However, if the DUPAI indicator is B'1' and the structure state is duplexing inactive, the command is suppressed and a response code (e.g., 20) is returned, STEP 1712.

(Notes on CSN and DUPAI) Setting the CSN indicator to zero is a means for the operating system to execute a command in simplex mode, when the structure is duplexing active. This is done, for instance, for a Read-and-Register command where the storage class is not being changed by the command. Since the data is only returned from the primary cache structure and since the registrations are only made in the primary structure, there is no reason to send the command to the secondary structure. So, the command is issued with the CSN indicator set to B'0'. This is done for various commands that are reading data or controls in the primary structure, but do not update any control objects that are duplexed.

However, a window exists for read commands that set the CSN to zero and are issued after duplexing has failed, but before the structure has entered simplex mode. During the recovery window, the structure objects may be out of synchronization. So, a read command sent to one structure with CSN=0 may execute successfully and observe object states that may not exist after the simplex mode is resolved. For instance, a Move List Entry command may move a list entry in the secondary structure, but not the primary structure. If a Read List Entry command is issued to the secondary structure during structure failover with CSN=0, the moving of the list entry may be observed. However, if the primary structure is selected, the moving may be suppressed by the failover. The observing of a moved list entry that is not in fact moved is a violation of command concurrency. This problem is avoided by setting the DUPAI indicator to B'1' along with setting the CSN to zero. Then, if the structure has become duplexing not active, the read command is suppressed.

Continuing with FIG. 17, if the command sequence number is non-zero, a request is made to execute the command using the duplexed command processes. So, the structure state is checked to see if duplexing is active for the structure, INQUIRY 1714. If duplexing is not active, the command is suppressed and a response code (e.g., 20) is returned, STEP 1712. If duplexing is active, a test is made to see if the remote facility is connected, STEP 1716. If the remote facility is not connected, the command is suppressed and a response code (e.g., 253) is returned, STEP 1718.

If the remote facility is connected, the state of the structure is again tested to see if dumping serialization is held, STEP 1720. If so, the command is suppressed and the 'dumping serialization held' response is returned, STEP 1722. If dumping serialization is not held, all the tests are successfully completed, and the processing of the duplexed command continues, STEP 1724.

Figure 18:
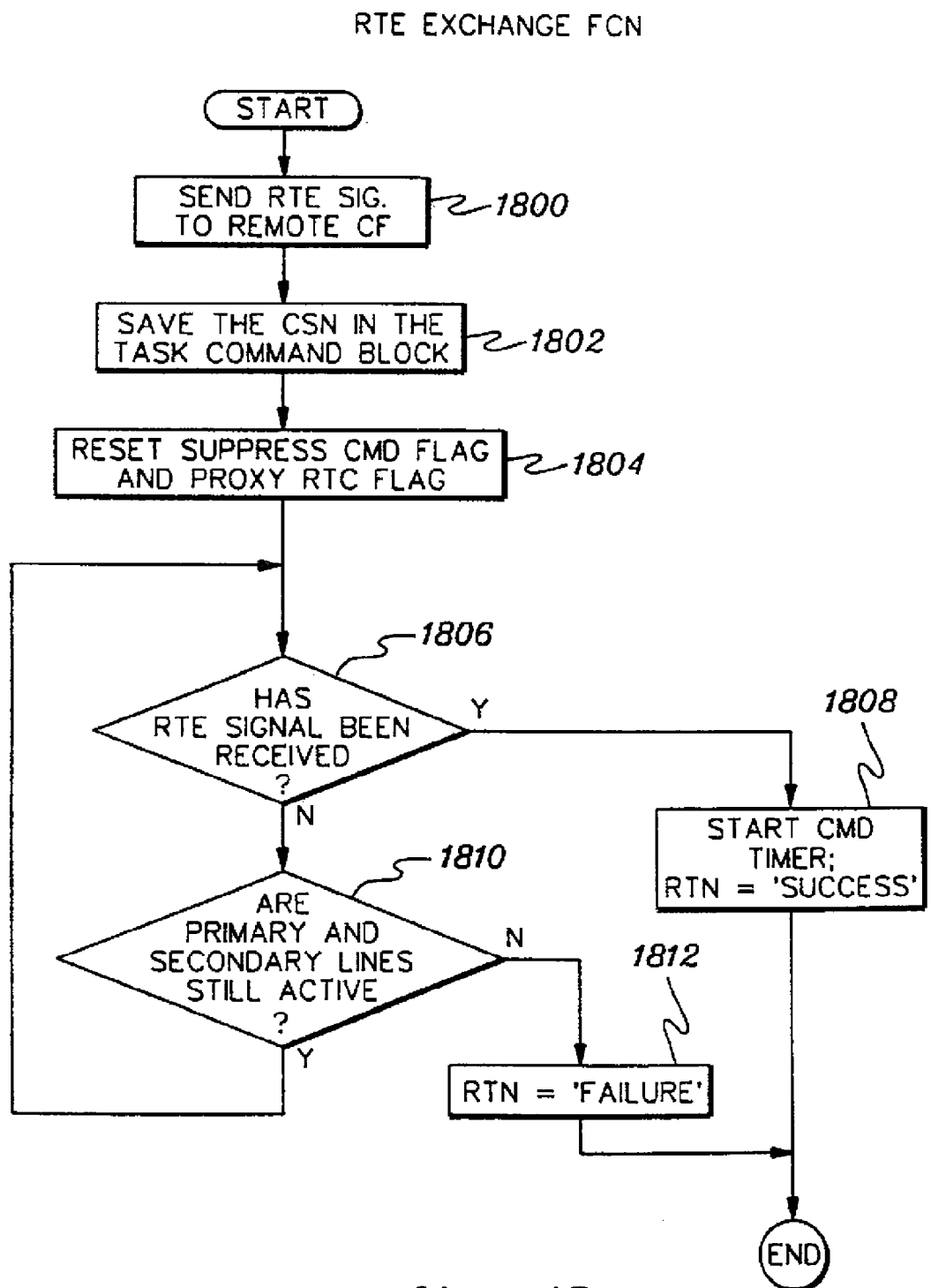
FIG. 18 depicts one embodiment of the logic associated with a Ready to Execute (RTE) exchange function, in accordance with an aspect of the present invention.
Figure 19:
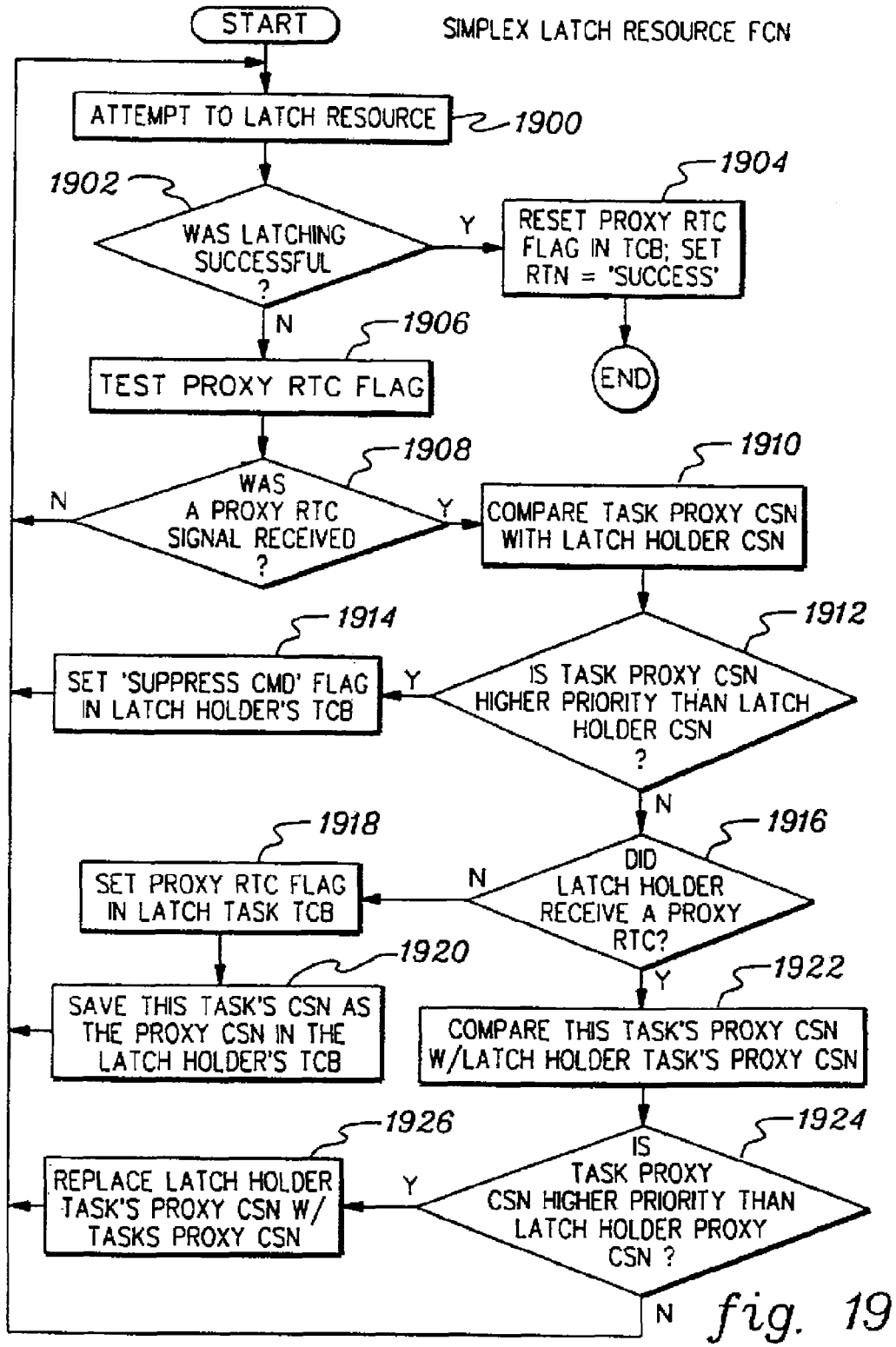
FIG. 19 depicts one embodiment of the logic associated with a simplex latch resource function, in accordance with an aspect of the present invention.

FIG. 18 describes one embodiment of the logic associated with the ready-to-execute (RTE) exchange function. The function is invoked to both send an RTE signal to the remote coupling facility and to recognize the reception of an RTE signal. The individual steps are as follows. First, an RTE signal is sent to the remote coupling facility on one of the receiver ISCs identified in the path group for the remote coupling facility, STEP 1800. The signaling command designates the signaling vector entry in the remote coupling facility associated with the duplexed command. Next, the task control block (TCB) assigned to the command is initialized by saving the command sequence number (CSN) specified in the MCB into the TCB, STEP 1802, and by resetting the 'suppress command' flag and the 'Proxy RTC' flag, which are in the TCB, STEP 1804.

Next, there is a check to see if an RTE signal has been received from the remote coupling facility in the signaling vector entry associated with the command, INQUIRY 1806. If an RTE signal has been received, the command timer is started and the return code for the function is set to 'success', STEP 1808. On the other hand, if an RTE signal has not been received, the primary and secondary links are tested to see if any errors have occurred that would have deactivated the links, INQUIRY 1810. The primary link is the link where the RTE signal from the remote coupling facility is received and the secondary link is the link where the RTE signal is sent. If there are no active primary or secondary links, the signal exchange is aborted and the function ends with return code of 'failure', STEP 1812. If there are still active links, the function loops back to the check of reception of the RTE signal, INQUIRY 1806.

(Note on RTE Exchange.) The RTE signal is employed to improve both performance and reliability of the protocol. By delaying the start of command execution until both commands have been received and recognized by their respective coupling facilities, the latch hold times, and any resulting contention, are minimized. This is especially desirable if the distances between the coupling facilities are large and the commands are skewed in time by the propagation delays involved. Therefore, including the RTE exchange in the protocol improves the performance of the protocol by minimizing the latch hold times.

A second reason for including the RTE exchange is for improved availability. The protocol indicates that duplexing is to be broken by the coupling facility if a completion signal (RTC) has been sent to the remote coupling facility, but no completion signal has been received before the command times out. But, this rule does not apply to the RTE exchange, since no object updates have yet occurred. A failure condition in the RTE exchange results in the command being suppressed and a response code (e.g., 253) being returned. In this case, the duplexing state does not change. If the failure is temporary in nature, then the command can be redriven by the operating system for a relatively short duration of say a few seconds, and the temporary condition may be rectified in that period of time. If the RTE exchange is not made, then any temporary error detected by the RTC exchange causes duplexing to be broken. By requiring a successful exchange of signals prior to sending a completion signal, the chances of duplexing being broken are greatly minimized, and the resulting protocol is more robust.

(Notes on Duplexing Command Deadlocks.) A basic deadlock scenario with duplexed commands can occur as follows. Suppose Command A is issued by OS 1 and Command B is issued by OS 2 and the two commands attempt to latch the same resources. A deadlock occurs if Command A is executed on CF 1, obtains the latch on the resource and issues an RTC signal. Command B on CF 1 now waits for Command A to complete before getting the latch. Command A is waiting on an RTC from its duplexed instance running on CF 2. However, the situation on CF 2 is reversed, and Command B has obtained the latch and sent the RTC signal and Command A is delayed. This is the deadlock. The deadlock is resolved by comparing the command sequence numbers for the two commands. If Command A has a lower (i.e., higher priority) CSN than Command B, then the latch manager (which is a component of CFCC) on CF 2 forces Command B to be suppressed. This causes Command B to issue a request for suppression to CF 1. This will be accepted in this circumstance and a request for suppression accepted (RFSA) will be sent by CF 1. Command B then backs out on CF 1, and Command A can then obtain the resource and the duplexed pair for Command A completes. Meanwhile, OS 2 sees the suppression of Command B and reissues the command with the same CSN. Since the CSN is an increasing value across all the commands, the priority of Command B will eventually exceed the priority of all other commands and be assured to complete.

In a further aspect, the latch manager also detects deadlocks that can occur when intervening commands, including simplex commands, hold latches. In this case, the proxy controls in the TCB are used to recognize chain conditions and impose the above protocol even when intervening commands are present. This is described in FIGS. 19 and 20. Two more complex scenarios are described below after FIG. 21 is described.

FIG. 19 describes one embodiment of the actions taken to latch a resource by a simplex command for structures where duplexing is active. The function begins by attempting to latch the resource, STEP 1900. If the resource is successfully latched, INQUIRY 1902, then the proxy RTC flag is reset in the TCB and the function ends with a return code of 'success', STEP 1904. Otherwise, the proxy RTC flag is tested, STEP 1906.

If a proxy RTC signal was not received, INQUIRY 1908, processing loops back to reattempt to latch the resource, STEP 1900. If, on the other hand, a proxy RTC signal was received, then a comparison is made between the task proxy CSN and the CSN of the latch holder, STEP 1910. If the task proxy CSN is a higher priority (lower value) than the latch holder CSN, INQUIRY 1912, then the suppress command flag is set in the latch holder's TCB, STEP 1914, and processing loops back to reattempt to latch the resource, STEP 1900. Setting the suppress command flag causes the latch holder to release the latches, when it detects the flag has been set.

If, on the other hand, the task proxy CSN is not of a higher priority, then a test is made to see if the latch holder received a proxy RTC signal, INQUIRY 1916. If not, then the latch holder task's TCB is updated by storing this task's CSN as the proxy CSN and by setting the proxy RTC flag, STEPS 1918, 1920. Then, processing loops back to reattempt to latch the resource, STEP 1900.

However, if the latch holder did receive a proxy RTC signal, then a comparison is made between this task's proxy CSN and the latch holder's proxy CSN, INQUIRY 1922. If this task's proxy CSN has priority, INQUIRY 1924, then the latch holder's proxy CSN is replaced with this task's proxy CSN, STEP 1926, and processing loops back to reattempt to latch the resource, STEP 1900. If this task's proxy CSN does not have priority, no updates are made and processing loops back to reattempt to latch the resource, STEP 1900.

Figure 20A:
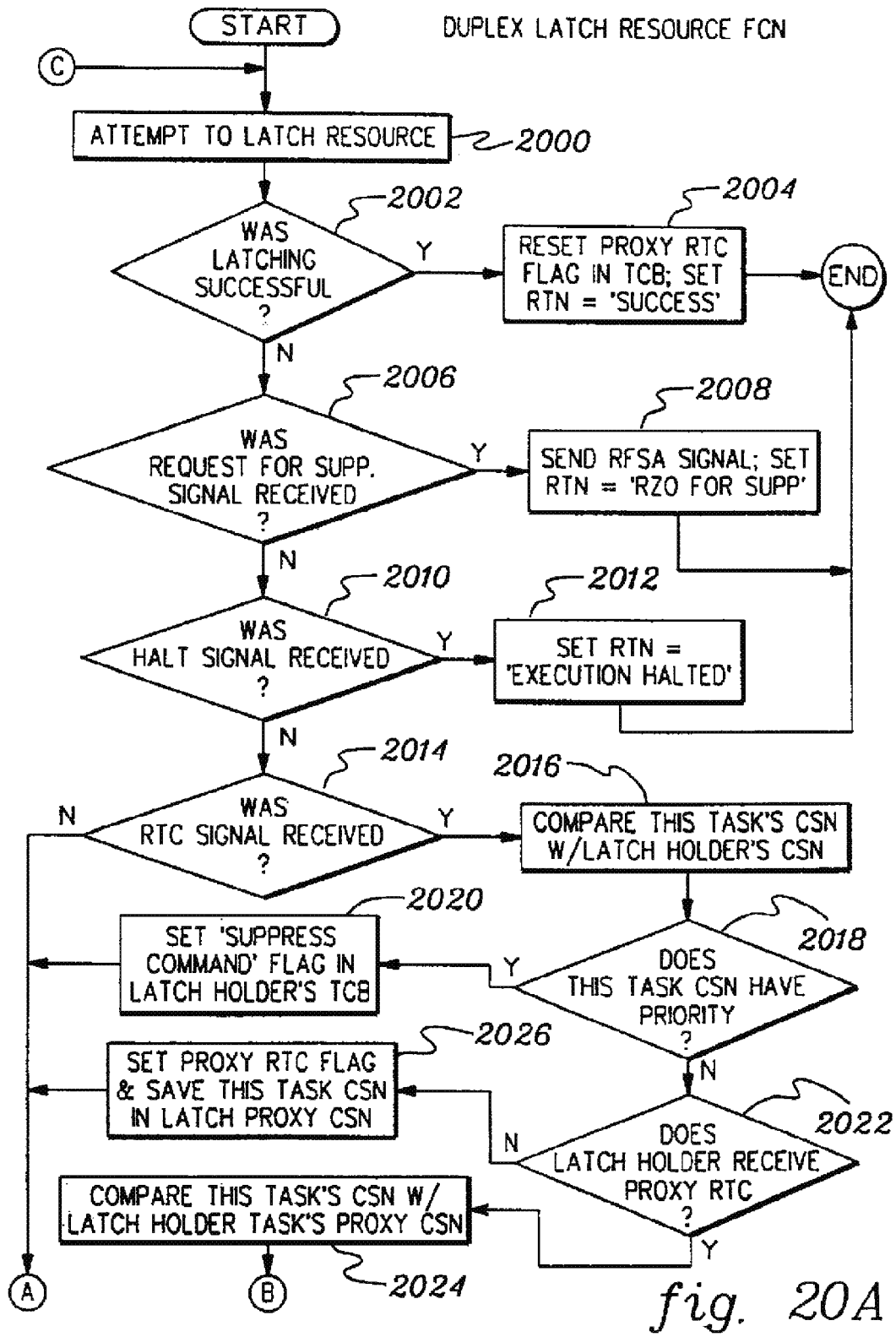
FIGS. 20a and 20b depict one embodiment of the logic associated with a duplex latch resource function, in accordance with an aspect of the present invention.
Figure 20B:
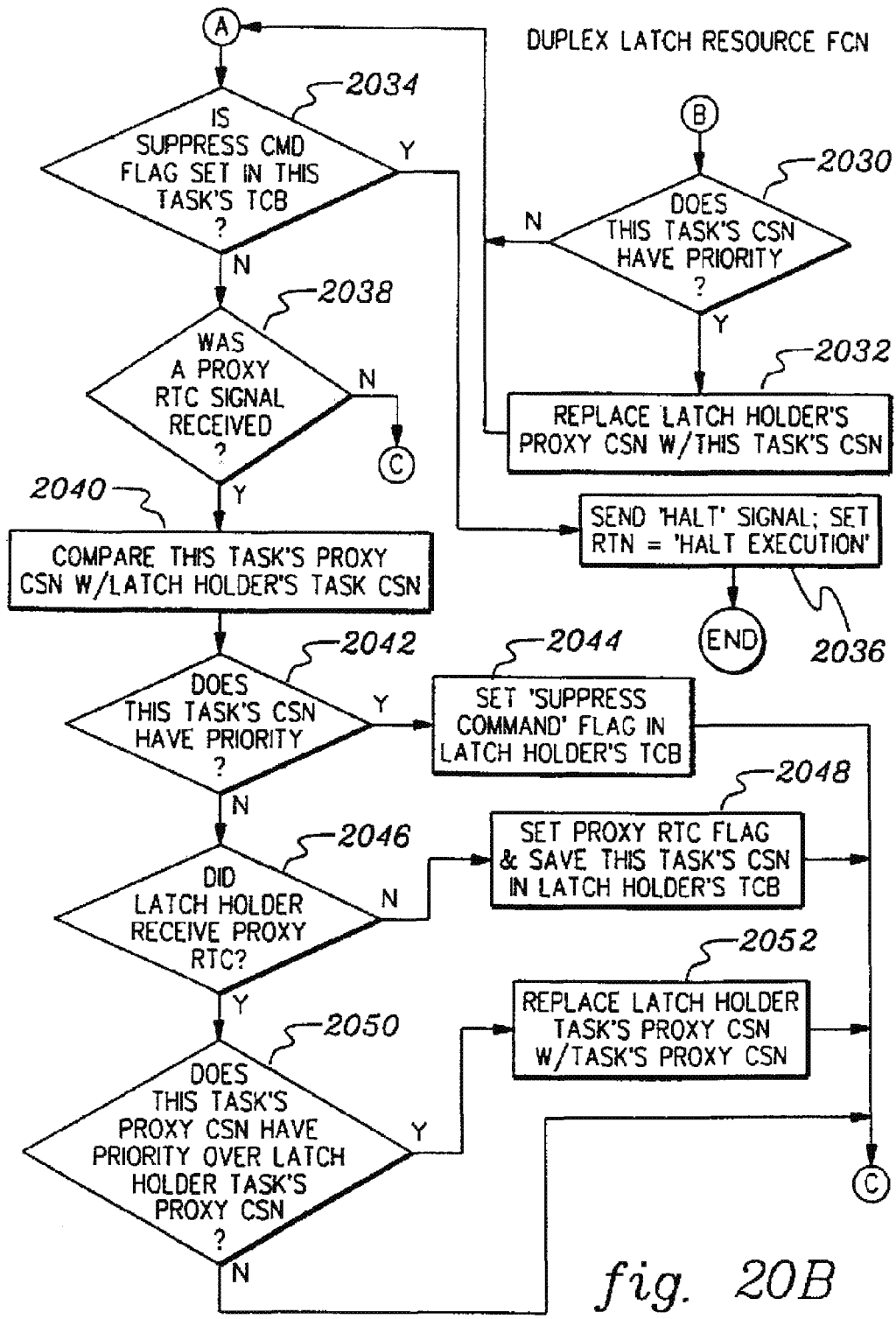
Figure 21:
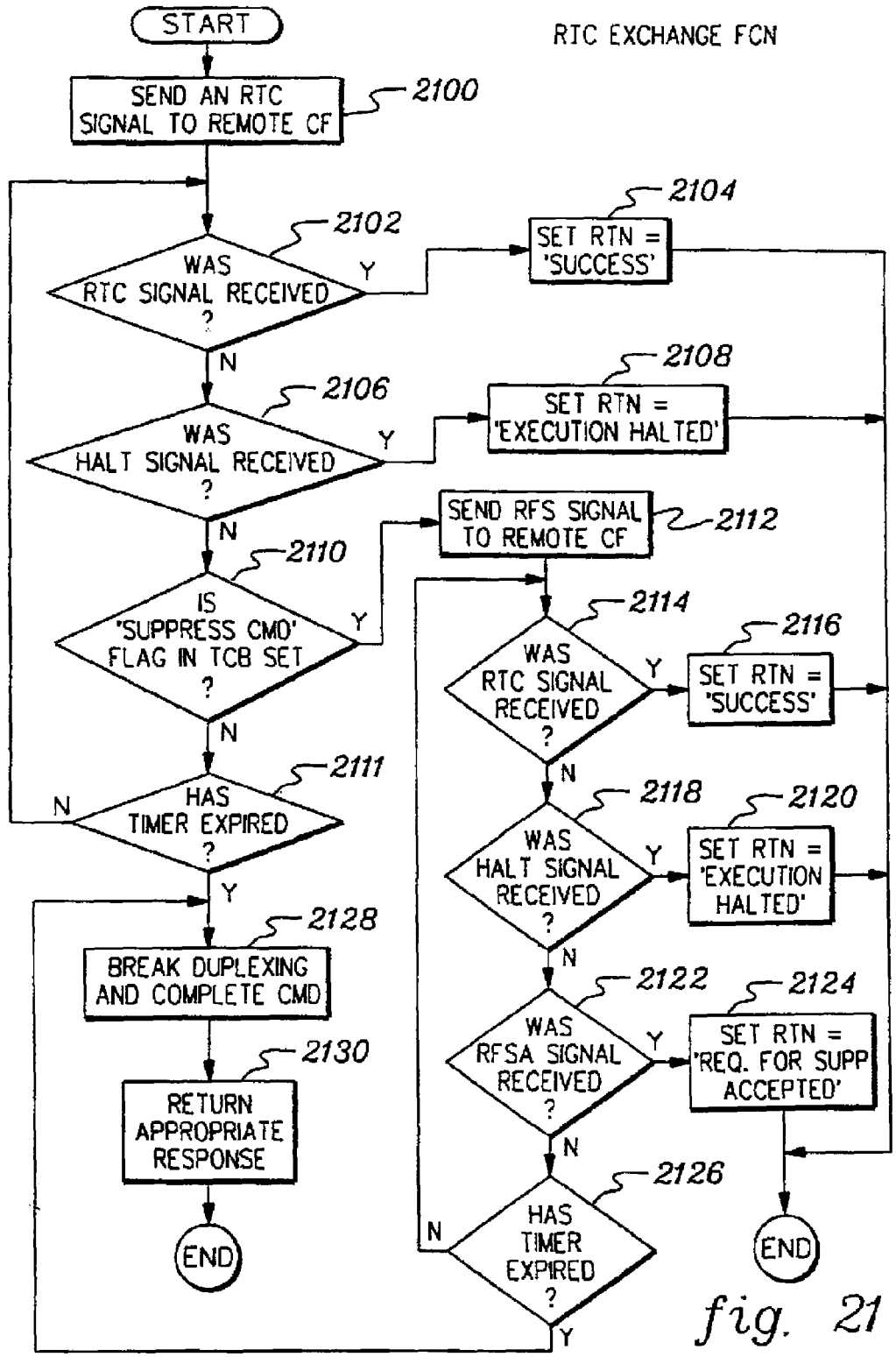
FIG. 21 depicts one embodiment of the logic associated with a Ready to Complete (RTC) exchange function, in accordance with an aspect of the present invention.

FIGS. 20*a*-20*b* describe one embodiment of the duplex latch resource function. Processing begins in FIG. 20A with an attempt to latch the resource, STEP 2000. If latching is successful, INQUIRY 2002, then the proxy RTC flag in the TCB is reset and the function ends with a return code of 'success', STEP 2004. However, if latching was not successful then the signaling vector is tested to see if one of three possible signals was received from the remote coupling facility: request for suppression, halt or an RTC. Testing is performed in that order, as an example.

If a request for suppression signal was received, INQUIRY 2006, then a request for suppression accepted signal is sent and the function ends with 'request for suppression', STEP 2008. The command will be suppressed in this case.

If a halt signal was received, INQUIRY 2010, then the function ends with an 'execution halted' condition, STEP 2012. Again, the command will be suppressed, but no signals need to be sent in this case.

If, on the other hand, an RTC signal was received, INQUIRY 2014, a comparison is made of this task's CSN with the latch holder's CSN, STEP 2016. If this task has priority, INQUIRY 2018, then the suppress command flag is set in the latch holder's TCB, STEP 2020, and processing continues in FIG. 20*b* at label (A). If this task does not have priority, but the latch holder has received a proxy RTC signal, INQUIRY 2022, then this task's CSN is compared to the latch holder's proxy CSN, STEP 2024, and processing continues in FIG. 20*b* at label (B).

If the latch holder did not receive a proxy RTC signal, then the latch holder's TCB is updated by storing this task's CSN in the proxy CSN field and setting the proxy flag, STEP 2026. Processing then continues in FIG. 20*b* at label (A). If no RTC signal has been received, INQUIRY 2014, then processing continues in FIG. 20*b* at label (A).

Label (B) in FIG. 20*b* completes the tests for when an RTC signal has been received. At label (B), a test is performed to see if this task's CSN has priority over the proxy CSN of the latch holder's task, INQUIRY 2030. If not, then processing continues at label (A). If so, then the latch holder's proxy CSN is replaced with this task's CSN, STEP 2032, and processing continues at label (A).

Label (A) in FIG. 20*b* resumes the duplex command function. First, a test is made to see if the suppress command flag has been set in this task's TCB, INQUIRY 2034. If so, then a 'Halt' signal is sent to the remote coupling facility, and the function ends with a response that a halt signal was sent, STEP 2036. However, if the suppress command flag is not set, then the proxy flag is tested, INQUIRY 2038. If no proxy signal was received then processing loops back to the top of FIG. 20*a* at label (C) where a reattempt is made to latch the resource. If, on the other hand, a proxy RTC signal was received, then a comparison is made of this task's proxy CSN with the CSN of the latch holder, STEP 2040. If this task's proxy CSN has priority, INQUIRY 2042, then the suppress command flag is set in the latch holder's TCB, STEP 2044, and processing resumes at label (C). If this task's proxy CSN does not have priority over the latch holder's CSN, a test is made to see if the latch holder received a proxy RTC signal, INQUIRY 2046. If not, then the latch holder's TCB is updated by storing this task's CSN as the proxy CSN and setting the proxy flag, STEP 2048. Processing then resumes at label (C). However, if the latch holder did receive a proxy RTC signal, then a comparison is made to see if this task's proxy CSN has priority of the latch holder's proxy CSN, INQUIRY 2050. If so, then the proxy CSN in the latch holder is replaced with this task's proxy CSN, STEP 2052, and processing continues at label (C). If not, no updates are made and processing resumes at label (C).

FIG. 21 describes one embodiment the RTC exchange function. Once the latches have been obtained for the objects associated with the command, the updates to the objects have been made, and the MRB is ready to be sent, the RTC exchange function is invoked. The exchange sequence begins with the sending of an RTC signal, STEP 2100. Next, a test is performed to see if an RTC signal has arrived, INQUIRY 2102. If so, then the function ends with a success indication, STEP 2104. Otherwise, a test is performed to see if a halt signal has arrived, INQUIRY 2106. If so, then the function ends with an indication that execution was halted, STEP 2108. If not, a test is performed to see if the suppress command flag has been set in the task control block, INQUIRY 2110.

If the flag is not set, the checks for the signal reception is continued until either a signal is received or the command timer expires, INQUIRY 2111. If the suppress command flag is set, then the latch manager has determined that a latch held by this command may be creating a deadlock situation and the priority decision is for this command to back out. This is done as follows. First, a request for suppression signal is sent to the remote coupling facility to inform that coupling facility of the potential deadlock and the need to suppress this command, STEP 2112. The function then waits on reception of a signal up to the point when the timer expires. If an RTC signal is received, INQUIRY 2114, then the command can complete normally. No deadlock exists and normal completion will free the necessary latches. So, the function ends with a success indication, STEP 2116. If an RTC signal is not received, but a halt signal is received, INQUIRY 2118, then the function ends with an indication that execution was halted, STEP 2120.

If a request for suppression accepted signal is received, INQUIRY 2122, then the other coupling facility has acknowledged the request for suppression signal and the function ends with this indication, STEP 2124. If no signal of any kind is received and the command timer expires, INQUIRY 2126, duplexing is broken, STEP 2128. The duplexing active indicator for the structure in the duplexing vector is set to B'0' and the function ends with a duplexing inactive indication, STEP 2130.

(Note on Breaking Duplexing.)

Once an RTC signal has been set, the coupling facility has committed to completing the command. If it receives an RTC signal or an RFS signal, then it can safely complete the command. It can also back out the command, if it receives a halt signal or if it sends an RFS signal and receives an RFSA signal. In either case, the protocol rules ensure that both sides suppress the command. However, if no signal of any kind is received and the command timer expires, duplexing is to be broken, since there is no positive indication from the other coupling facility that it has either completed the command or suspended the command. Ending the command without this positive acknowledgment is not allowed without also breaking duplexing. Otherwise, the structure states may be different once the latches are dropped. This violates the desire to keep the two structures in complete synchronization.

Deadlock Avoidance Scenarios:

In the follow scenarios, Command n has a command sequence number with value n. So, Command 1 is a higher priority than Command 2, and Command 2 has a higher priority than Command 3. The latch manager detects the potential deadlock situations and uses a combination of signals (RFA, RFSA, and Halt) and TCB flags (suppress command and proxy RTC) to resolve these deadlocks. The logic is described in the FIGS. 18, 20, and 21 and the following examples serve only to illuminate this logic with explicit examples. Each case can be reduced to either the basic deadlock scenario described above or one of these three cases.

Deadlock with Intervening Lower Priority Command:

In this scenario, three commands, Commands 1, 2 and 3, are issued by three separate systems to a pair of duplexed structures: one residing on CF 1 and the second residing on CF 2. Commands 1 and 3 need to latch Resources x and y and Command 2 only needs to latch Resource x. The hierarchy of latching rules in the coupling facility requires if both x and y need to be obtained, y is obtained first.

The order of arrival and subsequent execution is as follows: On CF 1, Command 1 obtains latches for both x and y and sends an RTC signal to CF 2. Commands 2 and 3 both wait in the latch manager on CF 1. Command 2 waits on latch x and Command 3 waits on latch y. On CF 2, Command 2 executes first and obtains the latch on Resource x and sends an RTC signal to CF 1. Command 3 obtains the latch on Resource y and waits on the latch on Resource x. Command 1 waits on latch y in the latch manager on CF 2.

A deadlock exists between Commands 1 and 2. Command 1 has obtained all its latches on CF 1, including the latch on x that Command 2 needs. Meanwhile, Command 2 has obtained the latch on x, which Command 1 needs on CF 2. Also, Command 1 on CF 2 has received an RTC signal from CF 1. However, this differs from the basic deadlock case, since a third command, Command 3 owns the latch that Command 1 is requesting first. Command 3 is an intervening command of lower priority than Command 1.

This more complex scenario is resolved as follows: The latch manager servicing the request for the latch on y by Command 1 determines that the latch holder has lower priority and sets the suppress command flag in the TCB for Command 3. Next, when the latch manager services the request by Command 3 for latch x, the latch manager detects that the suppress command flag is set for Command 3. But, no RTC signal has yet been sent for Command 3, since not all latches have been obtained. So, the latch manager issues a 'Halt' signal to CF 1 and Command 3 completes with a 'command halted' response. Likewise, when the latch manager on CF 1 services Command 3's request for the latch on y, it detects the reception of a halt signal and ends the command with a 'command halted' response.

Once Command 3 has been halted, Command 1 can obtain the latch on y on CF 2 and then detect contention with Command 2 on latch x. The situation has reduced to the basic deadlock, and is resolved as described above.

Deadlock with Intervening Higher Priority Command:

In this scenario, three commands, Commands 1, 2 and 3, are issued by three separate systems to a pair of duplexed structures; one residing on CF 1 and the second residing on CF 2. Commands 1 and 2 need to latch resources x and y and Command 3 only needs to latch resource x. The hierarchy of latching rules in the coupling facility requires if both x and y need to be obtained, y is obtained first.

The order of arrival, and subsequent execution is as follows: On CF 1, Command 2 obtains latches for both x and y and sends an RTC signal to CF 2. Commands 1 and 3 both wait in the latch manager on CF 1. Command 1 waits on latch y and Command 3 waits on latch x. On CF 2, Command 3 executes first and obtains the latch on Resource x and sends an RTC signal to CF 1. Command 1 obtains the latch on Resource y and waits on the latch on Resource x. Command 3 waits on latch y in the latch manager on CF 2.

A deadlock exists between Commands 2 and 3. Command 2 has obtained all its latches on CF 1, including the latch on x that Command 3 needs. Meanwhile, Command 3 has obtained the latch on x, which Command 2 needs on CF 2. Also, Command 2 on CF 2 has received an RTC signal from CF 1. However, this differs from the basic deadlock case, since a third command, Command 1 owns the latch that Command 2 is requesting first. Command 1 is an intervening command of higher priority than Command 2. Also, while Command 1 has higher priority than Command 3, it does not suppress Command 3 to obtain latch x, because no RTC signal has been received by Command 1.

This more complex scenario is resolved as follows: The latch manager servicing the request for the latch on y by Command 2 determines that the latch holder has higher priority and sets the proxy RTC flag and the proxy CSN in the TCB for Command 1. Next, when the latch manager services the request by Command 1 for latch x, the latch manager detects that the proxy RTC flag is set for Command 1. It then compares the proxy CSN (=2) in the TCB for Command 1 against the CSN for Command 3 (=3). It determines that the proxy task has priority and sets the suppress command flag in the TCB for Command 3. Command 3 is waiting on the RTC signal from CF 1 and in this function detects that the suppress command flag is set. It then sends a request for suppression signal to CF 1 and waits for the RFSA or RTC or Halt to be received. CF 1 sees the request for suppression of Command 2 and, since Command 2 is waiting on a resource, a request-for-suppression accepted signal is sent and Command 2 is suppressed on CF 1 with a 'command suppressed' response. When the RFSA signal is received on CF 2 for Command 3, Command 3 releases the latches on x and y and completes the command with a 'command suppressed' response. Command 1 then obtains the latches on y and x and sends an RTC signal. There is now a deadlock between Commands 1 and 2, which is the basic deadlock scenario which is resolved, as described above. It is interesting to note that the basic deadlock is resolved by the latch manager on CF 1. That is, the first deadlock is resolved on CF 2 and the second deadlock is resolved on CF 1.

Deadlock with Chain of Intervening Higher Priority Commands:

This third example is a more complicated version of the previous example and shows how the proxy RTC is passed across a chain of commands. In this scenario, n+1 commands, Commands 1, 2 . . . n+1, are issued by n+1 separate systems to a pair of duplexed structures; one residing on CF 1 and the second residing on CF 2. All the commands need a command latch on Resource x. Moreover, there is a sequence of resources labeled y1, . . . , yn. Command 1 needs just y1. Command 2 needs both y1 and y2. This pattern continues with Command i needing y(i−1) and y(i). The hierarchy rules are that for each pair of integers i<j, yy is obtained before yi and all the y resources are obtained before Resource x.

The execution sequence is as follows: On CF 1, Command n has obtained latches y(n−1), yn and x, and has sent an RTC signal. All the other commands are waiting on latches. On CF 2, Command n+1 has obtained latch x and has sent an RTC signal. So, the deadlock is between Commands n and n+1. But, the latching in CF 2 is as follows: Command 1 has obtained y1 and is waiting on x. Command 2 has obtained y2 and is waiting on y1. This sequence continues until Command n is reached, which has obtained yn and is waiting on y(n−1). Command n is the only command that has received an RTC signal, so it starts the proxy sequence by setting the proxy flag and proxy CSN in the TCB for Command n−1, which in turn propagates these values to Command n−2, etc. In each case, command suppression is not set because the current command is of a higher priority than Command n. That is, until Command 1 tests Command n+1. In this case, the proxy CSN (=n) is higher priority than the CSN for Command n+1 (=n+ 1), and so, processing for Command 1 sets the suppress command flag in the TCB for Command n+1 and Command n+1 sends an RFS signal. Once Command n+1 has been suppressed and releases the latch on x, Command 1 now obtains Resource x and sends an RTC signal. This now creates a deadlock between Command 1 and Command n, which is detected and resolved by the latch manager on CF 1. Once that deadlock is resolved, the commands can complete in priority order.

Duplexing of Cache and List Commands Response-Descriptor Fields

The duplexing signaling protocol described above is invoked when commands, such as cache and list commands, are executed as duplexed commands. Examples of commands that can be invoked as duplexed commands are described below.

For each of the commands, an MRB is returned, which has a response-descriptor. One embodiment of the response descriptor fields returned for a duplexed command is described below.

Two fields in the response descriptor, the response count and the data count, define the number of meaningful bytes of information that are returned in the MRB and the data block, respectively. Two additional fields are associated with structure duplexing: the current signal-group index is used to coordinate the signaling protocol between coupling facilities that contain duplexed structures; and the duplexing-deactivated indicator is used to alert the program that the duplexing state was changed from active to inactive, during command execution. Each of these fields is further described below.

Response Count: The value of the response count is the number of meaningful bytes returned in the MRB as described in the MRB format for each command. Reserved or unused bytes at the end of the MRB may be excluded.

Data Count: When a data block is returned to the program, the data count is set to the number of, for instance, 256-byte increments returned by the coupling facility. Reserved or unused bytes at the end of the data block may be excluded. The value of the data count times 256 is to be smaller than or equal to the message-buffer size, in bytes.

Current Signal-Group Index (CSGX): When duplexing signals are issued for a command, the value of the current-signal-group-index object in the signaling-vector entry associated with the retry index is stored in, for instance, bits 30-31 of word 2. If duplexing signals are not generated for the command, zeros are stored in bits 30-31 of word 2.

Duplexing-Deactivated Indicator (DDI): The value of the duplexing-deactivated indicator describes the result of the single-entry or list-form duplexing process for duplexed commands. When the duplexing-deactivated indicator is, e.g., B'1', duplexing was broken during command execution and the duplexing-active bit was reset in the duplexing vector. When the duplexing-deactivated indicator is B'0', either the duplexing process completed successfully, or no duplexing process was executed for the command. The duplexing process completes successfully, when the duplexing signaling protocol is completed and the required signals are received. The value of the duplexing-deactivated indicator is set to B'0', when the duplexing command completes with a response code 20, as one example.

Notes on the DDI and CGSX Operands:
1. Duplexing signals are generated for any command that satisfies the following criteria: (a) The command is issued for a structure for which the duplexing controls are active. (b) The MCB includes a non-zero command sequence number. (c) The command completes with a response code less than 254 (as an example) or completes with the following status conditions, as examples: 4—Request exception, except invalid SID, or 7—Dumping serialization held.
2. If an invalid SID is specified, no signals are issued, zeroes are stored in bits 30-31 of word 2 of the response descriptor, and a value of 3 is stored in the exception code.
3. When a non-zero current-signal-group index is stored in the response descriptor, the associated signal group is reset.
4. When the value of the current signal-group index is zero, no signals were sent to the remote coupling facility and no signal groups in the signaling-vector were reset. However, signals may have been received from the remote facility. The program inspects the CSGX values returned in both MRBs. If both are zero, then no signals were issued by either coupling facility and the old CSGX values can be reused. If one of the returned values is zero and the other non-zero, the signaling-vector entry in the coupling facility that returned a zero-valued CSGX is reset. Resetting the signaling-vector entries in both coupling facilities is also acceptable.
5. The duplexing-deactivated indicator may be set to zero during the command decode phase before sending the RTE signal. If the command completes without breaking duplexing, no additional update needs to be made. However, if duplexing is broken during command execution, then the duplexing-deactivated indicator is set to, for instance, B'1', while the objects in the structure that are referenced by the command are serialized.

Cache-Structure Operands

In addition to the operands described above. Each cache structure has its own operands that are associated with the cache, when it is created. Examples of these operands are described below.

Comparative Structure Authority (CSAU): A value used as a comparison value to the structure authority, when the structure is allocated and deallocated, or when castout locks are reset, the detachment-emulation control (described below) is B'1', and duplexing is active.

This operand is ignored on an Unlock-Castout-Locks command, when duplexing is inactive, or when the detachment-emulation control is B'0'.

Comparative Remote-Facility Structure Authority (CRF-SAU): A value used as a comparison value to the remote-facility structure authority, when castout locks are reset, the detachment-emulation control is B'1', and duplexing is active.

This operand is ignored, when duplexing is not active, or when the detachment-emulation control is B'0'.

Command Sequence Number (CSN): A value associated with a command that is duplexed. Cache-structure commands that specify a non-zero value in the CSN request operand cause the invocation of the duplexing-command process, when duplexing is active for the structure. Commands that do not have the CSN request operand defined, or which specify a zero value in the CSN request operand, do not invoke the duplexing-command process.

Detachment-Emulation Control (DTEMC): A value that controls the processing of the Unlock-Castout-Locks command. The two possible values are:

| 0 | Normal command execution; |
|---|---|
| 1 | Detach-processing rules are used. |

When the detachment-emulation control is B'1', the change bit overindication (CBO), castout parity bits indicator (CP) and user data field (UDF) operands in the unlock-castout-locks (UCL) items and the castout-process identifier request operand are not used and are ignored.

Directory Position (DIRP): A value that denotes a position of a directory entry in the directory.

Duplexing-Active Indicator (DUPAI): A value that controls execution of the command based on the duplexing state of the structure. It has the following encoding:

| 0 | Do not test the duplexing state; |
|---|---|
| 1 | Test the duplexing state of the structure. |

Duplexing Signal-Group Index (DSGX): A value that identifies the target signal group in the signaling-vector entry identified by the duplexing retry index and the remote-facility controls. If duplexing is active and the command sequence number is non-zero, the duplexing signal-group index is non-zero. If duplexing is not active for the structure or if the command sequence number is zero, the operand is ignored.

Duplexing Retry Index (DRX): A value that designates a signaling-vector entry for the signaling vector identified by the remote-facility controls. If duplexing is active and the command sequence number is non-zero, the duplexing retry index is non-zero. If duplexing is not active for the structure or if the command sequence number is zero, the operand is ignored.

Failed-Structure Indicator (FSI): A value that controls the state change for the structure that occurs when a Deallocate-Cache-Structure command is executed and the structure is in the allocated state. It has the following encoding:

| 0 | Initiate deallocation of the structure; |
|---|---|
| 1 | Place the structure in the structure-damage state. |

Immediate Reclaim Control (IMMRC): A value that determines what reclaim action should occur when the castout lock is reset. It has the following encoding:

| 0 | No action; |
|---|---|
| 1 | Reclaim the directory entry and data, if unchanged. |

List-Form-Duplexing Completion Code (LFDCC): The list-form-duplexing completion code is a value that specifies the reason a list-form duplexing process was stopped with a model-dependent timeout, when one or more list items have been processed. It has the following encoding, as an example:

| 00 | Timeout caused by internal conditions. |
|---|---|
| 01 | Command halted. |
| 10 | Implicit or explicit suppression request was accepted. |
| 11 | Duplexing is inactive. |

If the command sequence number is zero, the list-form-duplexing completion code is set to B'00'.

Notes on the List-Form Duplexing Completion Code:
1. The LFDCC response operand provides the reason that processing was stopped with a response code 1 at the current list item. When the LFDCC is B'01', a halt signal was received during the execution of the list item and execution of the current list item was suppressed. One of the conditions for issuing a halt signal was encountered by the remote facility. In this case, the duplexed command will also end with RC=1, and any value for the LFDCC is possible. The program should retry as a normal RC=1 condition. The LFDCC information can be used for monitoring purposes. If the reason for halting the command persists on the retry, then the condition will cause the first list item to fail. In this case, the system receiving the halt signal will most probably end with, for example, RC=18 and the duplexed command will return the response code that identifies the reason for halting the command.
2. When the LFDCC is B'10', a request-for-suppression signal was accepted. A possible deadlock condition has been encountered and the duplexed command's execution of the current list item was suppressed. In this case, the duplexed command will also end with RC=1 and an LFDCC value of B'10' will be returned. The program should retry as a normal RC=1 condition. The LFDCC information can be used for monitoring purposes.
3. When the LFDCC is B'11', duplexing was broken during the execution of the current list item. The structure state will transition to simplex mode.
4. When the LFDCC is B'00', a model-dependent timeout was recognized by the local facility. In this case, a halt signal was sent to the remote facility, and the duplexed command will complete with an RC=1, and an LFDCC value of B'01' will be returned. It is also possible that the duplexed command encountered the same model-dependent timeout condition, or possibly a different halting condition and had also sent a halt signal. In all of these cases, the duplexed command will return an RC=1 and an LFDCC value of B'00'. These case are all normal RC=1 conditions.

Local-Cache-Entry Deregistration Control (LCEDC): A value that controls the deregistration process for a Read-Directory command. It has the following encoding:

| 0 | Do not update the local-cache register; |
|---|---|
| 1 | Invalidate the row in each local-cache register for the specified LCID. |

Locked-For-Castout Selection Control (LFCSC): The locked-for-castout selection control is a value that further controls the selection of directory entries when the change-state selection control is B'1'. The two possible values are:

| 0 | Select all changed directory entries; |
|---|---|
| 1 | Select only directory entries locked for castout, where the first byte of the castout lock matches the specified LCID. |

The operand is ignored when the change-state selection control is B'0'.

Name-Block-Format Control (NBFC): The name-block-format control is a two bit value that determines the set of request operands returned in the name block by a Read-Directory command. It has the following encoding:

| 00 | Standard name block format; |
|---|---|
| 01 | Return only the name field; |
| 10 | Return the name field and version number; |
| 11 | Invalid. |

The operand is ignored unless the request type is B'10'.

Retry Index (RX): A value that designates a signaling-vector entry. Valid RXs are zero and assigned RXs within the range of one to the RX limit. If duplexing is active and the command sequence number is non-zero, the retry index is non-zero. If duplexing is not active for the structure or if the command sequence number is zero, the operand is ignored.

Skip-Nonexistent-Entries Control (SNEC): A value that controls the halting of an Unlock-Castout-Locks command, when a list item specifies a directory entry that does not exist. It has the following encoding:

| 0 | Halt execution when the list entry does not exist; |
|---|---|
| 1 | Continue execution with the next list item, when the list entry does not exist. |

Storage-Class-Change Control (STCCC): A value that controls the processing of a reference signal when the storage class is changed. It has the following encoding:

| 0 | Process the reference signal; |
|---|---|
| 1 | Halt execution. |

Suppress Detachment Scan (SDS): A value that controls the directory scan in the Detach-Local-Cache command. It has the following encoding:

| 0 | Scan the directory; |
|---|---|
| 1 | Suppress the directory scan. |

Suppress Read (SR): A value that indicates the data transfer for a Read-And-Register or Read-For-Castout command is suppressed.

Suppress Registration Test (SREGT): A value that controls the testing of the LCEN-registration for the Write-When-Registered command. It has the following encoding:

| 0 | Test the LCEN registration; |
|---|---|
| 1 | Suppress testing LCEN registration. |

Test-Message-Buffer-Size Indicator (TMBSI): A value that controls the testing of the message-buffer size for the Read-And-Register command. It has the following encoding:

| 0 | Do not test the message-buffer size; |
|---|---|
| 1 | Test the message-buffer size. |

Wait-on-Ready-to-Complete Indicator (WRTCI): The wait-on-ready-to-complete indicator is a value that determines the signaling protocol to follow during the command execution phase of the Write-And-Register or Write-When-Register command. It has the following encoding:

| 0 | Send the RTC signal as soon as execution completes. |
|---|---|
| 1 | Wait on sending the RTC signal until execution has completed and either an RTC signal or halt-execution signal is recognized. |

Notes on Cache Duplexing Operands:
1. The retry buffer designated by the retry index is not written and the contents of the retry buffer are not changed when a cache command specifies a non-zero retry index.
2. Using the retry index as the addressing mechanism for the signaling vector allows the operating system to extend its serialization protocol for retry buffers to the signaling vector. Since retry indices are already assigned for cache commands, no additional serialization is needed to introduce the signaling vector to the cache structure.
3. The LFCSC, LCEDC, and DTEMC operands enable the program to perform the directory cleanup process in the Detach-Local-Cache command explicitly. This allows the cleanup to be coordinated by means of the duplexing command protocols, so that the state of the duplexed directories is synchronized. The sequence used for detaching a local cache from a duplexed pair of structures is as follows:
A Read Directory command is sent to the primary cache with the CSSC, LCEDC, and LFCSC operands set to B'1', the request type set to B'10', the LCID operand set to the value of the local-cache identifier being detached, and the name-block-format control set to B'01'. All registrations for the specified local cache are deregistered from the primary cache structure.

The returned list of name blocks is provided as an input list of unlock-castout-lock items on a duplexed UCL command. The UCL command sent to the secondary cache has the IMMRC operand set to B'1'. Both copies of the UCL command have the DTEMC operand set to B'1'. The duplexed UCL commands are redriven until the list is completely processed.

Steps 1 and 2 are repeated until the entire directory has been scanned.

The final step is to independently detach the local caches by separate Detach Local Cache (DLC) commands sent to each cache, with the suppress detachment scan (SDS) operand set to B'1' for the commands sent to both structures.

4. The WRTCI operand should be set to B'1' on cache write commands sent to the secondary cache structure in the following cases:

A Write-When-Registered command is duplexed with the command sent to the primary cache having SREGT=B'0' and the command sent to the secondary cache having SREGT=B'1'. Setting WRTCI in this case ensures that the registration test is performed prior to completing the command in either structure.

A Write-And-Register or Write-When-Registered command is duplexed with the command sent to the primary cache having Version Request Type (VRT)=B'1xx'. Setting WRTCI in this case ensures that the version number comparison is performed prior to completing the command in either structure.

A Write-And-Register command is duplexed with the command sent to the primary cache having Assignment Suppression Control (ASC)=B'1' and the command sent to the secondary cache having ASC=B'0'. Setting WRTCI in this case ensures that a directory entry is not created in the secondary cache when the directory entry does not exist in the primary cache.

Cache-Structure Processes for Duplexing

The following processes may be invoked by the coupling facility cache-structure commands. The set of processes invoked by a command are listed in the command description.

The signaling protocol for synchronizing command execution across a duplexed pair of cache structures is defined via the following set of processes for duplexed command execution:

No command active process
Entry commit process
Single entry duplex command process
List-form duplex command process
Request for suppression process
Halting execution
Signal group processing
Execution of a duplex-signal list-notification command
Duplex command timeouts
Breaking of duplexing These processes are described above in the section on Duplexing Processes and are managed by the signaling protocol engine (FIG. 1). In contrast, the description of the processes that follows is the view from the structure itself.

Halting a Duplexed Command Process

A single-entry or list-form duplexed command process is halted or, equivalently, completes with a halted condition, when a halt signal is recognized, but a halt signal has not been issued. If a halt signal has been issued, then the duplexed command process completes with the condition that generated the halt signal, and any halt signal that may have been received is ignored.

Scanning a Directory

The directory is scanned when a Detach-Local Cache, Invalidate-Complement-Copies, Invalidate-Name, or Read-Directory command is executed.

The directory scan is controlled by the detachment-restart token for the Detach-Local-Cache command and by the restart-token request operand for the Invalidate-Complement-Copies, Invalidate-Name, and Read-Directory commands. A token value of zero starts the processing, and a non-zero token value restarts the processing from the place designated by the token. Processing is completed when the entire directory has been processed, when a model-dependent timeout has been exceeded, or when the command forces the scan to halt execution. When the end of the directory is reached, response code 0 is returned. When a model-dependent timeout occurs before the end of the directory is reached, the directory position is generated and response code (e.g., 1) is returned. When the scan is halted, the directory position is generated and the response code determined by the halting condition is returned.

Note on Scanning a Directory:

1. The format of the restart token is model dependent. However, the format depends only on the scan process and not on the command. Thus, a portion of the directory may be scanned for invalidation by an Invalidate-Name command and a subsequent portion by a Read-Directory followed by an Invalidate-Name-List command sequence, where the restart token returned by the Invalidate-Name command is used as input to the Read-Directory command. Likewise, a subsequent portion of the directory may be scanned for invalidation by an invalidate-name command using the restart token from the Read-Directory command as input. Such a change in processing may occur when an invalidation process is performed for a cache structure that is transforming into or out of the duplexing-active state.

Generating a Directory Position

A directory position is a value that designates the location of a directory entry in the cache directory. A directory position is generated, when one of the following commands completes with a model-dependent timeout or is halted.

Detach local cache
Invalidate complement copies
Invalidate name
Invalidate name list
Read directory
Unlock castout locks.

When a Detach-Local-Cache command completes with a model-dependent timeout, the directory position of the next directory entry to be processed by the directory scan is placed in the detachment-restart token in the local cache controls for the local cache that is being detached.

When an Invalidate-Complement-Copies, Invalidate-Name, or Read-Directory command completes with a model-dependent timeout or is halted, the directory position of the next directory entry to be processed by the directory scan is placed in the restart-token response operand.

When the Invalidate-Name-List or Unlock-Castout-Locks command completes with a model-dependent timeout or is halted, the directory position of the directory entry identified by the current-list-item response operand is placed in the directory-position response operand.

When an Invalidate-Name-List or Unlock-Castout-Locks command completes processing and the current-list item designates a name that is not assigned to the directory and the directory position cannot be determined, the directory position is set to zero.

Updating a Version Number

A version number may be updated when a Write-And-Register or Write-When-Registered command is executed, with the action taken depending on the version-request type specified, the duplexing-state of the structure, and the changed-state of the data.

When a version-request type of B'000' is specified, or a version-request type of B'100' is specified and version-number comparison is successful, the version number is updated as follows:

When any of the following conditions holds: (1) duplexing is not active for the structure, (2) duplexing is active, but the command sequence number is zero, or (3) duplexing is active, the command sequence number is non-zero, and the data is in the changed state, then the version number is not changed. Otherwise, the version number is set to the value zero.

When a version-request type of B'001' is specified, or a version-request type of B'101' is specified and version-number comparison is successful, the version number is updated as follows:

When any of the following conditions holds: (1) duplexing is not active for the structure, (2) duplexing is active, but the command sequence number is zero, or (3) duplexing is active, the command sequence number is non-zero, and the data is in the changed state, then the version number is decremented by one. Otherwise, the version number is set to the value minus one.

When a version-request type of B'010' is specified, or a version-request type of B'110' is specified and version-number comparison is successful, the version number is updated as follows:

When any of the following conditions holds: (1) duplexing is not active for the structure, (2) duplexing is active, but the command sequence number is zero, or (3) duplexing is active, the command sequence number is non-zero, and the data is in the changed state, then the version number is incremented by one. Otherwise, the version number is set to the value plus one.

When a version-request type of B'011' is specified, or a version-request type of B'111' is specified and version-number comparison is successful, the version-number object is set to the version-number request operand.

Note on Updating a Version Number:

When duplexing is active for the structure, unchanged data is not cached in both structures. However, the increment and decrement functions for version numbers rely on the presence of the version-number object in the directory entry as preexisting state information. If the data is subsequently written as changed or the castout lock is set, the version-number object is to be consistent between the two structures, when the write operation is performed. Zeroing out the version number before performing the increment or decrement function ensures that the duplexed pair of write commands produce the same value for the version number. It may appear that this defeats the purpose of the version number. However, a directory entry with no data or unchanged data may be reclaimed at any time and the reclaim operation destroys the version number. A subsequent write command assigns a new directory entry and performs the increment or decrement operation with an initial object value of zero. This results in a plus one for increment and a minus one for decrement. This is the case whether or not duplexing is active for the structure. So, the program (i.e., the application owning the structure, such as DB2) assumes that version numbers set in directory entries that may be reclaimed may appear to be reset to zero at any time. Forcing the version number to be zero when a duplexed write command is executed for an unchanged directory entry emulates the effect of a reclaim operation.

Suppressing Reads

The data transfer of the data area in the Read-For-Castout or Read-And-Register commands is suppressed when the suppress read (SR) request operand is set to 1. For the Read-For-Castout command, the message-buffer size is tested, and for the Read-And-Register command, testing of the message buffer size is controlled by the TMBSI request operand. When the TMBSI operand is B'0', no testing is performed. When the TMBSI operand is B'1', the message-buffer size is tested. When testing is performed and there is insufficient message-buffer space provided, the command completes with a response code (e.g., 11).

Note on Suppressing Reads:
1. When a Read-For-Castout command is duplexed or a Read-And-Register command which requests that data be read is duplexed, the message buffer address list in both message operation blocks should be set up with identical addresses and the suppress-read operand should be set to B'0' on the command sent to the primary cache and should be set to B'1'. on the command sent to the secondary cache. This ensures that consistent checking of the message-buffer size is performed by both coupling facilities. Testing of the message-buffer size is performed, even when data transfer is suppressed, so that reconciliation can be completed, when duplexing is broken during execution of the command. Otherwise, it may be the case that the command sent to the primary completed with response code 11, the command sent to the secondary completed successfully, duplexing was broken during command execution, and the secondary cache structure was selected as the surviving structure. Reconciliation cannot be completed in this case because the data cannot be read into the message buffers.

Cache Command Extensions for Duplexing

The secondary cache structure differs in several ways from the primary structure.
1. Unchanged data is not written to the secondary cache.
2. Registrations are not maintained in the secondary structure. A failure that results in the secondary cache being selected to execute in simplex mode causes the local caches to be invalidated.
3. Read references are directed to the primary cache. So, the reference order in the secondary cache is inconsistent with the primary. However, following a failure of the primary cache, the reference order will be restored from new references only; no attempt is made to restore the old order.
4. Data-area elements are reclaimed substantially immediately following the completion of an Unlock-Castout-Locks command, where the change bit is zero.
5. Reclaim vectors are inactive in the secondary cache.

The following general changes are made to the cache commands:
1. Retry indices are added to the duplexed commands to identify a signaling group in the signaling vector that is used to receive signals from the remote coupling facility. However, the corresponding retry buffers are not updated by the cache commands.
2. A command sequence number (CSN) is added to the duplexed commands to provide a time-stamp and is used to break potential deadlocks.
3. Two request operands, the duplexing retry index (DRX) and the duplexing signal group index (DSGX) are added to the duplexed commands to construct the duplexing signals sent to the remote facility. Additional information is provided in the duplexing controls.

4. The current signal group index (CSGX) is returned as a response operand in the response descriptor for each command that exchanges signals with a remote coupling facility.

Using the above assumption for the secondary cache structure, the following extensions are made to the behavior of known cache commands. This is described further below.

Allocate Cache Structure: Directed allocation, which is described in U.S. patent applications entitled "Method, System and Program Products For Modifying Coupling Facility Structure", Dahlen et al., Ser. No. 09/379,435, filed Aug. 23, 1999; and "Directed Allocation Coupling Facility Structures", Dahlen et al., Ser. No. 09/378,861, filed Aug. 23, 1999, each of which is hereby incorporated herein by reference in its entirety, is used to create a secondary structure matching the primary, when possible. When the secondary structure is created with less resources than the primary structure, the primary structure is altered to match the secondary by trimming the total count objects and releasing any free segments.

Attach Local Cache: New connectors are attached in parallel to both structures. When a secondary cache structure is created, existing connectors are attached as individual operations. The operating system serializes the connect process, so command synchronization is not required. The values of the LCT and LCID are the same in the two structures.

Deallocate Cache Structure: When the application requests structure deletion, both the primary and secondary caches are deallocated, with deallocation occurring in parallel. The operating system serializes the deallocation process, so command synchronization is not required. Transitions from duplex mode to simplex mode causes individual Deallocate-Cache-Structure commands to be issued.

Detach Local Cache: The detach is done as a two step process. In the first step, a Read Directory command is issued to the primary cache to return all the directory entries, which are locked for castout and the LCID in the castout lock is the same as the target of the detach. A UCL command is then issued to both structures using the list-form protocol with the returned list from the RD command. The second step is to issue a detach command to each structure as independent processes.

Invalidate Complement Copies: The Invalidate Complement Copies (ICC) command is only issued to the primary structure. The ICC command does not update any objects in the cache structure, except for the local-cache register and the XICIC STC counter, neither of which is maintained in the secondary structure.

Invalidate Name (IN): The Invalidate Name command is not issued directly using the duplexing protocol. The Invalidate Name command scans the directory and deletes directory entries as they are encountered for a model-dependent time period. If duplexed, the commands would be the two separate directories in an independent fashion and there is no method to ensure that the directory updates are coordinated. So, it would be inevitable that the two directories would be out of synchronization for periods of time. This is not permitted by the design and therefore, the IN command is converted into a Read-Directory command issued to the primary followed by an Invalidate-Name-List command issued to both structures using the list-form duplexing protocol. On completion, the restart token generated by the Read-Directory command is returned to the issuer for use on redrive of the IN command.

Invalidate Name List: The Invalidate Name List is sent to both structures and the multi-command protocol is used to synchronize execution on a list-item basis. The command may be a direct request from the list-structure user, or may be the conversion of an invalidate-name request. When the command is a converted Invalidate Name (IN) command, the message buffer address list (MBAL) for the Send Message instruction associated with the INL command designates the data block returned by the Read Directory (RD) command. The formats of the list entries are identical between the commands and do not need to be reformatted. When a halting condition is requested, it is set on the command sent to the primary and not set on the command sent to the secondary. The list-form protocol halts both commands, when a proper halting event is encountered.

Process Reference List: The process reference list command is only issued to the primary structure. Reference ordering is not maintained in the secondary.

Read-and-Register: Normal read-and-register requests are only sent to the primary cache structure, since the only directory objects that are updated are registration controls, reference bits and storage class counters that are not maintained in the secondary cache. However, in some circumstances, the storage class, which is maintained in the secondary cache, can be changed by the Read-And-Register (RAR) command. So, the processing for RAR is optimistically sent to the primary only, but the Read-And-Register (RAR) command is issued with a new request operand that tests the storage class. If the storage class would be changed by the command, the command is completed with a new response code and no other action occurs. The program then reissues the RAR command to both the primary and secondary structures using a single entry duplexing protocol to control the execution.

Read Castout Class: Castout operations are driven off of information in the primary structure.

Read Castout-Class Information: Castout operations are driven off of information in the primary structure.

Read Directory: The reference bit does not need to be set in the secondary, since the reference order is not maintained. A new control is added that requests that only directory entries that are locked for castout with a specified LCID value are returned. A new control is added that modifies the output of a name block, so that it is compatible with the input list on a UCL command.

Read For Castout: Castout locks are set in both the primary and secondary structures. The local cache entry registration control (LCERC) and name replacement control (NRC) are set to zero in the command sent to the secondary cache. The only objects updated in the secondary cache are the castout lock, the castout count (COC), storage class (STC) counter, and the castout-class controls.

Register Name List: Since registrations are not maintained in the secondary cache structure, the Register Name List command is only sent to the primary cache structure.

Set Reclaiming Vector: The reclaiming vector remains inactive in the secondary cache until it is promoted to being the primary. At this point, the reclaiming vector may be activated. However, the contents of the old reclaiming vector in the primary structure has little meaning in the secondary structure. There is a period of time where the references to the secondary cache structure stabilize anyway, since they do not contain unchanged data until the structure is promoted.

Unlock Castout Lock Entry: The Unlock-Castout-Lock Entry command is issued to both structures using the single-entry duplexing protocol. A new control is added that requests immediate reclaim, when the change bit is zero. The control is set on the command sent to the secondary.

Unlock Castout Locks: The Unlock-Castout-Locks command is issued to both structures using the list-form duplexing protocol. A new control is added that requests immediate reclaim, when the change bit is zero. The control is set on the command sent to the secondary.

Write-and-Register (WAR): When the change control is one, or the operation is write with castout, the Write-And-Register command is issued to both structures using the single-entry duplexing protocol. When the change control is zero and the operation is not write with castout, the WAR command is only issued to the primary structure. The command sent to the secondary structure, has the NRC set to zero. When either the primary or secondary structure encounters a target-storage-class-full condition, a halt signal is sent. This occurs in the secondary structure when either free list is exhausted and the write cannot complete. Since registrations are not maintained in the secondary, no XI signals are generated.

Write-When-Registered (WWR): When the change control is one, or the operation is write with castout, the Write-When-Registered command is issued to both structures using the single-entry duplexing protocol. When the change control is zero and the operation is not write with castout, the WWR command is only issued to the primary structure. A new option is added to the WWR command to suppress the registration check. When either the primary or secondary structure encounters a target-storage-class-full condition, a halt signal is sent. This occurs in the secondary structure, when either free list is exhausted and the write cannot complete. Since registrations are not maintained in the secondary, no XI signals are generated.

List-Structure Operands

Similar to cache structures, each list structure has its own operands that are associated with the list, when it is created. Examples of these operands are described below.

Comparative Structure Authority (CSAU): A value used as a comparison value to the structure authority, when the structure is allocated and deallocated, or when lock-table entries are written or list entries are deleted and the compare-structure-authorities control is one. This operand is ignored on a Delete-List or Write-Lock-Table. Entry command, when duplexing is inactive.

Comparative Remote-Facility Structure Authority (CRFSAU): A value used as a comparison value to the remote-facility structure authority, when lock-table entries are written or list entries are deleted and the compare-structure-authorities control is one. This operand is ignored on a Delete-List or Write-Lock-Table-Entry command, when duplexing is inactive.

Compare-Structure-Authorities Control (CSAUC): A value that controls the comparison of the structure authority and remote-structure authority controls to the CSAU and CRFSAU operands on a Delete-List-Entries or Write-Lock-Table-Entry command. It has the following encoding:

| | |
|---|---|
| 0 | Do not compare structure authorities; |
| 1 | Compare structure authorities. |

This operand is ignored unless duplexing is active for the structure.

Command Sequence Number (CSN): A value associated with a command that is duplexed. List-structure commands that specify a non-zero value in the CSN request operand cause the invocation of the duplexing-command process, when duplexing is active for the structure. Commands that do not have the CSN request operand defined, or which specify a zero value in the CSN request operand, do not invoke the duplexing-command process.

Duplexing-Active Indicator (DUPAI): A value that controls execution of the command based on the duplexing state of the structure. It has the following encoding:

| | |
|---|---|
| 0 | Do not test the duplexing state; |
| 1 | Test the duplexing state of the structure. |

Duplexing Signal-Group Index (DSGX): A value that identifies the target signal group in the signaling-vector entry identified by the duplexing retry index and the remote-facility controls. If duplexing is active and the command sequence number is non-zero, the duplexing signal-group index is non-zero. If duplexing is not active for the structure or if the command sequence number is zero, the operand is ignored.

Duplexing Retry Index (DRX): A value that designates a signaling-vector entry for the signaling vector identified by the remote-facility controls. If duplexing is active and the command sequence number is non-zero, the duplexing retry index is non-zero. If duplexing is not active for the structure or if the command sequence number is zero, the operand is ignored.

Failed-Structure Indicator (FSI): A value that controls the state change for the structure that occurs when a Deallocate-List-Structure command is executed and the structure is in the allocated state. It has the following encoding:

| | |
|---|---|
| 0 | Initiate deallocation of the structure; |
| 1 | Place the structure in the structure-damage state. |

EMC Restart Token (ERT): A value that determines at which EMC the Read Event-Monitor-Control-List command restarts reading or the Queue-Pending-EMCs (QPE) command (described hereinafter) restarts scanning. Invalid values for the EMC-restart token are model dependent.

Starting List Number (SLN): A value that specifies the starting-list number for the Read-Event-Monitor-Controls-List or Queue-Pending-EMCs command. The SLN is invalid, if it is greater than or equal to the list count, or greater than the ending-list number.

Ending list number (ELN): A value that specifies the ending-list number for the Read-Event-Monitor-Controls-List (REMCL) or Queue-Pending-EMCs (QPE) command. For the REMCL command, the ELN is invalid, if it is greater than or equal to the list count, or less than the starting-list number. For the QPE command, any value for the ELN operand is valid.

Intermediate-Controls-Returned-on-Timeout Control (ICRTOC): A value that controls the completion processing of a Delete-List-Entries command, when a model-dependent timeout is recognized. The two possible values are:

| | |
|---|---|
| 0 | List-entry controls are not returned on a timeout condition. |
| 1 | List-entry controls for an intermediate list entry in the scan are returned on a timeout condition. |

This operand is ignored unless the skip-nonexistent entries control (SNEC) (described below) and list number comparison type (LNCT) operands are both B'1'.

List-Form-Duplexing Completion Code (LFDCC): The list-form-duplexing completion code is a value that specifies the reason a list-form duplexing process was stopped with a model-dependent timeout, when one or more list items have been processed. It has the following encoding:

| | |
|---|---|
| 00 | Timeout caused by internal conditions. |
| 01 | Command halted. |
| 10 | Implicit or explicit suppression request was accepted. |
| 11 | Duplexing is inactive. |

If the command sequence number is zero, the list-form-duplexing completion code is set to B'00'.

Notes on LFDCC Response Operand:
1. The LFDCC response operand provides the reason that processing was stopped with a response code 1 at the current list item.
2. When the LFDCC is B'01', a halt signal was received during the execution of the list item and execution of the current list item was suppressed. One of the conditions for issuing a halt signal was encountered by the remote facility. In this case, the duplexed command will also end with RC=1, and any value for the LFDCC is possible. The program should retry as a normal RC=1 condition. The LFDCC information can be used for monitoring purposes. If the reason for halting the command persists on the retry, then the condition will cause the first list item to fail. In this case, the system receiving the halt signal will most probably end with RC=18 and the duplexed command will return the response code that identifies the reason for halting the command.
3. When the LFDCC is B'10', a request-for-suppression signal was accepted. A possible deadlock condition has been encountered and the duplexed command's execution of the current list item was suppressed. In this case, the duplexed command will also end with RC=1 and an LFDCC value of B'10' will be returned. The program should retry as a normal RC=1 condition. The LFDCC information can be used for monitoring purposes.
4. When the LFDCC is B'11', duplexing was broken during the execution of the current list item. The structure state will transition to simplex mode.
5. When the LFDCC is B'00', a model-dependent timeout was recognized by the local facility. In this case, a halt signal was sent to the remote facility, and the duplexed command will complete with an RC=1, and an LFDCC value of B'01' will be returned. It is also possible that the duplexed command encountered the same model-dependent timeout condition, or possibly a different halting condition and had also sent a halt signal. In all of these cases, the duplexed command will return an RC=1 and an LFDCC value of B'00'. These case are all normal RC=1 conditions.

List-Set Position (LSP): A value that denotes a position of a list entry in the list set.

Read-LEIDs Indicator (RLEIDI): A value that indicates whether the data block contains a list of LEIDs or contains the information specified by the RLT request operand. It has the following encoding:

| | |
|---|---|
| 0 | Return information specified by the RLT operand; |
| 1 | Return a list of LEIDs only. |

Retry Index (RX): A value that designates a retry buffer and a signaling-vector entry. An RX of zero indicates that the retry buffer should not be written. If the retry index is non-zero and the command is among the list of commands in the process for writing the retry buffer, the retry buffer is written. Valid RXs are zero and assigned RXs within the range of one to the RX limit. If duplexing is active and the command sequence number is non-zero, the retry index is non-zero.

Skip-Nonexistent-Entries Control (SNEC): A value that controls the halting of a Delete-List-Entries command, when a list item specifies a list entry that does not exist. It has the following encoding:

| | |
|---|---|
| 0 | Halt execution when the list entry does not exist; |
| 1 | Continue execution with the next list item when the list entry does not exist. |

Suppress-Notification Control (SNC): A value that controls the sending of list notification commands when a list-state transition, key-range transition, or event queue state transition occurs, and controls both the queuing and withdrawing of EMCs, when a subsidiary-list state transition occurs. It has the following encoding:

| | |
|---|---|
| 0 | Queue or withdraw EMCs and issue list-notification commands; |
| 1 | Do not queue or withdraw EMCs or issue list-notification commands. |

Suppress Read (SR): A value that indicates the data transfer for a read command is suppressed, but the data-list entry is written to the retry buffer.

List-Structure Processes for Duplexing

The following processes may be invoked by the list-structure commands. The set of processes invoked by a command are listed in the command description. The signaling protocol for synchronizing command execution across a duplexed pair of list structures is defined via the following set of processes for duplexed command execution:
    No command active process
    Entry commit process
    Single entry duplex command process
    List-form duplex command process
    Request for suppression process
    Halting execution
    Signal group processing
    Execution of a duplex-signal list-notification command
    Duplex command timeouts
    Breaking of duplexing.

These processes are described in the section on duplexing signals and are managed by the signaling protocol engine (FIG. 1). In contrast, the description of the processes that follows is the view from the structure itself.

Writing the Retry Buffer: The following commands update the contents of the specified retry buffer when the retry buffer is assigned:
    Clear lock table
    Delete list
    Delete list entries
    Delete list entry
    Delete list set
    Dequeue event-monitor controls
    Move and read list entry
    Move list entries
    Move list entry Perform adjunct lock operation
Perform adjunct lock operations
Read and delete list entry
Record global lock manager
Withdraw adjunct lock user
Write and move list entry
Write list controls
Write list entry
Write lock-table entry.

When the retry index is zero, no retry buffer is updated. When the retry index is non-zero, the retry-version-number request operand and the response operands, except for the response descriptor, are stored in the retry-information portion of the retry buffer specified by the retry index. When the retry index is non-zero and a data list entry is read, or when the list-entry type specifies reading the data list entry, but the suppress-read operand is b'1', the data list entry is also stored in the retry-data-block portion of the retry buffer specified by the retry index.

The duplexing-deactivated indicator is copied from bit 28 of word 2 in the response descriptor to bit 0 of word 1 of the retry information.

When the command is terminated, suppressed, or completed such that the completion appears the same as suppression except that an MRB may be returned, the retry buffer may or may not be updated.

Halting a Duplexed Command Process: A single-entry or list-form duplexed command process is halted, or, equivalently, completes with a halted condition, when a halt signal is recognized, but a halt signal has not been issued. If a halt signal has been issued, then the duplexed command process completes with the condition that generated the halt signal, and any halt signal that may have been received is ignored.

Scanning a List Set: The list set is scanned when a Delete-List-Set or Read-List-Set command is executed. The list-set scan is controlled by the restart-token request operand. A token value of zero starts the processing, and a non-zero token value restarts the processing from the place designated by the token. Processing is completed when the entire list-set has been processed, when a model-dependent timeout has been exceeded, or when the command forces the scan to halt execution. When the end of the list set is reached, response code 0 is returned. When a model-dependent timeout occurs before the end of the directory is reached, the list-set position is generated and response code 1 is returned. When the scan is halted, the list-set position is generated and the response code determined by the halting condition is returned.

Generating a List-Set Position: A list-set position is a value that designates the location of a list entry in the list set. A list-set position is generated, when one of the following commands completes with a model-dependent timeout or is halted:
  Delete List Entries;
  Delete List Set;
  Read List Set.

When a Delete-List-Set or Read-List-Set command completes with a model-dependent timeout or is halted, the list-set position of the next list entry to be processed by the list-set scan is placed in the restart-token response operand.

When the Delete-List-Entries command completes with a model-dependent timeout or is halted, the list-set position of the list entry identified by the current-data-index response operand is placed in the list-set-position response operand.

When a Delete-List-Entries command completes processing and the current-data index designates a list entry that does not exist and the list-set position cannot be determined, the list-set position is set to zero.

Suppressing Reads

The data transfer of the data area in the Read-List-Entry, Move-And-Read-List-Entry, Read-And-Delete-List-Entry commands is suppressed, when the SR request operand is set to 1. However, the message-buffer size is still tested to see if sufficient message buffer space is provided for returning the data area. If there is insufficient message-buffer space provided, the command completes with a response code (e.g., 11). Additionally, the data-list entry is moved to the retry-data-block portion of the retry buffer specified by the retry index.

Notes on Suppressing Reads:
  1. When a Read-List-Entry, Read-And-Delete-List-Entry, or Move-And-Read-List entry command is duplexed, the message buffer address list in both message operation blocks should be set up with identical addresses and the suppress-read operand should be set to B'0' on the command sent to the primary list structure and should be set to B'1' on the command sent to the secondary list structure. This ensures that consistent checking of the message-buffer size is performed by both coupling facilities. Testing of the message-buffer size is performed even when data transfer is suppressed, so that reconciliation can be completed when duplexing is broken during execution of the command. Otherwise, it may be the case that the command sent to the primary completed with response code 11, the command sent to the secondary completed successfully, duplexing was broken during command execution, and the secondary list structure is selected as the surviving structure. However, reconciliation cannot be completed because the data cannot be read from the retry buffer into the message buffers.

List Command Extensions for Duplexing

In one embodiment, the primary and secondary list structure are kept in synchronization with the exception of the event queues. The secondary list appears to be a duplicate of the primary list (except for event queues). This requires that virtually every command be duplexed and synchronized, including some read commands.

The event queues are only maintained, in this example, in the primary structure. However, the key structures in the secondary list include all the state information employed to restore the event queues on failover. This is done by the LFSS issuing a QPE command (described herein) to the secondary during the failover process.

The following general changes are made to the list commands:
  1. There is one list-notification vector per connector. List notifications are not generated in the secondary list. A new suppress-notification control is added to commands that generate LNs.
  2. Retry indices are added to the duplexed commands to identify a signaling group in the signaling vector that is used to receive signals from the remote coupling facility. However, the corresponding retry buffers are only updated for the commands that previously updated the retry buffer. In particular, the locking commands do not update the retry buffer.
  3. A command sequence number (CSN) is added to the duplexed commands to provide a time-stamp and is used to break potential deadlocks.
  4. Two request operands, the duplexing retry index (DRX) and the duplexing signal group index (DSGX), are added to the duplexed commands to construct the duplexing signals sent to the remote facility. Additional information is provided in the duplexing controls.

5. The current signal group index (CSGX) is returned as a response operand in the response descriptor for each command that exchanges signals with a remote coupling facility.

Allocate List Structure: Directed allocation, which is described in U.S. patent applications entitled "Method, System and Program Products For Modifying Coupling Facility Structure", Dahlen et al., Ser. No. 09/379,435, filed Aug. 23, 1999; and "Directed Allocation Coupling Facility Structures", Dahlen et al., Ser. No. 09/378,861, filed Aug. 23, 1999, each of which is hereby incorporate herein by reference in its entirety, is used to create a secondary structure matching the primary, when possible. When the secondary structure is created with less resources than the primary structure, the primary structure is altered to match the secondary by trimming the total count objects and releasing any free segments.

Attach List-Structure User: New connectors are attached in parallel to both structures. When a secondary list structure is created, existing connectors are attached as individual operations. The operating system serializes the connect process, so command synchronization is not required. The values of the LNT and UID are the same in the two structures.

Cleanup Lock Table Entries: A disconnect causes Cleanup-Lock-Table. Entries commands to be issued in parallel to both structures. The operating system serializes the disconnect process, so a duplexing protocol to ensure synchronization is not required. Issuing the cleanup separately implies that the resetting of the lock-table entries is not synchronized between the structures. This is acceptable, since the user connection has been invalidated, and thus, no new lock commands will be processed for this UID.

The following commands are issued to both structures using the single-entry duplexing protocol to control their execution:
Clear Global Lock Manager
Delete List Entry
Deregister List Monitor
Move and Read List Entry
Move List Entry
Read and Delete List Entry
Read List Entry
Record Global Lock Manager
Register List Monitor
Reset Global-Lock Manager
Set Global-Lock Manager
Set Local-Lock Manager
Write and Move List Entry
Write List Controls
Write List Entry
Write Lock-Table Entry.

The following commands are issued to both structures using the list-form duplexing protocol to control their execution:
Delete List Entries
Dequeue Event Monitor Controls List
Move List Entries
Register Event Monitors
Reset Lock Managers.

The following commands are issued to the primary structure only:
Read Event Monitor Controls
Read EMC List
Read Event-Queue Controls
Read List
Read List Controls
Read List Set
Read Lock-Table Entry
Read Lock-Table Range
Read Next Lock-Table Entry
Write List-Set Scan Controls.

Clear Lock Table: This command is used when the last connector disconnects and the structure is persistent. Since all activity to the structure has ceased, the command can be issued independently to the two structures, without duplexing controls.

Deallocate List Structure: When the application requests structure deletion, both the primary and secondary lists are deallocated, with deallocation occurring in parallel. The operating system serializes the deallocation process, so command synchronization is not required. Transitions from duplex mode to simplex mode will cause individual Deallocate-List-Structure commands to be issued.

Delete List: Delete list (DL) is converted into a Read List command issued to the primary followed by a Delete-List-Entries command issued to both structures with the list-form duplexing protocol. On completion, the restart token generated by the Read List command is returned to the issuer for use on redrive of the DL command.

Delete List Entries: The command may be a direct list-structure user request or may be the conversion of a delete-list-set request. A control suppresses LNs in the secondary. The format of the data block matches the format for the Read-List-Set command.

Delete List Set: The DLS command is converted into a Read-List-Set command issued to the primary followed by a Delete-List-Entries command issued to both structures with the list-form duplexing protocol. On completion, the restart token generated by the Read List Set command is returned to the issuer for use on redrive of the DLS command.

Dequeue Event Monitor Controls (DEMC): The DEMC command is converted into a Read-EMC-List command issued to the primary followed by a Dequeue-EMC-List command issued to both structures with the list-form duplexing protocol.

Dequeue Event Monitor Controls List: A list-form of the DEMC command is used to synchronize the dequeue operations. The data-block format matches the format for the Read-EMC-List command.

Queue Pending EMCs (QPE):
One example of the request operands provided in the message command block for the QPE command are summarized in the following table.

| Request Operands | Acronym |
| --- | --- |
| Message Header | |
| Command Code | CC |
| Structure Identifier | SID |
| EMC Restart Token | ERT |
| Starting List Number | SLN |
| Ending List Number | ELN |

In execution of one embodiment of the QPE command, if the value of the event-monitor-controls-count object is zero, the command is completed and a response code (e.g., 0) is returned. Otherwise, the event monitor controls within the list set are scanned starting with the starting-list number or the EMC-restart token, until a model dependent time period elapses or the last event monitor control is scanned. A zero EMC-restart token causes the entire list to be processed starting at the start-list number operand. A valid non-zero EMC-restart token starts the processing at the event monitor control object designated by the EMC-restart token.

The EMCs are scanned starting with the starting-list number, then in ascending order by LN up to either the ending-list number or to one less than the list count, whichever is smaller. The EMCs in a list-number are scanned in an unpredictable ordering for keys, and an unpredictable ordering for UIDs within a key value.

The event-monitor controls in the list set are processed by queuing each EMC that is queue-pending to the corresponding event queue and by withdrawing each EMC that is withdrawal pending from the corresponding event queue. If this causes event-queue transitions, the event-queue monitors are notified. The queuing or withdrawing of event-monitor controls and the generated list-notification commands are primary processes.

The list-set scan ensures that any EMC that is queue-pending or withdraw-pending when the scan is initiated and remains queue-pending or withdraw-pending throughout the scan is queued to or withdrawn from the event queue, as appropriate.

When a model-dependent time period has elapsed, the list-set position for the next EMC to be processed is generated and placed in the EMC-restart-token response operand. The EMC-restart token and a response code (e.g., 1) are returned.

When the list-set scan is completed, a response code (e.g., 0) is returned.

When the EMC-restart token is invalid, a response code (e.g., 3) is returned.

The following response codes may be returned:
List-scan completed;
Model-dependent timeout;
Invalid EMC-restart token.

Detach List-Structure User: A disconnect causes Detach-List-Structure-User commands to be issued in parallel to both structures. The operating system serializes the disconnect process, so command synchronization is not required. Issuing the detach separately implies that the dequeuing of the EMCs is not synchronized between the structures. This is acceptable, since the user connection has been invalidated, and thus, no new EMCs will be queued for this UID.

Read List-Structure Controls: Depending on how structure information is reported, the information may only be obtained from the primary structure, or obtained in an independent fashion.

Read User Controls: While the LNT, US and SYID are the same between the structures, the User Authority (UAU) and user attachment control (UAC) may be different.

Described in detail above is a capability that allows coupling facilities to be coupled to one another via, for instance, a peer link. The coupling of the facilities allows many functions to be employed, including the duplexing of structures. Although duplexing is described above, the coupling of the facilities can be for reasons other than duplexing.

The duplexing of structures results in two structures being created in two different coupling facilities. In one example, the coupling facilities are failure isolated, so that the failure of one does not affect the other.

While both cache and list (including lock) structures can be duplexed, the information that is duplexed is different for the different types of structures, as described herein. In other embodiments, however, other information may or may not be duplexed.

Although in the embodiments described herein, the duplexing results in two structures of two coupling facilities, this can be extended to a plurality of structures in a plurality of coupling facilities.

In the embodiments described above, various objects controls and operands are described. These are only examples. There may be more, less or different objects, controls and/or operands. Further, in some examples, the values of a bit or response code may be provided. Again, these values are only examples. Any other values may be used. Moreover, in the various control flows, various tests are performed. These are only examples. Tests may be added or deleted, depending on the Sysplex. For example, if dumping serialization is not a part of the Sysplex, then the tests associated with dumping serialization can be eliminated. The same is true for other tests.

Many advantages are provided by the various aspects of the present invention. Examples of these advantages are described below:

No new hardware changes are required. The peer link between the two coupling facilities is the same physical link that is used for connecting host systems to coupling facilities. In fact, any of the three coupling link types, the intersystem channel (ISC), the integrated cluster bus (ICB), or the internal coupling link (IC), can be used for the purpose of exchanging signals between the coupling facilities for duplexing. Moreover, when one or both coupling facilities are internal coupling facilities (ICFs), the same links can be used for both duplexing traffic and for normal command traffic.

No new link architecture is required. The signaling protocol used for duplexing utilizes the list-notification mechanism that already exists in the coupling link architecture. The duplexing signals are defined as unique encodings of the list-notification-entry number and address a list vector that is created by the coupling facility and accessed by a standard list-notification token that is exchanged between the coupling facilities.

The peer link design is highly scalable. In particular, the data rates for signal exchanges are very low compared to the data rates for commands and data exchanged between host systems and the coupling facilities. So, a single peer link can support the combined signaling traffic generated by all the coupling links attached from the host systems to the coupling facilities for all the structures that are duplexed.

The peer link design is highly available. Multiple peer links can be configured as redundant coupling facility-to-coupling facility connections the duplexing protocol will recognize link failures and maintain the signal exchange on surviving links.

The peer link design is highly flexible. Coupling facility-to-coupling facility links need not be configured between all pairs of coupling facilities, only the ones in which duplexed pairs of structures are to reside. A coupling facility may be connected to many other coupling facilities in this way, and duplexed structures may be located in any of the connected coupling facilities.

Duplexed coupling facility operations, including data transfer, can be performed in parallel to the coupling facilities. This contrasts with the store-and-forward design, or alternatively, a design that sends a command first to one coupling facility and then, after the first completes, to a second coupling facility. The net result of parallel execution is that the elapsed execution time for a duplexed pair of operations should approximate the elapsed time of a single command.

Signaling between the coupling facilities is nondisruptive. The receiver channel makes storage updates to reflect receipt of coupling facility-to-coupling facility signals, without needing to interrupt or otherwise, get the attention of the coupling facility code at that time.

The granularity of duplexing is on a structure basis. No fixed association exists between duplexed structures and coupling facilities. For instance, three coupling facilities may be used to duplex two separate structures, where only one of the coupling facilities contains both structures. Also, some structures in a given coupling facility may be in the duplexed state and others may be simplexed (no duplexed copy). Also, moving between states, duplexed-to-simplexed or simplexed-to-duplexed, is done on an individual structure basis.

Existing CFCC latching mechanisms serialize command execution and command atomicity properties with only the addition of the duplexing signals to coordinate the execution of the commands. No external serialization is required to serialize the execution of the commands. That is, locking structures outside of the structure itself are not needed nor is any serialization needed by those other than the coupling facility. Further, it is not necessary to try to simulate or reproduce the coupling facilities existing internal atomicity properties via some new external serialization protocol. The existing latching mechanism, and all that it implies, is preserved intact.

The LFSS component is extended to obtain two subchannels in parallel when a command is split for duplexing and to transparently (to the requesting application) handle all aspects of executing the two commands, as if they were a single command, including: handling error conditions, retries, and merging results.

An extension to the message-facility architecture, called the synchronous completion on initial status (SCIS) bit, is defined that allows for optimal redrive of one or both duplexed commands in the presence of link congestion. This function is used for existing simplex requests, as well as the duplexed requests, and is an advantage in both environments. However, in the duplexing environment it not only improves command elapsed time, but also minimizes command skew when one of the two commands encounters congested links and the second does not.

In addition to the above advantages, the following is provided as a summary of various aspects of the present invention.

In order to duplex coupling facility structures and commands against those structures, an efficient means for the two coupling facilities participating in duplexing is provided to synchronize their command processing for a particular duplexed operation against a particular duplexed structure. Duplexed coupling facility commands execute in harmony between the two coupling facilities in a way which preserves properties of command atomicity/concurrency guaranteed by the coupling facility command architecture for simplex structures. Both commands either complete, or back out, in the two coupling facilities. In this context, a highly-efficient means of signaling between the two coupling facilities to communicate status of processing of the request is employed.

In one example, the mechanism is based on an application of the existing List Notification (LN) mechanism that coupling facilities use today to communicate status information to the attached operating systems. Here this mechanism is used for coupling facility-to-coupling facility communication.

An architected encoding of the list notification entry number (LNEN) for use in coupling facility-to-coupling facility signaling provides five signal types:

| | |
|---|---|
| RTC (Ready to Complete) Signal | Used to extend command concurrency rules for a single coupling facility command to a duplexed pair of commands. In particular, this signal indicates that the coupling facilities are ready to complete command processing and commit the results for a duplexed operation. |
| RTE (Ready to Execute) Signal | Used to minimize latch hold times for skewed commands by delaying latch obtains until both coupling facilities have received the MCBs. |
| Halt Signal | Allows for different resource usage patterns in the 2 coupling facilities. Coupling facilities do not need to be duplexed in their entirety, rather they are duplexed (or not) on a structure basis. Coupling facilities can be different functional LEVELs and/or different implementations. It also allows the duplexing of changed data only for cache structures. (This is a very flexible signal and has solved a number of other problems as well - link timeout skews, deadlock avoidance without RTC reception, for instance.) |
| RFS (Request for Suppression) and RFSA (Request for Suppression Accepted) Signals | Along with the CSN operand, these signals provide a deadlock avoidance mechanism where requests requiring the same coupling facility resources in order to execute, arrive and begin execution in reversed order in the two coupling facilities participating in duplexing. Using these signals, one of the commands releases its resources and is "suppressed", allowing the other to execute successfully. The operating system will then redrive the suppressed command. |

As described herein, in one embodiment, the use of three entries per vector index in a round-robin pattern (+CSGX cursor) reduces the serialization and recovery design of lost or delayed signals.

Use of the retry index provides for an automatic mechanism for assigning signaling vector entries. A second serialization protocol among the Sysplex members is avoided.

Use of existing message facility mechanisms simplifies the design and does not require a new storage allocation process for the vectors.

In a further aspect, "read secondary" processing is provided, which allows the software to retrieve the data on a read command from the secondary structure after an IFCC results in the data not being read from the primary structure. Even though the read of the data was suppressed on the duplexed read command to the secondary, the data was staged into a retry buffer so that it could be retrieved in the event of such a failure.

A new global coupling facility object, the Duplexing Active vector, is defined. It is a parallel structure to the SID vector, and is likewise indexed by the Structure Identifier (SID) operand. Each bit in the Duplexing Active vector corresponds to the current duplexing state of the corresponding structure; the state of the bit therefore, serves to control command execution in duplex versus simplex mode for each structure in the coupling facility (of course, at a finer level of granularity, individual coupling facility commands executed against a duplexed structure may be executed either as simplex commands or duplexed commands).

This structure provides a number of functions employed by the duplexing architecture model and it provides a number of distinct advantages for the overall duplexing framework:

The granularity of duplexing is on a structure basis. Each coupling facility may have a mixture of structures in simplex state and duplex state (and, when duplexed, the various duplexed peer structures may reside in a mixture of different coupling facilities, which are all connected to this coupling facility). The duplexed entities are structures, not coupling facilities. This provides the customer with considerable flexibility in configuring the Parallel Sysplex environment to meet availability objectives for critical structures, workloads and applications, while lowering the overall cost and complexity of the configuration by allowing other non-critical structures to continue to execute in simplex mode. This flexibility also enhances the customers' ability to test the coupling facility duplexing function in a limited way prior to rolling it out broadly throughout the installation, and greatly simplifies the migration path from today's simplex environment to an environment where duplexing is being used extensively.

The duplexing active bit for a structure may only be set by the operating system via the Activate Duplexing (AD-PLX) command. This provides strict OS control over entering the duplexed state. (In other embodiments, this control may be eased.)

When duplexing is activated by the OS, structure-related duplexing controls uniquely identify a duplexed structure's peer structure instance (RFSID, RFSAU) and the coupling facility instance in which it resides (RFND, RFSYID). This allows tight control over which structures represent valid duplex copies of which other structures, and ensures that duplexing signals are sent to the correct coupling facility instance which contains this peer structure. This same information can also be used by the OS after sysplex-wide failures or total loss of connectivity to a coupling facility, to ensure that the duplexed state is preserved for valid pairs of duplexed structures, whenever possible.

The duplexing active bit for a structure may be reset by either the OS (via the Deactivate Duplexing (DDPLX) command) or by the CFCC. Allowing the OS to reset the bit provides for configuration control in the OS. Allowing the CFCC to reset the bit ensures that a failure detected by the coupling facility results in a consistent state for all of the duplexed objects in the coupling facilities, since once the bit is reset for a structure, no subsequent execution of commands in a duplexed fashion occurs. Duplexed command execution processes only operate, when the bit in the Duplexing Active vector is set for a structure. This simplifies failover, since the recovery is limited to those commands that were executing at the time the failure was detected (not any subsequent commands), and the resulting state of the objects affected by the commands is well defined.

Duplexed commands issued after duplexing is broken cause immediate command suspension with (e.g., RC=20) that allows systems to detect the change in state without updating coupling facility objects and without relying on a message exchange in the sysplex. This leaves the coupling facility structure in a consistent state until recovery/failover can be coordinated.

The technique to break duplexing (and reset the duplexing active bit) in the coupling facility is extremely tolerant of temporary loss of the coupling facility-to-coupling facility connection, with the advantage that the duplexed state of the structures is far more robust and highly available than it might have been otherwise. If a single link between the coupling facilities fails, and other redundant links connecting the pair of coupling facilities exist, then those other links will be used to send the signals, and duplexing will be preserved for the structures. If all links between coupling facilities fail, and then one or more of the links is recovered and no duplexing commands have been processed while all links were not operational, then duplexing will be preserved for the structures. Furthermore, even if duplexing commands are processed while all links between the coupling facilities are in a not-operational state, the signaling protocol tolerates this by using an initial Ready To Execute signal (RTE), which by itself does not permit structure objects to be updated; in the event that the loss of coupling facility-to-coupling facility connectivity only prevents these initial signals from being exchanged, the coupling facility need not break duplexing. Rather, it will report a "path not available" condition to software, who will then use a Test Remote Facility Access (TRFA) command to patiently wait for the coupling facility-to-coupling facility link to be restored and hold the command in abeyance, for a time. If coupling facility-to-coupling facility connectivity is restored within the timeout period, then duplexing is preserved and the duplexed commands that experienced the "path not available" condition are redriven; if not, then duplexing is broken by the software.

When the coupling facility connection fails, duplexing is only broken for those structures with images in each coupling facility. Also, the detection of the state change is done when the next command is executing for the structure. This ensures that the correct OS images see the error (i.e., no other reporting mechanism for reporting "duplexing broken" is needed), and see it at a time when recovery/failover can occur.

In further aspects of the invention, other architectural extensions and processing optimizations have been added to the coupling facility command architecture in support of coupling facility duplexing. Many of these are intrinsic to the basic single-entry and list-form duplexing processes themselves, in order to enable the duplexed structure objects to be updated consistently and maintained in a synchronized state indefinitely. Many others enhance the support by contributing to the robustness, transparency, manageability, and performance/efficiency of the coupling facility duplexing processes and protocols.

The following areas are extended, as examples:
1. Secondary structure allocation and copy processing support. New commands support the determination of coupling facility-to-coupling facility peer link connectivity, used by the OS to constrain allocation of "duplex capable" structures, and to give preference to coupling facilities that are failure-isolated from one another, etc. Furthermore, the use of directed allocation is extended to ensure that the secondary structure is allocated as a duplicate of the primary, in terms of number of structure objects. This enhances transparency as viewed by programs using the structure, and facilitates the ability to failover to either the primary or secondary structure and then operate in simplex mode, when necessitated by a failure condition affecting one of the structure instances.
2. "Double" commands and duplexing. Suppression operands (suppress notification, suppress registration, suppress read) allow existing commands to be duplexed without any explicit execution modes defined in the coupling facility (no explicit primary mode or secondary mode for a given structure instance).
3. "Triple" commands (also called "converted" commands) allow for transparent duplexing of commands that cannot be duplexed with either the single-entry or list-form duplex protocol, because signals cannot synchronize the execution of the "structure scan" processes these commands invoke (an example of such a command is Delete List Set). These are converted to "triple" commands: The first of the three reads a list of entries to be processed, from the primary structure; the second and third of the three execute a duplexed command using the list-form duplex protocol, using the list returned by the first of the three commands.
4. Common/interchangeable restart tokens across the command set, along with the common DIRP/LSP operands to denote directory position or list set position in commands which scan through the structure. This interchangeability enables the use of commands other than those actually requested by the connector, which is intrinsic to the "triple command" architecture and mechanism.
5. Response code reconciliation provides a single, consistent response to the exploiter.
6. Detach emulation processing for cache structures, and lock table cleanup processing for lock structures. These allow cleanup of structure objects to be performed consistently between the duplexed structures, despite the "structure scan" processes they involve and the inherent difficulty in synchronizing such scans across the structures.
7. Optimizations for cache structures by duplexing only changed or locked-for-castout entries; unchanged entries and data are not duplexed.
8. Copy process optimizations (do not copy cache registrations nor unchanged entries/data when establishing the secondary copy of the structure initially).
9. Mainline command request optimizations (Writes of unchanged data not locked for castout are written only to primary. RAR and RNL are normally driven only to primary, unless a change in storage class is processed.
10. Optimization for "pure reads" that do not modify structure objects being driven in simplex mode to the primary structure only, or from the "closer" coupling facility, whichever one it may be (primary or secondary).
11. Optimization for event queue monitoring to not duplex the event queues; allows the event queue monitoring queuing and withdrawal processes to continue to be performed as secondary processes asynchronous to the completion of the originating command. Requires additional processing when failing over to the secondary structure.
12. Optimization to IN/INL commands to allow them to be processed simplex to the primary structure when the invalidation type indicates processing unchanged data.
13. Coordination of IFCC recovery.
14. Immediate reporting of busy conditions minimizes skew in the duplexed pair (SCIS bit support). Further, the ability to send the commands in parallel to the coupling facilities, so the elapsed time for the duplexed pair should approximate the elapsed time of a single command.
15. Performance/measurement counters.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of controlling the state of duplexing of coupling facility structures in view of connection failures, said method comprising:
   detecting that a connection between a first coupling facility having a first instance of a coupling facility structure and a second coupling facility having a second instance of the coupling facility structure has failed;
   determining whether another connection exists between the first coupling facility and the second coupling facility; and
   managing a state of duplexing of the coupling facility structure, in response to the determining, wherein the managing comprises breaking duplexing of the coupling facility structure, in response to determining that another connection does not exist.

2. The method of claim 1, wherein the managing comprises preserving duplexing of the coupling facility structure, in response to determining that another connection exists.

3. A computer system for controlling the state of duplexing of coupling facility structures in view of connection failures, the computer system comprising:
   a memory; and
   a processor in communications with the memory, wherein the computer system is capable of performing a method, said method comprising:
      detecting that a connection between a first coupling facility having a first instance of a coupling facility structure and a second coupling facility having a second instance of the coupling facility structure has failed;
      determining whether another connection exists between the first coupling facility and the second coupling facility; and
      managing a state of duplexing of the coupling facility structure, in response to the determining, wherein the managing comprises breaking duplexing of the coupling facility structure, in response to determining that another connection does not exist.

4. The computer system of claim 3, wherein the managing comprises preserving duplexing of the coupling facility structure, in response to determining that another connection exists.

5. A system of controlling the state of duplexing of coupling facility structures in view of connection failures, said system comprising:
   a failed connection between a first coupling facility having a first instance of a coupling facility structure and a second coupling facility having a second instance of the coupling facility structure;
   a coupling facility to facilitate determining whether another connection exists between the first coupling facility and the second coupling facility; and
   at least one of a coupling facility and a system having an operating system to facilitate managing a state of duplexing of the coupling facility structure, in response to the determining, wherein the managing comprises breaking duplexing of the coupling facility structure, in response to determining that another connection does not exist.

6. A computer program product for controlling the state of duplexing of coupling facility structures in view of connection failures, the computer program product comprising:

a non-transitory storage medium readable by a processor and storing instructions for execution by the processor for performing a method comprising:

detecting that a connection between a first coupling facility having a first instance of a coupling facility structure and a second coupling facility having a second instance of the coupling facility structure has failed;

determining whether another connection exists between the first coupling facility and the second coupling facility; and managing a state of duplexing of the coupling facility structure, in response to the determining, wherein the managing comprises breaking duplexing of the coupling facility structure, in response to determining that another connection does not exist.

7. The computer program product of claim 6, wherein the managing comprises preserving duplexing of the coupling facility structure, in response to determining that another connection exists.

8. A computer program product for controlling the state of duplexing of coupling facility structures in view of connection failures, the computer program product comprising:

a non-transitory storage medium readable by a processor and storing instructions for execution by the processor for performing a method comprising:

detecting that a connection between a first coupling facility having a first instance of a coupling facility structure and a second coupling facility having a second instance of the coupling facility structure has failed;

determining whether another connection exists between the first coupling facility and the second coupling facility;

preserving duplexing of the coupling facility structure, in response to determining that another connection exists; and breaking duplexing of the coupling facility structure, in response to determining that another connection does not exist.

* * * * *